US007904199B2

(12) United States Patent
Carter et al.

(10) Patent No.: US 7,904,199 B2
(45) Date of Patent: Mar. 8, 2011

(54) CALIBRATION SYSTEMS FOR MACHINES

(75) Inventors: Daniel S Carter, Fresno, CA (US); Christopher R. Craven, Fresno, CA (US); Walid H. El-Aouar, Clovis, CA (US); Craig R Greiner, Fresno, CA (US); Larry E Hieb, Fresno, CA (US); Dean W James, Clovis, CA (US); Sandra L Southard, Clovis, CA (US); Rolando S. Williams, Madera, CA (US)

(73) Assignee: Sanden Vendo America, Inc., Dallas, TX (US)

( * ) Notice: Subject to any disclaimer, the term of this patent is extended or adjusted under 35 U.S.C. 154(b) by 633 days.

(21) Appl. No.: 11/981,484

(22) Filed: Oct. 30, 2007

(65) Prior Publication Data

US 2008/0078778 A1 Apr. 3, 2008

(51) Int. Cl.
*G06F 17/00* (2006.01)

(52) U.S. Cl. .......... 700/242; 221/210; 221/219; 221/220

(58) Field of Classification Search .................. 221/210, 221/219, 220; 700/242
See application file for complete search history.

(56) References Cited

U.S. PATENT DOCUMENTS

| | | | |
|---|---|---|---|
| 2,093,410 | A | 9/1937 | Boon |
| 2,302,166 | A | 11/1942 | Anthony |
| 2,440,251 | A | 4/1948 | Devens |
| 2,615,773 | A | 10/1952 | Holt et al. |
| 2,735,578 | A | 2/1956 | Woodruff |
| 2,770,393 | A | 11/1956 | Gale |
| 3,001,669 | A | 9/1961 | Tandler et al. |
| 3,055,544 | A | 9/1961 | Krakauer et al. |
| 3,008,583 | A | 11/1961 | Lindell |
| 3,028,014 | A | 4/1962 | Southwick |
| 3,083,067 | A | 3/1963 | Vos et al. |
| 3,161,295 | A | 12/1964 | Chesley |
| 3,166,195 | A | 1/1965 | Taber |
| 3,193,138 | A | 7/1965 | Cox et al. |
| 3,294,152 | A | 12/1966 | Kuijvenhoven |
| 3,294,282 | A | 12/1966 | Brown |
| 3,308,961 | A | 3/1967 | Chesley |
| 3,344,953 | A | 10/1967 | Krakauer et al. |

(Continued)

FOREIGN PATENT DOCUMENTS

DE 1-171 658 6/1964

(Continued)

OTHER PUBLICATIONS

Seven photographs of a device as displayed in Harry's Farmers market in Duluth, Georgia, Mar. 1995, as disclosed in U.S. Appl. No. 08/489,972.

(Continued)

*Primary Examiner* — Timothy R Waggoner
(74) *Attorney, Agent, or Firm* — Mark D. Miller

(57) ABSTRACT

This invention is a vending machine and components parts that include a sophisticated positioning system, gripper and trays for improved efficiency in product retrieval and delivery. A unique initialization and calibration system is implemented at start up to determine the positions of shelves and trays of product containers in the machine, and may be implemented at other times if trays or shelves are added or removed, or if tray or shelf positions change. These positions are then used by the positioning and gripping systems to accurately and efficiently retrieve products from the trays. Related methods are also disclosed.

7 Claims, 34 Drawing Sheets

U.S. PATENT DOCUMENTS

| | | | | |
|---|---|---|---|---|
| 3,348,732 | A | 10/1967 | Schwartz | |
| 3,370,749 | A | 2/1968 | Nathan et al. | |
| 3,426,115 | A | 2/1969 | Taber | |
| 3,722,744 | A | 3/1973 | Payne | |
| 3,752,357 | A | 8/1973 | Harris | |
| 3,802,581 | A | 4/1974 | Frederick | |
| 3,810,560 | A | 5/1974 | Stegeman | |
| 3,810,561 | A | 5/1974 | Merkl | |
| 3,848,745 | A | 11/1974 | Smith | |
| 3,917,114 | A | 11/1975 | Grosse | |
| 3,990,754 | A | 11/1976 | Pitel et al. | |
| 4,061,245 | A | 12/1977 | Lotspeich | |
| 4,108,333 | A | 8/1978 | Falk et al. | |
| 4,252,250 | A | 2/1981 | Toth | |
| 4,300,693 | A | 11/1981 | Spamer | |
| 4,303,162 | A | 12/1981 | Suttles | |
| 4,303,179 | A | 12/1981 | Spring | |
| 4,319,742 | A | 3/1982 | Ulseth | |
| 4,368,829 | A | 1/1983 | Lotspeich et al. | |
| 4,405,059 | A | 9/1983 | Kull | |
| 4,454,949 | A | 6/1984 | Flum | |
| 4,470,943 | A | 9/1984 | Preis | |
| 4,483,459 | A | 11/1984 | Taylor et al. | |
| 4,511,059 | A | 4/1985 | Manzer | |
| 4,560,088 | A * | 12/1985 | Tan | 221/75 |
| 4,565,725 | A | 1/1986 | Spamer et al. | |
| 4,598,810 | A | 7/1986 | Shore et al. | |
| 4,687,119 | A | 8/1987 | Juillet | |
| 4,688,895 | A | 8/1987 | Jacob | |
| 4,706,794 | A | 11/1987 | Awane et al. | |
| 4,717,044 | A | 1/1988 | Suzuki et al. | |
| 4,729,481 | A | 3/1988 | Hawkinson et al. | |
| 4,730,741 | A | 3/1988 | Jackie, III et al. | |
| 4,742,936 | A | 5/1988 | Rein | |
| 4,762,236 | A | 8/1988 | Jackle, III et al. | |
| 4,762,250 | A | 8/1988 | Friberg | |
| 4,787,533 | A | 11/1988 | Haroutel et al. | |
| 4,789,054 | A * | 12/1988 | Shore et al. | 221/88 |
| 4,812,629 | A * | 3/1989 | O'Neil et al. | 221/13 |
| 4,815,055 | A | 3/1989 | Fago, Jr. | |
| 4,830,201 | A | 5/1989 | Breslow | |
| 4,839,505 | A | 6/1989 | Bradt et al. | |
| 4,860,876 | A | 8/1989 | Moore et al. | |
| 4,871,054 | A | 10/1989 | Murray | |
| 4,872,592 | A | 10/1989 | Anazawa | |
| 4,898,282 | A | 2/1990 | Hawkinson et al. | |
| 4,899,893 | A | 2/1990 | Robertson | |
| 4,901,869 | A | 2/1990 | Hawkinson et al. | |
| 4,903,815 | A | 2/1990 | Hirschfeld et al. | |
| 4,967,896 | A | 11/1990 | Hara | |
| 4,977,754 | A | 12/1990 | Upton et al. | |
| 4,986,441 | A | 1/1991 | Kanbe et al. | |
| 4,986,615 | A | 1/1991 | Hieb et al. | |
| 4,991,739 | A | 2/1991 | Levasseur | |
| 4,995,498 | A | 2/1991 | Menke | |
| 4,997,094 | A | 3/1991 | Spamer et al. | |
| 5,012,936 | A | 5/1991 | Crum | |
| 5,020,958 | A | 6/1991 | Tuttobene | |
| 5,027,957 | A | 7/1991 | Skalski | |
| 5,028,766 | A | 7/1991 | Shah | |
| 5,036,472 | A | 7/1991 | Buckly et al. | |
| 5,069,349 | A | 12/1991 | Wear et al. | |
| 5,097,986 | A | 3/1992 | Comberg et al. | |
| 5,105,978 | A * | 4/1992 | Trouteaud et al. | 221/93 |
| 5,111,942 | A | 5/1992 | Bernardin | |
| 5,111,962 | A | 5/1992 | Oden | |
| 5,121,854 | A | 6/1992 | Trouteaud et al. | |
| 5,123,546 | A | 6/1992 | Crum | |
| 5,139,384 | A | 8/1992 | Tuttobene | |
| 5,143,193 | A | 9/1992 | Geraci | |
| D330,121 | S | 10/1992 | Wear et al. | |
| 5,183,999 | A | 2/1993 | Hakenewerth et al. | |
| 5,206,814 | A | 4/1993 | Cahlander et al. | |
| 5,236,103 | A | 8/1993 | Ficken et al. | |
| 5,240,126 | A | 8/1993 | Foster et al. | |
| 5,240,139 | A | 8/1993 | Chirnomas | |
| 5,341,854 | A | 8/1994 | Zezulka et al. | |
| 5,366,099 | A | 11/1994 | Schmid | |
| 5,385,265 | A | 1/1995 | Schlamp | |
| 5,415,417 | A | 5/1995 | Reis, Jr. | |
| 5,417,079 | A | 5/1995 | Rudick et al. | |
| D362,463 | S | 9/1995 | Vogelphol et al. | |
| 5,467,892 | A | 11/1995 | Schlamp | |
| 5,497,905 | A | 3/1996 | Vogelpohl et al. | |
| 5,499,707 | A | 3/1996 | Steury | |
| 5,505,332 | A | 4/1996 | Vogelpohl et al. | |
| 5,511,646 | A | 4/1996 | Maldanis et al. | |
| 5,555,793 | A | 9/1996 | Tocchet et al. | |
| 5,555,965 | A | 9/1996 | Mishina | |
| 5,624,042 | A | 4/1997 | Flum et al. | |
| 5,634,564 | A | 6/1997 | Spamer et al. | |
| 5,645,176 | A | 7/1997 | Jay | |
| 5,651,476 | A | 7/1997 | Percy et al. | |
| 5,678,421 | A | 10/1997 | Maynard et al. | |
| 5,706,958 | A | 1/1998 | Spamer | |
| 5,788,090 | A | 8/1998 | Kajiwara | |
| 5,842,597 | A | 12/1998 | Kraus et al. | |
| 5,875,645 | A | 3/1999 | Dunnigan | |
| 5,881,911 | A | 3/1999 | Burdette et al. | |
| 5,904,256 | A | 5/1999 | Jay | |
| 5,927,539 | A | 7/1999 | Truitt et al. | |
| 5,967,364 | A | 10/1999 | Swanson et al. | |
| 6,006,946 | A | 12/1999 | Williams et al. | |
| 6,068,142 | A | 5/2000 | Primiano | |
| 6,170,285 | B1 | 1/2001 | Huffman et al. | |
| 6,199,720 | B1 | 3/2001 | Rudick et al. | |
| 6,230,930 | B1 | 5/2001 | Sorensen et al. | |
| 6,237,784 | B1 | 5/2001 | Primiano | |
| 6,253,954 | B1 | 7/2001 | Yasaka | |
| 6,286,715 | B1 | 9/2001 | Ziesel et al. | |
| 6,328,180 | B1 | 12/2001 | Sorensen et al. | |
| 6,378,324 | B1 | 4/2002 | Percy et al. | |
| 6,389,822 | B1 | 5/2002 | Schanin | |
| 6,415,950 | B1 | 7/2002 | Robrechts | |
| 6,499,627 | B2 | 12/2002 | Arai | |
| 6,513,677 | B1 | 2/2003 | Sorensen et al. | |
| 6,556,889 | B2 | 4/2003 | Rudick et al. | |
| 6,571,988 | B2 | 6/2003 | Bowen | |
| 6,597,970 | B1 | 7/2003 | Steury et al. | |
| 6,682,289 | B1 * | 1/2004 | Credle, Jr. | 221/95 |
| 6,701,739 | B2 | 3/2004 | Morse | |
| 6,722,142 | B1 | 4/2004 | Pagel | |
| 6,808,082 | B2 | 10/2004 | Ohkubo | |
| 6,840,399 | B2 * | 1/2005 | Chirnomas | 221/7 |
| 6,868,983 | B2 | 3/2005 | Chirnomas | |
| 6,966,455 | B2 | 11/2005 | Skavnak | |
| 6,975,926 | B2 | 12/2005 | Schanin | |
| 7,040,535 | B2 | 5/2006 | Sato et al. | |
| 7,055,716 | B2 | 6/2006 | Holdway et al. | |
| 7,066,248 | B2 | 6/2006 | Howell | |
| 7,086,560 | B2 * | 8/2006 | Shioya | 221/191 |
| 7,128,237 | B2 | 10/2006 | Holdway et al. | |
| 7,128,239 | B2 | 10/2006 | Skavnak | |
| 7,222,748 | B2 | 5/2007 | Holdway et al. | |
| 7,222,749 | B2 | 5/2007 | Holdway et al. | |
| 7,255,246 | B2 | 8/2007 | Bautista et al. | |
| 7,264,138 | B2 | 9/2007 | Collins et al. | |
| 7,289,880 | B2 | 10/2007 | Baack et al. | |
| 7,530,473 | B2 | 5/2009 | Chirnomas | |
| 2001/0000610 | A1 | 5/2001 | Johnson | |
| 2001/0048000 | A1 | 12/2001 | Arai | |
| 2002/0079323 | A1 | 6/2002 | Lauer | |
| 2003/0150870 | A1 | 8/2003 | Gilbert | |
| 2004/0025389 | A1 | 2/2004 | Peterson | |
| 2004/0128889 | A1 | 7/2004 | Chirnomas et al. | |
| 2004/0188455 | A1 | 9/2004 | Shioya | |
| 2005/0177282 | A1 | 8/2005 | Mason, II | |
| 2005/0189370 | A1 | 9/2005 | Carter et al. | |
| 2005/0252925 | A1 | 11/2005 | Kelly | |
| 2007/0209251 | A1 | 9/2007 | Zheng et al. | |
| 2007/0210100 | A1 | 9/2007 | Skavnak | |
| 2008/0263921 | A1 | 10/2008 | Kim | |

FOREIGN PATENT DOCUMENTS

| | | | |
|---|---|---|---|
| DE | 36 05 921 | A1 | 8/1987 |
| DE | 44 44 791 | A1 | 6/1996 |
| EP | 0 071 438 | A2 | 2/1983 |

| | | | |
|---|---|---|---|
| EP | 0 258 954 | A2 | 9/1988 |
| EP | 0 333 430 | B1 | 9/1989 |
| EP | 0 551 284 | A1 | 7/1993 |
| EP | 0 724 240 | A2 | 7/1996 |
| GB | 438916 | | 11/1935 |
| GB | 982137 | | 2/1965 |
| GB | 1000604 | | 8/1965 |
| GB | 1000605 | | 8/1965 |
| GB | 2 152 020 | A | 7/1985 |
| GB | 2 277 512 | A | 2/1994 |
| IT | 646381 | | 9/1962 |
| JP | 50-114488 | | 9/1975 |
| JP | 62-14579 | | 1/1987 |
| JP | 1-253090 | | 10/1989 |
| JP | 1-253091 | | 10/1989 |
| JP | 2-69894 | A | 3/1990 |
| JP | 2-73493 | | 3/1990 |
| JP | 2-93786 | | 4/1990 |
| JP | 2-93789 | | 4/1990 |
| JP | 2-161590 | | 6/1990 |
| JP | 3-9495 | | 1/1991 |
| JP | 3-90992 | | 4/1991 |
| JP | 3-118686 | | 5/1991 |
| JP | 3-154193 | | 7/1991 |
| JP | 3-226898 | | 10/1991 |
| JP | 4-7696 | | 1/1992 |
| JP | 4-33090 | | 2/1992 |
| JP | 4-188295 | | 7/1992 |
| JP | 4-195698 | | 7/1992 |
| JP | 5-151443 | | 6/1993 |
| JP | 5-197877 | | 8/1993 |
| JP | 07-006260 | | 1/1995 |
| JP | 07-025474 | U | 5/1995 |
| JP | 07-121765 | A | 5/1995 |
| JP | 9-102066 | | 4/1997 |
| JP | 9-319959 | | 12/1997 |
| JP | 11154261 | | 6/1999 |
| JP | 11154266 | | 6/1999 |
| JP | 11154267 | | 6/1999 |
| JP | 11161833 | | 6/1999 |
| JP | 11161835 | | 6/1999 |
| JP | 11167672 | | 6/1999 |
| JP | 11175837 | | 7/1999 |
| JP | 11-213234 | | 8/1999 |
| JP | 11296741 | | 10/1999 |
| JP | 11328521 | | 11/1999 |
| JP | 2000076538 | | 3/2000 |
| JP | 2000259939 | | 9/2000 |
| SU | 600040 | | 3/1978 |
| SU | 1007917 | A | 3/1978 |
| WO | WO 93/03462 | | 2/1993 |
| WO | WO 99/19848 | | 4/1999 |
| WO | WO 99/19849 | | 4/1999 |
| WO | 2006085724 | A | 8/2006 |

OTHER PUBLICATIONS

Robotics Designing the Mechanisms for Automated Machinery Second Edition by Ben-Zion Sandler; copyright 1999, Academic Press, San Diego, CA; cover and copyright pp. 350-358.

New Vending Machine One for the Books in The Stockton Record Newspaper dated Aug. 12, 2001, by Nedra Rhone of Los Angeles Times.

Special Report: Technology Gives Vending a Role in Non-Foods Merchandising in the Sep. 2000 issue of Automatic Merchandiser by Elliot Maras, Editor; 5 pages.

Cover Story: Non-Food Vending Innovations Bring Add-On Sales in the Oct. 2001 issue of Automatic Merchandiser; 4 pages.

Expo New Equipment Report in the Dec. 2000 issue of Automatic Merchandiser; 1 page.

Shops'n'Bots section, Coolest Inventions article, Time, Nov. 18, 2002; 1 page.

Dixie-Narco, Inc. Glass Front Beverage Vender Models DN DN 55##, DN 54##, DN 2145; Apr. 1, 1998, Operation, Service, Parts, Troubleshooting Manual; cover and 35 pages.

Robo Quencher Advertisement, Automatic Products International, Ltd., 2 pages; copyright 2003.

Robo Quencher Service Manual; Model 511; Automatic Products International, Ltd., copyright 2002; 18 pages.

* cited by examiner

DETAIL A
SCALE 1:2

CALIBRATION SYSTEMS FOR MACHINES

This application claims the benefit of U.S. application Ser. No. 11/066,775 filed on Feb. 25, 2005 now U.S. Pat. No. 7,451,891, which claims the benefit of U.S. Provisional Application No. 60/548,321 filed on Feb. 27, 2004, all of which are incorporated herein by this reference.

BACKGROUND OF THE INVENTION

1. Field of the Invention

The present invention is a vending machine that is capable of efficiently storing, retrieving and delivering product containers having a variety different sizes, shapes and weights. In particular, the vending machine of the present invention may be simultaneously stocked with products in containers of different sizes, shapes and/or weights, and efficiently store, retrieve and deliver each of those containers.

2. Description of Related Art

Changes and improvements in product container configurations have led to increased performance demands upon vending machines. In the past, a given vending machine was generally relegated to the delivery of a single type of product container of uniform dimension and/or shape—only bottled beverages, only canned beverages, only beverages in cartons, and so on. Such vending machines could not simultaneously store, retrieve or deliver containers having different sizes, shapes or weights. While some improvements have allowed certain vending machines to handle multiple containers (e.g., a single machine may be adapted to handle beverages in both aluminum cans and plastic bottles), these machines require the containers to have similar characteristics, i.e., all of them having a generally cylindrical body. Other machines require special kits to adapt them to be able to handle different sizes and shapes of containers, including cylindrical packages of different sizes.

The ever-increasing number of different container configurations necessitates the development of a single vending machine that can store, retrieve and deliver substantially different product packages quickly and smoothly. For example, beverages are not only provided in aluminum cans, and glass or plastic bottles, but also in rectangular cartons (such as milk cartons), hourglass-shaped containers, and flexible mylar or foil containers (such as children's juice packages), to name a few. One need only imagine the many different children's characters whose shapes may be adapted into beverage containers to appreciate the challenge to the vending machine industry presented by such containers. In addition, manufacturers are regularly developing new sizes and shapes for beverage containers and other packages for advertising or other reasons, all of which pose new problems for the storage, retrieval and delivery of those different containers by a single vending machine.

Various devices have been developed to allow vending machines to store, retrieve and deliver packages having different characteristics. For example, U.S. Pat. Nos. 6,230,930 and 6,328,180 disclose devices for transporting a carriage along the X and Y planes of a vending machine to an appropriate location for retrieving a selected product. An escapement mechanism is used to release the endmost product from a queue into the carriage which then gently transports the product to a delivery port. However, both of these devices are limited to use with generally cylindrical beverage containers. U.S. Pat. No. 6,499,627 discloses a vending machine using conveyor belts to transport beverage containers. U.S. Pat. No. 5,467,892 discloses a vending machine for retrieving standardized containers containing different articles from a shelf-like structure, making the containers accessible by a customer for removal of the article inside, and returning the empty container to the shelf. However, neither of these devices is capable of transporting containers of different sizes, shapes, weights and/or deformabilities.

Existing vending machine escapement mechanisms generally trap the next-to-vend product in position at the end of the tray column, using a mechanical stop, which pins this product against the opposing column wall or some other rigid element while the endmost product is removed. This principle requires accurate gauging of the width of the package in order to guarantee retention of the next-to-vend package. Due to the proliferation of package sizes, carbonation levels (which determine package firmness and thus dimensional stability), and package types (cans, glass bottles, plastic bottles, deformable mylar squeeze packs, cartons, etc), most existing machines are unable to deal with more than one type of package, and can only reliably deal with containers having rigid, uniform exteriors. It is therefore desirable to provide a vending machine that is capable of simultaneously storing containers having a wide variety of different sizes, shapes, deformabilities and/or weights, and efficiently retrieving and/or delivering such containers.

Product freshness is a perpetual problem for vending machines. Vending machines should be stocked and re-stocked so that the oldest products are vended before the newer products, in a "first in first out" manner. Many vending machines utilize racks or shelves extending from the back end of the machine to the front, with products retrieved and vended from the front end. Unfortunately, the front end of the rack or shelf is also the easiest, and in some cases it is the only way to access when restocking the vending machine. Such racks require all existing products to be removed in order to restock with newer, fresher products in front. This may result in a tendency to deposit newer products at the easily-accessible front end of the rack or shelf, thereby pushing the older products to the rear. This can result in the older products remaining in the vending machine for great lengths of time, leading to potential spoliation and consumer dissatisfaction. It is therefore desirable to provide a vending machine having front-facing racks or shelves that can be easily restocked from their rear ends forward.

Repair and maintenance of vending machines in the field is also an ever present problem. Revenue may be lost if the machine must be disassembled for any length of time while critical component parts are repaired in the field. With more complicated machines, repairs become more difficult and time-consuming. Removing the machine for factory repair completely eliminates revenue generation. It is therefore desirable to provide the various component parts of the machine (product trays, shelves, product retrieval mechanism, electronic components, delivery port, heating/cooling system, etc.) in modular form so that if any of these components fail in the field, they may be easily swapped out with working components in a minimal amount of time.

SUMMARY OF THE INVENTION

The present invention is a vending machine including combinations of component parts and unique methods that is capable of storing, retrieving and delivering product containers having a wide variety of different sizes, shapes and/or weights. The machine, components and methods of the present invention allow the vended products to be varied in location and number with relative ease, allow for easy restocking of products in such a manner that the older products are vended before the newer ones, and allow minimum down time for maintenance and repair.

The machine, components and methods of the present invention are directed toward a vending machine of a type having sets of trays or queues that extend from the back of the machine to the front so that the products in the queues are visible to purchasers through a transparent panel or window at the front of the machine. The invention employs an X-Y-Z positioning system for moving a product carriage into position adjacent to a selected queue, and a unique mechanized gripping device that works in conjunction with uniquely designed queue trays for retrieving any of wide variety of containers of different sizes, shapes and/or weights from the queue. The product is retrieved from the selected queue and transported to a delivery location where it is made available to the purchaser.

The configuration of the positioning system including its motorized methods and assemblies allows for quick and efficient product retrieval. The system positions a gripping mechanism by a substantially direct route from a rest position to the selected queue, and provides for quick, affirmative gripping of the product rather than reliance on gravity to feed the product into an awaiting transport mechanism. The flexibility of the invention allows it to be used with a wide variety of different container designs, shapes and sizes without any need to convert or alter the product trays, as would be required in existing equipment which employ an escapement-type release mechanism at the end of each tray queue.

The trays used in the present invention may be oriented from the back to the front of the machine and in combination with a glass panel in the door provide for visual product selection which allows for greater flexibility in changing products because selection is controlled by location only. In systems not having visual selection capability, each product selection mechanism must be correlated with a particular queue within the vending machine. Such machines also require a label or product identification to match the selection mechanism with the appropriate product queue.

All of the refrigeration components of the present invention may be combined into a self-contained easily accessible modular unit for quick and simple repair/replacement and maintenance.

One of the most important aspects of the present invention is a unique gripping mechanism that can reliably remove any of a wide variety of containers of different sizes, shapes and/or weights, including such deformable containers as children's juice pouches, from the endmost position in a queue. The gripping mechanism generally includes a plurality of opposing movable fingers that operate independently of each other, and are capable of moving between open and closed positions. The independent movement of these fingers allows them to engage a container at different places and close around the container for a secure grip. The gripping mechanism also includes a pair of lower opposing fixed-position fingers that are used to temporarily move out of the way a set of movable gates located at the end of a tray holding a queue of containers. The movable fingers of the gripping assembly are positioned so that, when closed against a container, they exert a force against the container at different locations upon the container surface. The position of the fingers, their compressive force, and the friction associated with such force, provide the mechanism with a firm "grip" upon the container. This allows the gripping mechanism to lift, hold, transport and release product containers of different sizes, shapes, weights, rigidity, dimensional stability and/or deformability.

In alternative embodiments, the gripping mechanism may employ an open sleeve having a C-shaped cross section wherein the container enters through the open end of the sleeve which is then closed or compressed around the container. Alternatively, the fingers of the gripping mechanism may be flat, flexible, jointed or articulating. They may be straight or have an arcuate cross section. The gripper may also be provided with one or more movable lower fingers that fit under and lift the container from the bottom (instead of, or in addition to the side fingers). In another embodiment, one or more of the side fingers may be equipped with an inflatable member that is expanded to engage a product container, and deflated to release it.

Another important aspect of the present invention is a unique tray structure for dispensing products that works in conjunction with the gripping mechanism to allow the endmost container to be removed from the queue of the tray, while preventing the next-to-vend container from also being removed. A typical tray includes a pair of parallel queues having a downward slope from the back to the front of the vending machine, and pressure imparting members that urge products toward the front of the tray. A pivotally mounted movable gate is provided at the front end of each queue, mounted to one of the sidewalls of the queues. Alternatively, pairs of gates may be provided on both sides of any single queue. The gates may pivot in the X-Y plane (up and down) or in the Z plane (in and out) with a stop to prevent a product container from pushing such Z gates open. An optional movable central piece or arm may be provided at the front of each dual tray between the two queues. A flange or rib may be provided at the bottom of the front of each queue of the tray. The flanges and gates prevent products from exiting the front of the tray until the gripping mechanism arrives. Upon arrival (using the X-Y-Z positioning system described below), the fixed-position fingers of the gripping mechanism first move the gate(s) and the optional central piece out of the way with a downward motion. Then the movable fingers engage the foremost container in the queue. The gripping mechanism then raises the container over the lower flange of the queue, if necessary, and then withdraws it from the queue (in the Z direction). The withdrawal action causes the gate(s) and optional central piece to move back into place preventing the next-in-line product from exiting the queue.

A simple tray embodiment may include a single tray column and queue, and a single pivotally mounted gate at the front.

Another embodiment of a product storage tray includes: (a) a tray body comprising a floor, two longitudinal side walls extending substantially the length of the floor substantially parallel to each other, and a center wall spaced substantially equidistant between the sidewalls and extending substantially the length of the floor thereby forming adjacent columns permitting two queues of product to be held side-by-side; (b) a tray front piece with a floor, side walls and a center wall which align with the floor, side walls and center wall of the tray body thereby forming an extension of the tray body in the longitudinal direction and at least one stop wall extending into the column from the tray front piece at the floor for preventing the vended products from sliding out of the front of the column; (c) a gate piece pivotally attached to each side wall of the front piece and extending in a generally horizontal direction from each side wall of the front piece in the direction of the column adjacent to each front piece side wall; and (d) a divider piece pivotally mounted to the center wall of said front piece and extending in a generally horizontal direction from the center wall toward the front of the tray in alignment with the center wall of the tray.

It is to be appreciated that in some instances, products to be vended may be provided in containers having minimal spatial depth. In order to compensate for such thin products (e.g., a deck of cards), the distance traveled by the gripper mechanism in the Z-direction may be modified. In this way, the gripper only travels in the Z direction far enough to grasp the endmost product, instead of traveling too far and retrieving more than one product from the selected queue.

Yet another important aspect of the present invention is a unique X-Y-Z positioning system that is capable of moving a carriage so as to be precisely aligned with a selected product queue. A typical X-Y positioning system of the present invention includes (a) a pair of Y-rail assemblies mounted in the door or storage cavity of the vending machine in a generally vertical orientation; (b) an X-rail assembly deployed in a generally horizontal orientation (perpendicular to the Y rails) operatively mounted at each end to a Y-rail assembly for movement along the Y-rail assemblies; (c) a first motor assembly for controlling movement of the X-rail assembly along the Y-rail assemblies; (d) a carriage operatively mounted to the X-rail assembly for movement along the X-rail assembly; and (e) a second motor assembly for controlling movement of the carriage along the X-rail assembly.

The carriage is designed to support a device for removing products from queues within the vending machine. Such a device may be the gripper mechanism described previously. Such a mechanism may be provided in an extendable housing on the carriage that may be moved in and out along the Z-axis so as to allow the gripper to remove the endmost product from the selected queue.

Another unique aspect of the invention is the delivery port assembly that provides customer access to vended products delivered from inside storage cavity the vending machine. Upon product selection, the vended product is retrieved and transported to the delivery port assembly where it is dropped into a chute leading to a delivery bucket. The chute is pivotally attached to a panel adjacent to the delivery bucket and serves as an opening to the delivery bucket to receive product dropped from the inside of the storage cavity. The product slides down the delivery chute into the delivery bucket whereupon said delivery chute pivots closed, causing the product container to be tilted upright and closing the opening between the storage cavity and the delivery port assembly. This closure prevents unauthorized access to the storage cavity through the delivery port. When the delivery bucket is pivoted forward it tilts open at an outward angle away from the door exposing a vended container to the customer for retrieval.

Another unique aspect of the present invention is its modular design in which several of the components of the machine may be easily swapped out for repair or replacement including the gripper mechanism, the X-rail, the Y-rails, the carriage, trays, shelves, delivery chute and bucket, and climate control system. The interior cabinet of the vending machine is divided into two chambers. A larger upper chamber is provided for holding the queues of beverage containers, and the container retrieval system. A smaller lower chamber is provided for holding the climate control apparatus which could be a heater or a cooler. All of the necessary climate control components are built into a compact modular unit that can be easily removed from the lower chamber. Opening the door of the vending machine allows access to both chambers. In the event of a failure of any part of the climate control apparatus, the modular unit may be removed and replaced with another functional unit so as to minimize down time of the vending machine. The defective unit may then be discarded or repaired at another location so that it can later be installed into the same or a different vending machine. Meanwhile, the newly installed modular unit allows the affected machine to continue uninterrupted operation.

The invention further contemplates that identical detectable elements such as reflective optical patches are provided on the front of each tray, and that a corresponding sensing element (e.g. an optical sensor) is provided in conjunction with the gripping mechanism to permit the system to determine the then current tray orientation. A startup sequence is performed following power up, and as part of the sequence the carriage first traverses along Y axis at one side of the machine allowing the gripping mechanism housing to detect the presence of a tray on each shelf along that side through use of the sensing element. This sequence finds the location of one side of each shelf. For each shelf identified, the startup sequence may also cause the carriage to traverse along the Y axis on the opposite side of the machine, again using the sensor on the gripping mechanism housing to detect the presence of a tray on each shelf along that side. The locations of the opposite sides of each shelf are then compared to each other to determine whether there is any variation in the shelf position from horizontal. Any such variation is calculated, as are the intermediate tray locations on every shelf, so that the gripping mechanism is taken to the proper location when any of the tray queues are selected.

If the door is left open for a predetermined interval (e.g. 10 minutes) that is long enough for the user to have changed the positions of the shelves, this sequence is performed again to confirm the positions of the shelves. In those cases where the locations have changed, the new shelf configuration and location data is updated.

It is to be appreciated that each of the above described aspects of the present invention may be implemented separately or in different groupings or combinations, according to the needs of the user and the capabilities of the vending machine.

Thus, an all-inclusive version of the invention provides for a machine, components and methods for vending products in containers that includes: (a) a cabinet with a door cooperatively forming an internal storage cavity which is further divided into an upper compartment and a lower compartment by an internal floor within the storage cavity; the door including a delivery port assembly for delivery of the product to the customer; (b) a plurality of removable and adjustable trays to hold product containers to be vended sloping generally downward from the rear of the storage cavity toward the front, each tray comprising a pair of parallel columns and pressure imparting members that urge the products in each column toward the front of the columns; (c) a self-contained modular climate control unit including the components needed to provide refrigeration or heating, the self-contained modular unit located in the lower compartment of the cabinet; (d) a product selector mechanism for product selection by a customer which provides an electrical signal initiating the vending process; (e) an X-Y positioning mechanism movable in the storage cavity and mounted adjacent to the front of the storage cavity (or in the door) comprising two Y-rail assemblies oriented in a generally vertical direction, and an X-rail assembly oriented in a generally horizontal direction and operatively connected at each end to a Y-rail assembly, with the X-rail assembly movable in the Y plane along the Y-rail assemblies; (f) a housing for a gripping mechanism mounted on the X-rail assembly and movable in the X plane along the X-rail assembly; (g) a gripping mechanism mounted in the housing and movable substantially horizontally in the Z plane, extendible to the end of a queue of containers for removing the endmost container from the queue, the gripping mechanism having oppositely positioned movable fingers or the like that operate independently of each other, and a pair of fixed position fingers at the bottom of the assembly; and (h) a delivery port in the door of the machine including a chute for receiving a container dropped from the gripping mechanism, the chute leading to a hopper for delivery to a customer.

In another aspect of the invention, there is an X-Y-Z positioning mechanism for retrieval and delivery of products for a vending machine of the type having a cabinet and a door cooperatively forming a storage cavity, a product support assembly mounted in the storage cavity and configured to hold a plurality of products to be vended in separate ordered queues, and a delivery port for retrieval by a customer of a vended product.

Another aspect of the invention discloses a product storage tray for storage of products to be vended for a vending machine of the type having a cabinet and a door cooperatively forming a storage cavity; a delivery port assembly for customer retrieval of vended products; a product selector mechanism operable by a customer to select a vended product; and a positioning mechanism operable in the X-Y-Z planes which upon product selection retrieves the vended product, transports it to and drops it into the delivery port assembly.

Another aspect of the invention provides for a method for removing products from the ends of queues within a vending machine including the steps of: providing queues of variably sized product containers on trays that slope downward from back to front, each queue having at least one movable gate at the front end; positioning a product removal mechanism in front of a selected queue; extending the product removal mechanism toward the selected queue in such a way that is opens the gate(s) to give access to the foremost product in the queue; gripping the foremost product from the queue using a plurality of closable fingers in the removal mechanism; retracting the removal mechanism and the gripped product; moving the product to a delivery port; and releasing the product from the removal mechanism into the delivery port for retrieval by a customer.

A more complete method includes the steps of (a) storing a plurality of product containers in a vending machine comprising a cabinet with a door cooperatively forming an internal storage cavity in which the products to be vended are maintained in columnar trays comprising one or more adjacent longitudinal columns, the trays being oriented with the columns declining from the rear of the cavity toward the front of the cavity; the door including a delivery port assembly for delivery of the product to the customer; (b) initiating the vending process upon selection by a customer of a product for vending through activation of a product selection mechanism which activates a motorized positioning mechanism; (c) moving the motorized positioning mechanism to the selected product container, the motorized positioning mechanism being capable of moving in the storage cavity and being mounted adjacent to the front of the storage cavity, and including two Y-rail assemblies oriented in a generally vertical direction, an X-rail assembly oriented in a generally horizontal direction and moveably connected at each end to a Y-rail assembly, the X-rail assembly movable in the Y plane along the Y-rail assemblies, a housing for a gripping mechanism mounted on the X-rail assembly and movable in the X plane along the X-rail assembly, a gripping mechanism having one or more oppositely positioned fingers mounted in the housing and movable horizontally in the Z plane for removing vended product from the columnar trays and transporting and depositing the product in the delivery port assembly; (d) removing the product container to be vended from the foremost position in the column containing the selected product containers by (i) positioning the gripping mechanism such that the fingers of the gripping mechanism are slightly above the column, (ii) extending in the Z direction the gripping mechanism forward toward the end of the selected column such that the fingers are located on either side of the foremost product container, (iii) then moving the gripper mechanism down to open the gates on the front of the tray, (iv) then closing the fingers or an alternate mechanism of the gripping mechanism against the product container, (v) then raising the container above the lip at the front of the tray, and (vi) finally retracting the gripping mechanism into the gripping mechanism housing closing the gate behind the product that has been retrieved; (e) transferring the removed product container to the delivery port assembly using the motorized positioning mechanism to align the product container over a chute mounted adjacent to the delivery port assembly; (f) dropping the product container into the chute by releasing the fingers on the gripping mechanism; and (g) delivering the product container to the customer by closing the chute thereby placing the product container into the delivery port and pivoting the delivery port open for product container retrieval.

Another aspect of the invention includes the components and methods associated with a positioning and transportation system that is capable of accurately and efficiently moving a carriage to different desired locations along the X-Y plane.

Another aspect of the invention includes the components and methods associated with a product gripping mechanism that is capable of moving in the Z direction, and that can reliably retrieve, hold and release any of a wide variety of containers of different sizes, shapes, deformabilities and/or weights.

Another aspect of the invention includes the components and methods associated with adjustably removable product support trays for holding queues of product containers, each tray designed to urge products toward one end, and having a unique gate structure at that end for selectively releasing products from the queues.

Another aspect of the invention includes the components and methods associated with a delivery port including a pivotally attached chute for receiving a product container, transferring it into an output bucket and urging it forward in the bucket for removal by a customer while preventing unauthorized access from the exterior.

Another aspect of the invention includes the components and methods associated with an environmental control system (heating or cooling) having its operational components included in a single modular unit that may be easily removed and swapped for another unit for repair or replacement.

Another aspect of the invention includes the components and methods associated with a positioning and transportation system that is capable of accurately and efficiently moving a carriage to different desired locations along the X-Y plane, and a product gripping mechanism attached to the carriage that is capable of moving in the Z direction to reliably retrieve, hold and release any of a wide variety of containers of different sizes, shapes, deformabilities and/or weights.

Another aspect of the invention includes the components and methods associated with a positioning and transportation system that is capable of accurately and efficiently moving a carriage to different desired locations along the X-Y plane; adjustably removable product support trays for holding queues of product containers, each tray designed to urge products toward one end and having a unique gate structure at that end for selectively releasing products from the queues; and a product gripping mechanism attached to the carriage that is capable of moving in the Z direction to reliably retrieve from the trays and therafter hold and release any of a wide variety of containers of different sizes, shapes, deformabilities and/or weights.

Another aspect of the invention includes the components and methods associated with a positioning and transportation system that is capable of accurately and efficiently moving a carriage to different desired locations along the X-Y plane; adjustably removable product support trays for holding queues of product containers, each tray designed to urge products toward one end and having a unique gate structure at that end for selectively releasing products from the queues; a product gripping mechanism attached to the carriage that is capable of moving in the Z direction to reliably retrieve from the trays and therafter hold and release any of a wide variety of containers of different sizes, shapes, deformabilities and/or weights; and a delivery port including a pivotally attached chute for receiving a product container from the gripping mechanism, transferring it into an output bucket and urging it forward in the bucket for removal by a customer while preventing unauthorized access from the exterior.

Another aspect of the invention includes the components and methods associated with a positioning and transportation system that is capable of accurately and efficiently moving a carriage to different desired locations along the X-Y plane; adjustably removable product support trays for holding queues of product containers, each tray designed to urge products toward one end and having a unique gate structure at that end for selectively releasing products from the queues; a product gripping mechanism attached to the carriage that is capable of moving in the Z direction to reliably retrieve from the trays and therafter hold and release any of a wide variety of containers of different sizes, shapes, deformabilities and/or weights; a delivery port including a pivotally attached chute for receiving a product container from the gripping mechanism, transferring it into an output bucket and urging it forward in the bucket for removal by a customer while preventing unauthorized access from the exterior; and an environmental control system (heating or cooling) having its operational components included in a single modular unit that may be easily removed and swapped for another unit for repair or replacement.

Another aspect of the invention includes the components and methods associated with a positioning and transportation system that is capable of accurately and efficiently moving a carriage to different desired locations along the X-Y plane, and adjustably removable product support trays for holding queues of the product containers, each tray designed to urge products toward one end and having a unique gate structure at that end for selectively releasing products from the queues.

Another aspect of the invention includes the components and methods associated with a positioning and transportation system that is capable of accurately and efficiently moving a carriage to different desired locations along the X-Y plane; adjustably removable product support trays for holding queues of the product containers, each tray designed to urge products toward one end and having a unique gate structure at that end for selectively releasing products from the queues; and a delivery port including a pivotally attached chute for receiving a product container from the gripping mechanism, transferring it into an output bucket and urging it forward in the bucket for removal by a customer while preventing unauthorized access from the exterior.

Another aspect of the invention includes the components and methods associated with a positioning and transportation system that is capable of accurately and efficiently moving a carriage to different desired locations along the X-Y plane; adjustably removable product support trays for holding queues of the product containers, each tray designed to urge products toward one end and having a unique gate structure at that end for selectively releasing products from the queues; a delivery port including a pivotally attached chute for receiving a product container from the gripping mechanism, transferring it into an output bucket and urging it forward in the bucket for removal by a customer while preventing unauthorized access from the exterior; and an environmental control system (heating or cooling) having its operational components included in a single modular unit that may be easily removed and swapped for another unit for repair or replacement.

Another aspect of the invention includes the components and methods associated with a positioning and transportation system that is capable of accurately and efficiently moving a carriage to different desired locations along the X-Y plane, and a delivery port including a pivotally attached chute for receiving a product container from the gripping mechanism, transferring it into an output bucket and urging it forward in the bucket for removal by a customer while preventing unauthorized access from the exterior.

Another aspect of the invention includes the components and methods associated with a positioning and transportation system that is capable of accurately and efficiently moving a carriage to different desired locations along the X-Y plane; a delivery port including a pivotally attached chute for receiving a product container from the gripping mechanism, transferring it into an output bucket and urging it forward in the bucket for removal by a customer while preventing unauthorized access from the exterior; and an environmental control system (heating or cooling) having its operational components included in a single modular unit that may be easily removed and swapped for another unit for repair or replacement.

Another aspect of the invention includes the components and methods associated with a positioning and transportation system that is capable of accurately and efficiently moving a carriage to different desired locations along the X-Y plane, and an environmental control system (heating or cooling) having its operational components included in a single modular unit that may be easily removed and swapped for another unit for repair or replacement.

Another aspect of the invention includes the components and methods associated with a positioning and transportation system that is capable of accurately and efficiently moving a carriage to different desired locations along the X-Y plane, a product gripping mechanism attached to the carriage that is capable of moving in the Z direction to reliably retrieve, hold and release any of a wide variety of containers of different sizes, shapes, deformabilities and/or weights, and a delivery port including a pivotally attached chute for receiving a product container from the gripping mechanism, transferring it into an output bucket and urging it forward in the bucket for removal by a customer while preventing unauthorized access from the exterior.

Another aspect of the invention includes the components and methods associated with a positioning and transportation system that is capable of accurately and efficiently moving a carriage to different desired locations along the X-Y plane, a product gripping mechanism attached to the carriage that is capable of moving in the Z direction to reliably retrieve, hold and release any of a wide variety of containers of different sizes, shapes, deformabilities and/or weights; a delivery port including a pivotally attached chute for receiving a product container from the gripping mechanism, transferring it into an output bucket and urging it forward in the bucket for removal by a customer while preventing unauthorized access from the exterior; and an environmental control system (heating or cooling) having its operational components included in a single modular unit that may be easily removed and swapped for another unit for repair or replacement.

Another aspect of the invention includes the components and methods associated with a positioning and transportation system that is capable of accurately and efficiently moving a carriage to different desired locations along the X-Y plane, a product gripping mechanism attached to the carriage that is capable of moving in the Z direction to reliably retrieve, hold and release any of a wide variety of containers of different sizes, shapes, deformabilities and/or weights; and an environmental control system (heating or cooling) having its operational components included in a single modular unit that may be easily removed and swapped for another unit for repair or replacement.

Another aspect of the invention includes the components and methods associated with a positioning and transportation system that is capable of accurately and efficiently moving a carriage to different desired locations along the X-Y plane; adjustably removable product support trays for holding queues of the product containers, each tray designed to urge products toward one end and having a unique gate structure at that end for selectively releasing products from the queues; and an environmental control system (heating or cooling) having its operational components included in a single modular unit that may be easily removed and swapped for another unit for repair or replacement.

Another aspect of the invention includes the components and methods associated with a product gripping mechanism that is capable of reliably retrieving, holding and releasing any of a wide variety of containers of different sizes, shapes, deformabilities and/or weights, and adjustably removable product support trays for holding queues of the product containers, each tray designed to urge products toward one end and having a unique gate structure at that end for selectively releasing products from the queues to the gripping mechanism.

Another aspect of the invention includes the components and methods associated with a product gripping mechanism that is capable of reliably retrieving, holding and releasing any of a wide variety of containers of different sizes, shapes, deformabilities and/or weights; adjustably removable product support trays for holding queues of the product containers, each tray designed to urge products toward one end and having a unique gate structure at that end for selectively releasing products from the queues to the gripping mechanism; and a delivery port including a pivotally attached chute for receiving a product container from the gripping mechanism, transferring it into an output bucket and urging it forward in the bucket for removal by a customer while preventing unauthorized access from the exterior.

Another aspect of the invention includes the components and methods associated with a product gripping mechanism that is capable of reliably retrieving, holding and releasing any of a wide variety of containers of different sizes, shapes, deformabilities and/or weights, and a delivery port including a pivotally attached chute for receiving a product container from the gripping mechanism, transferring it into an output bucket and urging it forward in the bucket for removal by a customer while preventing unauthorized access from the exterior.

Another aspect of the invention includes the components and methods associated with a product gripping mechanism that is capable of reliably retrieving, holding and releasing any of a wide variety of containers of different sizes, shapes, deformabilities and/or weights; a delivery port including a pivotally attached chute for receiving a product container from the gripping mechanism, transferring it into an output bucket and urging it forward in the bucket for removal by a customer while preventing unauthorized access from the exterior; and an environmental control system (heating or cooling) having its operational components included in a single modular unit that may be easily removed and swapped for another unit for repair or replacement.

Another aspect of the invention includes the components and methods associated with a product gripping mechanism that is capable of reliably retrieving, holding and releasing any of a wide variety of containers of different sizes, shapes, deformabilities and/or weights, and an environmental control system (heating or cooling) having its operational components included in a single modular unit that may be easily removed and swapped for another unit for repair or replacement.

Another aspect of the invention includes the components and methods associated with adjustably removable product support trays for holding queues of product containers, each tray designed to urge products toward one end, and having a unique gate structure at that end for selectively releasing products from the queues, and a delivery port including a pivotally attached chute for receiving a product container, transferring it into an output bucket and urging it forward in the bucket for removal by a customer while preventing unauthorized access from the exterior.

Another aspect of the invention includes the components and methods associated with adjustably removable product support trays for holding queues of product containers, each tray designed to urge products toward one end, and having a unique gate structure at that end for selectively releasing products from the queues; a delivery port including a pivotally attached chute for receiving a product container, transferring it into an output bucket and urging it forward in the bucket for removal by a customer while preventing unauthorized access from the exterior; and an environmental control system (heating or cooling) having its operational components included in a single modular unit that may be easily removed and swapped for another unit for repair or replacement.

Another aspect of the invention includes the components and methods associated with adjustably removable product support trays for holding queues of product containers, each tray designed to urge products toward one end, and having a unique gate structure at that end for selectively releasing products from the queues, and an environmental control system (heating or cooling) having its operational components included in a single modular unit that may be easily removed and swapped for another unit for repair or replacement.

Another aspect of the invention includes the components and methods associated with a delivery port including a pivotally attached chute for receiving a product container, transferring it into an output bucket and urging it forward in the bucket for removal by a customer while preventing unauthorized access from the exterior, and an environmental control system (heating or cooling) having its operational components included in a single modular unit that may be easily removed and swapped for another unit for repair or replacement.

It is therefore an object of the present invention to provide a vending machine that is capable of storing, retrieving and delivering product containers having any of a wide variety of sizes, shapes, deformabilities and/or weights.

It is also an object of the present invention to provide a vending machine that is capable of simultaneously storing product containers having any of a wide variety of different sizes, shapes, deformabilities and/or weights, and retrieving and delivering any of such containers.

It is also an object of the present invention to provide a vending machine that allows the customer to view the products available for vending through a transparent front panel.

It is also an object of the present invention to provide a vending machine having front-facing racks or shelves that can be easily restocked from their rear ends forward.

It is another object of the present invention to provide a gripping mechanism for use in a vending machine that is capable of retrieving and delivering product containers having any of a wide variety of different sizes, shapes, deformabilities and/or weights.

It is also an object of the present invention to provide a gripping mechanism having movable fingers for securely grasping containers of different sizes, shapes, deformabilities and/or weights.

It is also an object of the present invention to provide a gripping mechanism for reliably retrieving, holding and releasing product containers of different sizes, shapes, deformabilities and/or weights.

It is also an object of the present invention to provide a gripping mechanism for transporting product containers of different sizes, shapes, deformabilities and/or weights from the ends of their respective queues to a delivery area inside a vending machine.

It is also an object of the present invention to provide a gripping mechanism that works in conjunction with one or more gates located at the ends of trays containing product containers to remove the endmost product container from each such tray.

It is another object of the present invention to provide a positioning system for moving a carriage along the X-Y plane.

It is also an object of the present invention to provide an X-Y positioning system for use in a vending machine including a pair of adjustably positionable Y-rails supporting a moveable X-rail that supports a carriage that is moveable along the X-rail for transporting product containers inside the machine.

It is also an object of the present invention to provide a positioning system for use in a vending machine that is capable of moving along the X-Y plane adjacent to any of the product queues inside the machine, and to a delivery port.

It is also an object of the present invention to provide a positioning system for use in a vending machine that may be mounted in the cabinet or door of the machine.

It is also an object of the present invention to provide a positioning system for use in a vending machine that supports a product gripping mechanism for retrieval, transport and delivery of product containers inside the machine.

It is another object of the present invention to provide adjustable shelves supporting product trays for use in a vending machine that extend from the back to the front of the machine establishing queues of product containers that urge the products forward in the trays.

It is also an object of the present invention to provide product support shelves and trays for use in a vending machine that may be positioned in different locations inside the machine in order to accommodate product containers of different heights, sizes and shapes.

It is also an object of the present invention to provide product trays for use in a vending machine having one or more moveable gates at their ends to prevent products from exiting each tray until moved aside to allow the endmost product to be removed from the tray.

It is another object of the present invention to provide a delivery port for use in a vending machine for receiving a product container from within the machine and delivering it to the outside while preventing unauthorized access to the interior of the machine through the port.

It is also an object of the present invention to provide a delivery port for use in a vending machine having a closable chute through which a product container is received, the chute closing after receipt to prevent unauthorized access to the interior of the machine.

It is also an object of the present invention to provide a delivery port for use in a vending machine that is positioned in a comfortable location for retrieval of a vended product by a customer.

It is another object of the present invention to provide a modular component parts for use in a vending machine that may be easily removed from the machine and replaced in the field.

It is also an object of the present invention to provide a vending machine having easily removable and replaceable component parts so that a working component part may be quickly swapped for a failing one, minimizing the down time of the machine.

It is also an object of the present invention to provide a modular environmental control system and other component parts for use in a vending machine providing the ability to quickly remove and replace such component parts to reduce the length of time that the vending machine must be opened for access, thereby preserving the temperature of the products inside.

Additional objects of the invention will be apparent from the detailed descriptions and the claims herein.

BRIEF DESCRIPTION OF THE DRAWINGS

FIG. 4 is a perspective view of the door of FIG. 3 viewed from the outside looking in.

FIG. 6 is a perspective view of the door of FIG. 5 viewed from the outside looking in.

DETAILED DESCRIPTION

An exemplary embodiment of the invention is described herein in the context of vending exemplary bottled products having containers that are elongated in the vertical direction and round in cross-section (e.g., containers such as those illustrated FIGS. 38 and 39), to provide a convenient point of reference. However, the vending machine, component parts and methods of the present invention are not restricted to any particular container kind, size, shape or deformability, and the context provided for describing the exemplary embodiment is not intended to limit the scope of the invention, its components and/or methods, nor to limit application of any of the invention, its components and/or methods to the particular embodiment or containers described, nor should it so be construed.

Figure 1:
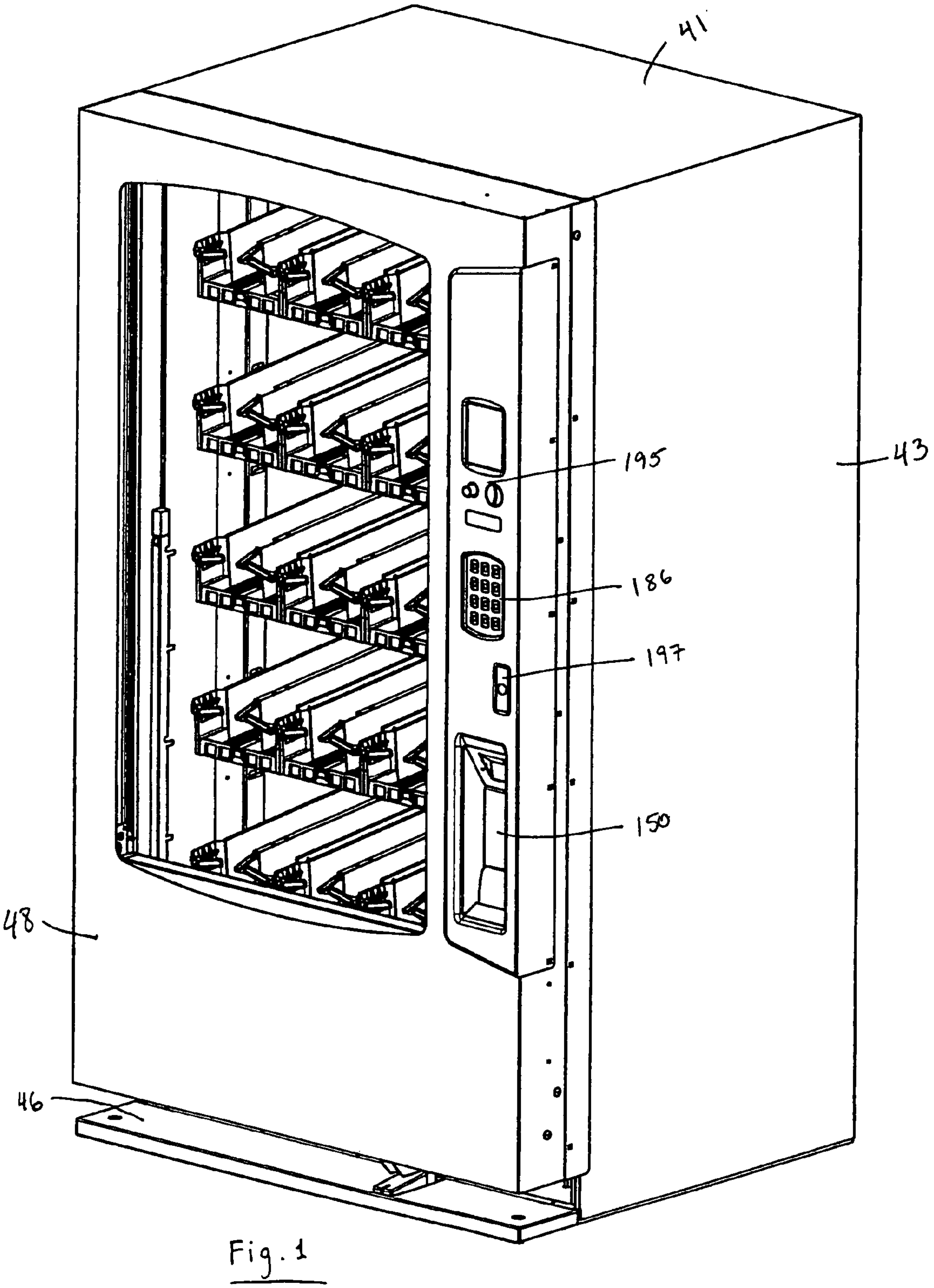
FIG. 1 is a front perspective view of a vending machine of the present invention viewed from the right side.
Figure 2:
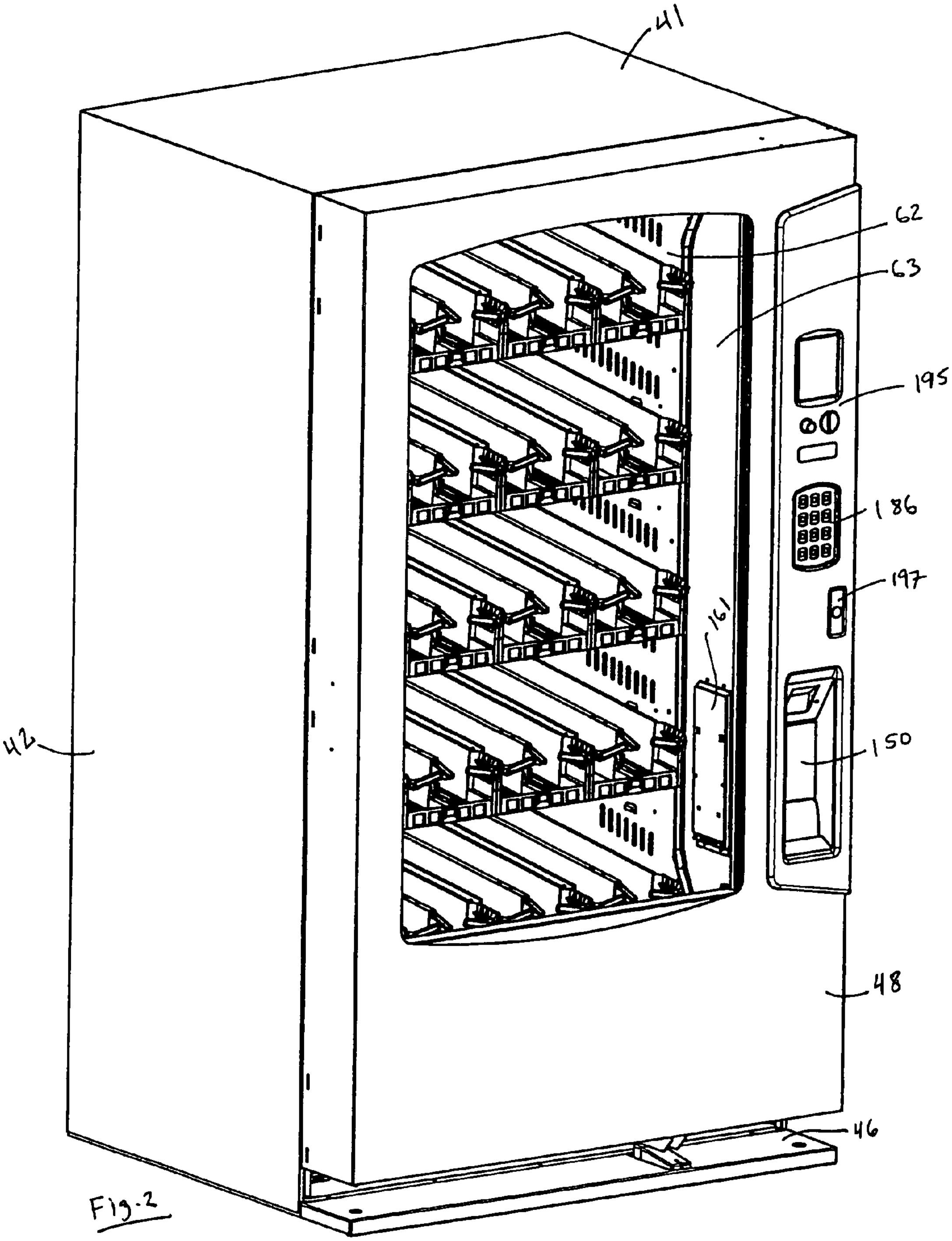
FIG. 2 is a front perspective view of a vending machine of FIG. 1 viewed from the left side.
Figure 3:
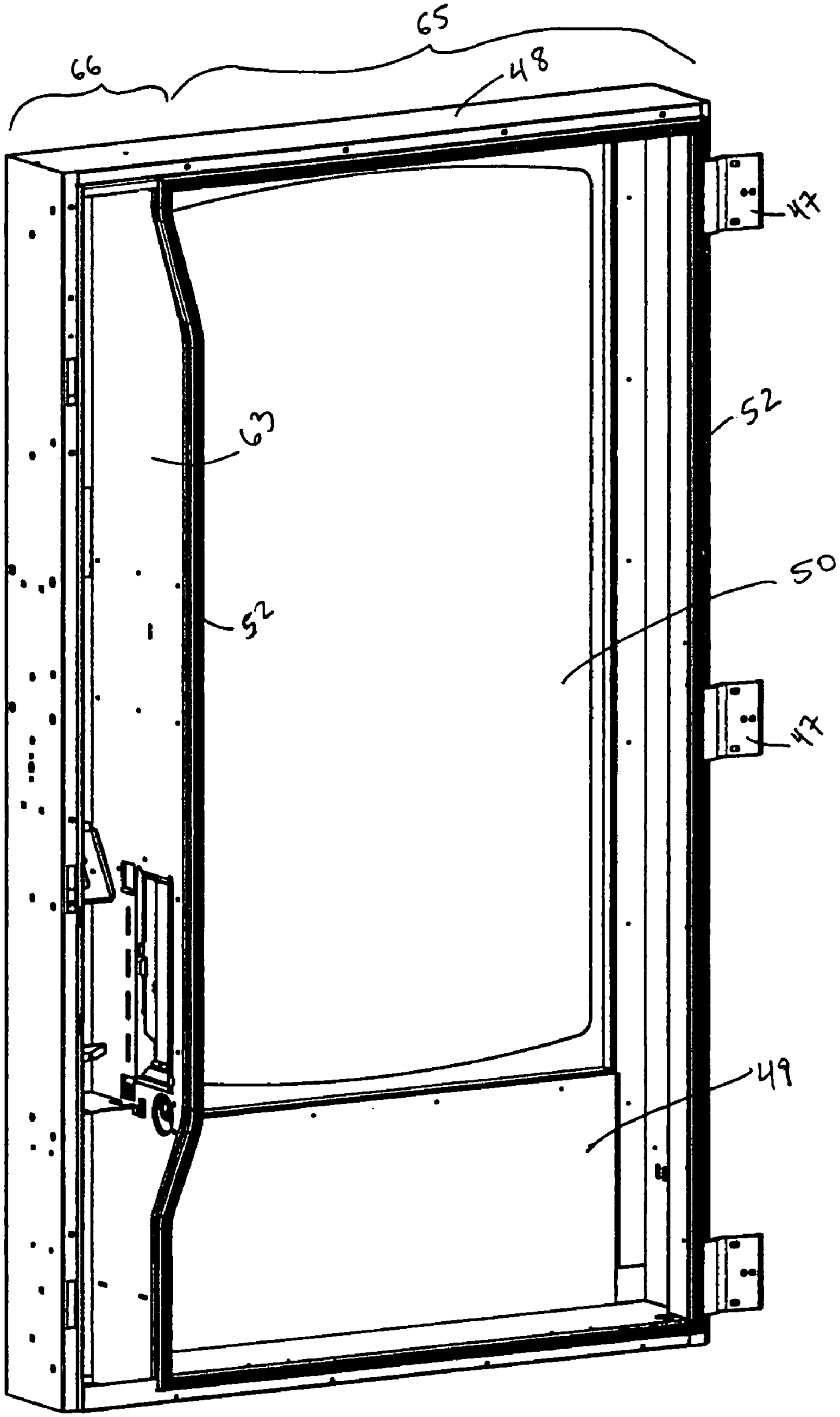
FIG. 3 is a perspective view of a door of a vending machine of the present invention viewed from the inside looking out.
Figure 5:
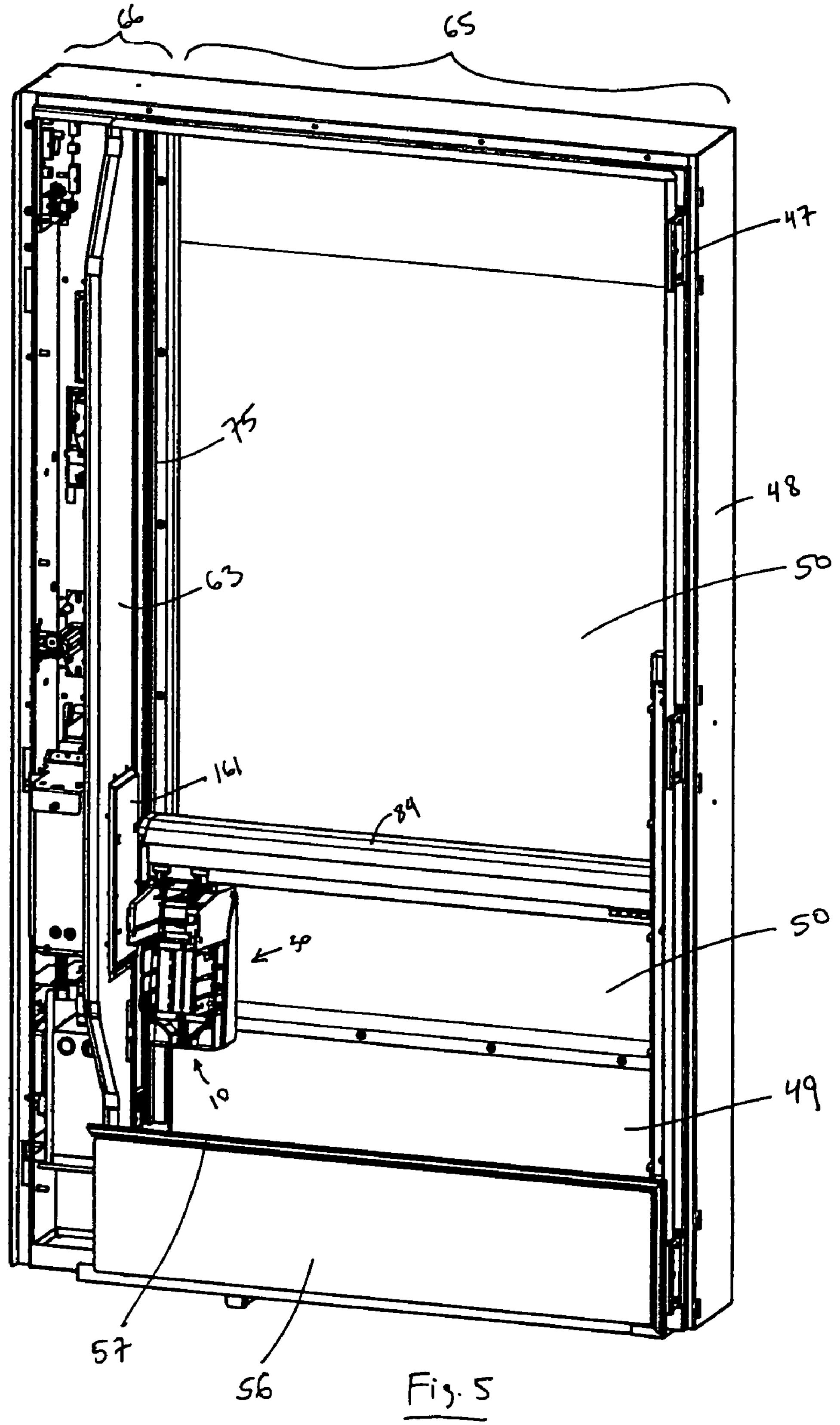
FIG. 5 is a perspective view of a door including components of a vending machine of the present invention viewed from the inside looking out.
Figure 6:
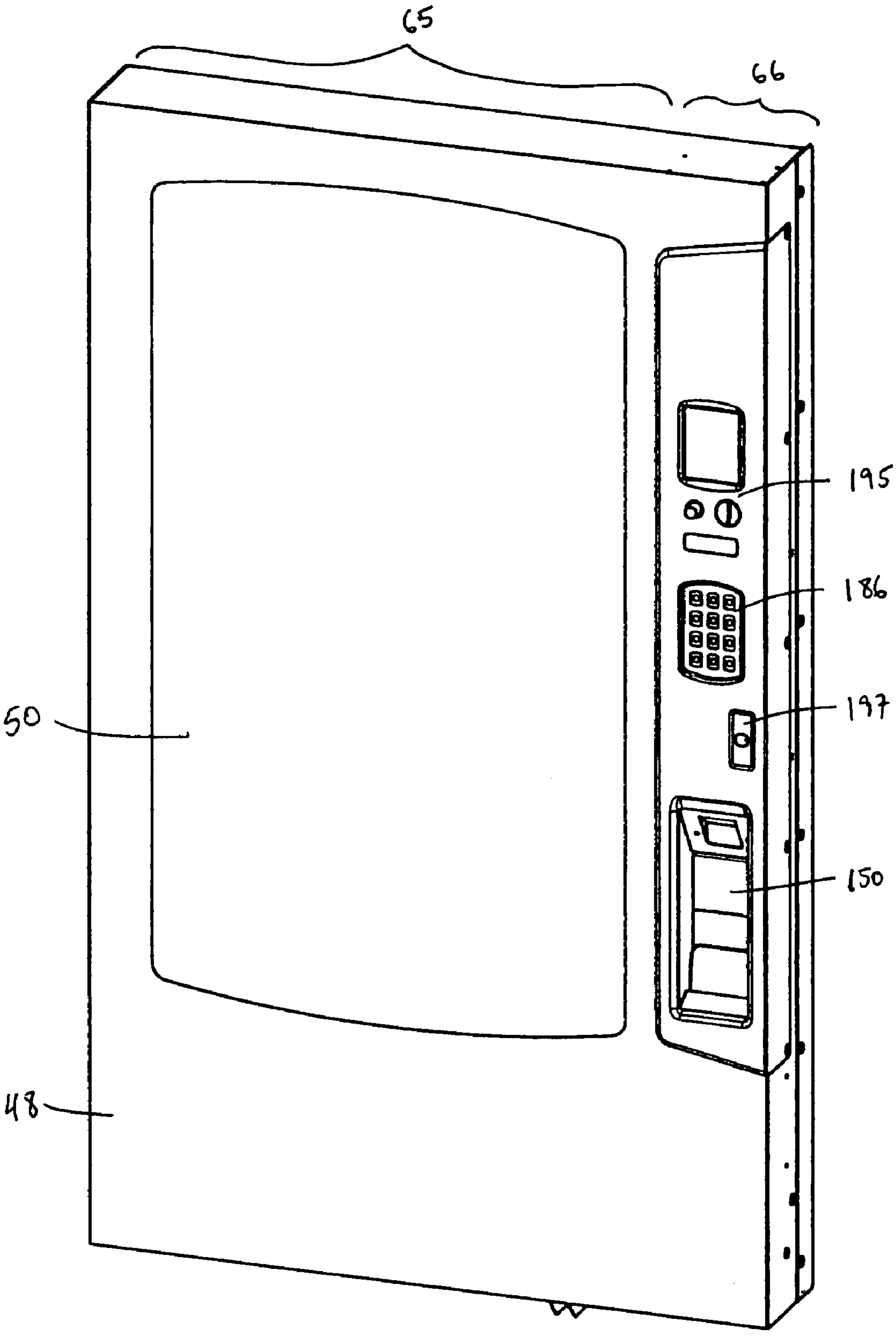
Figure 7:
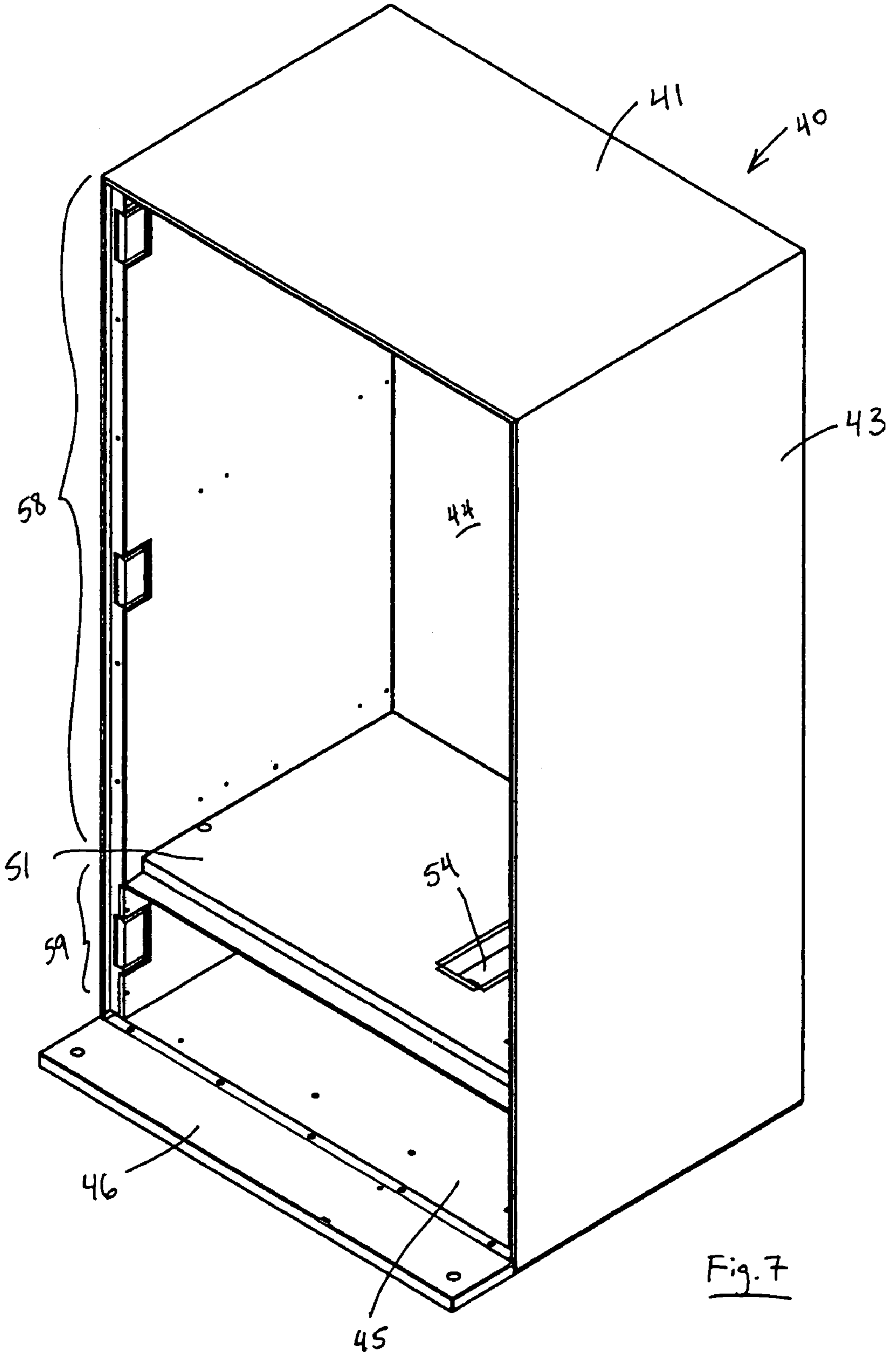
FIG. 7 is a front perspective view of a cabinet for a vending machine of the present invention without door viewed from the right side.
Figure 21:
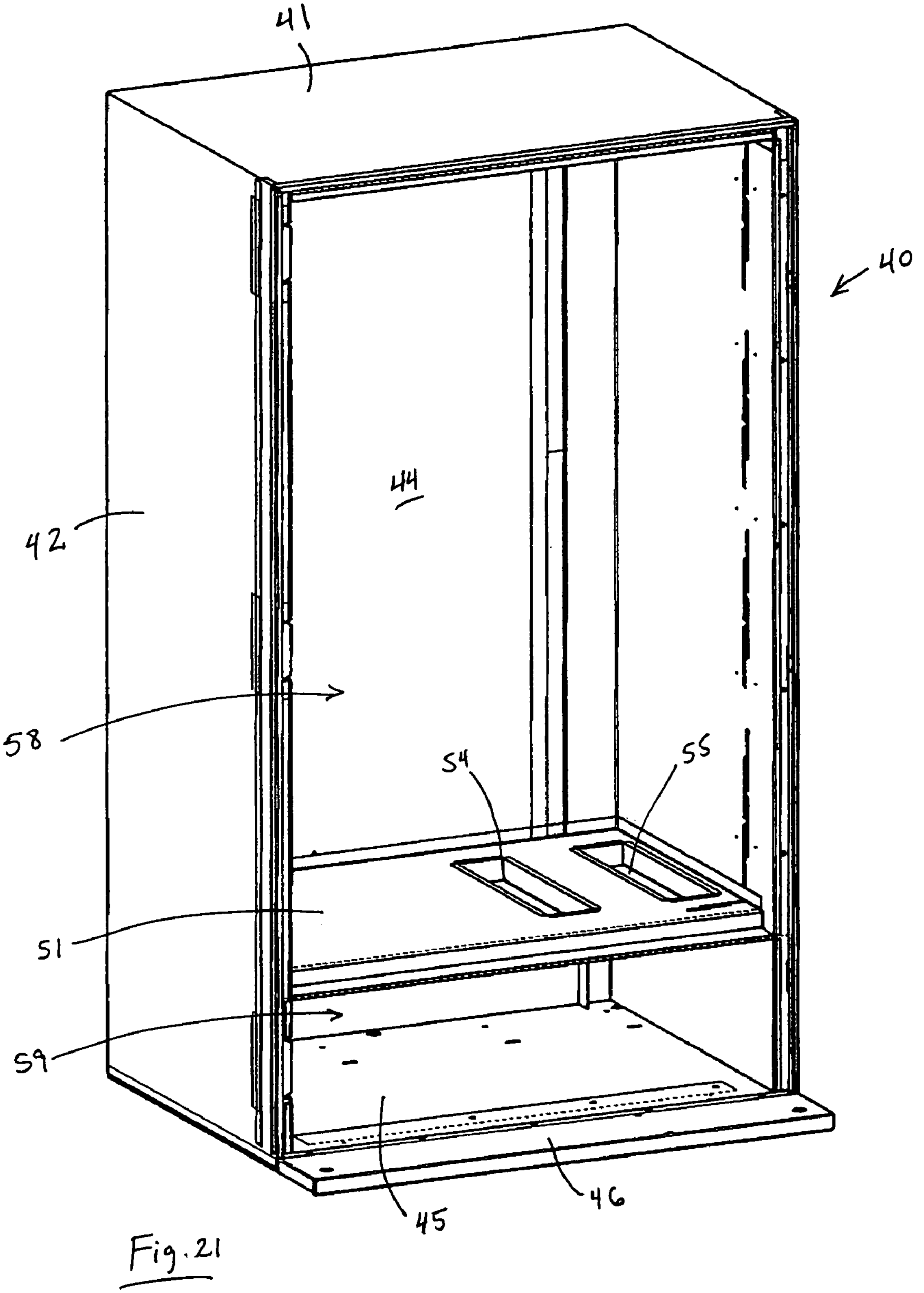
FIG. 21 is a front perspective view of a cabinet for a vending machine of the present invention without door viewed from the left side.
Figure 34:
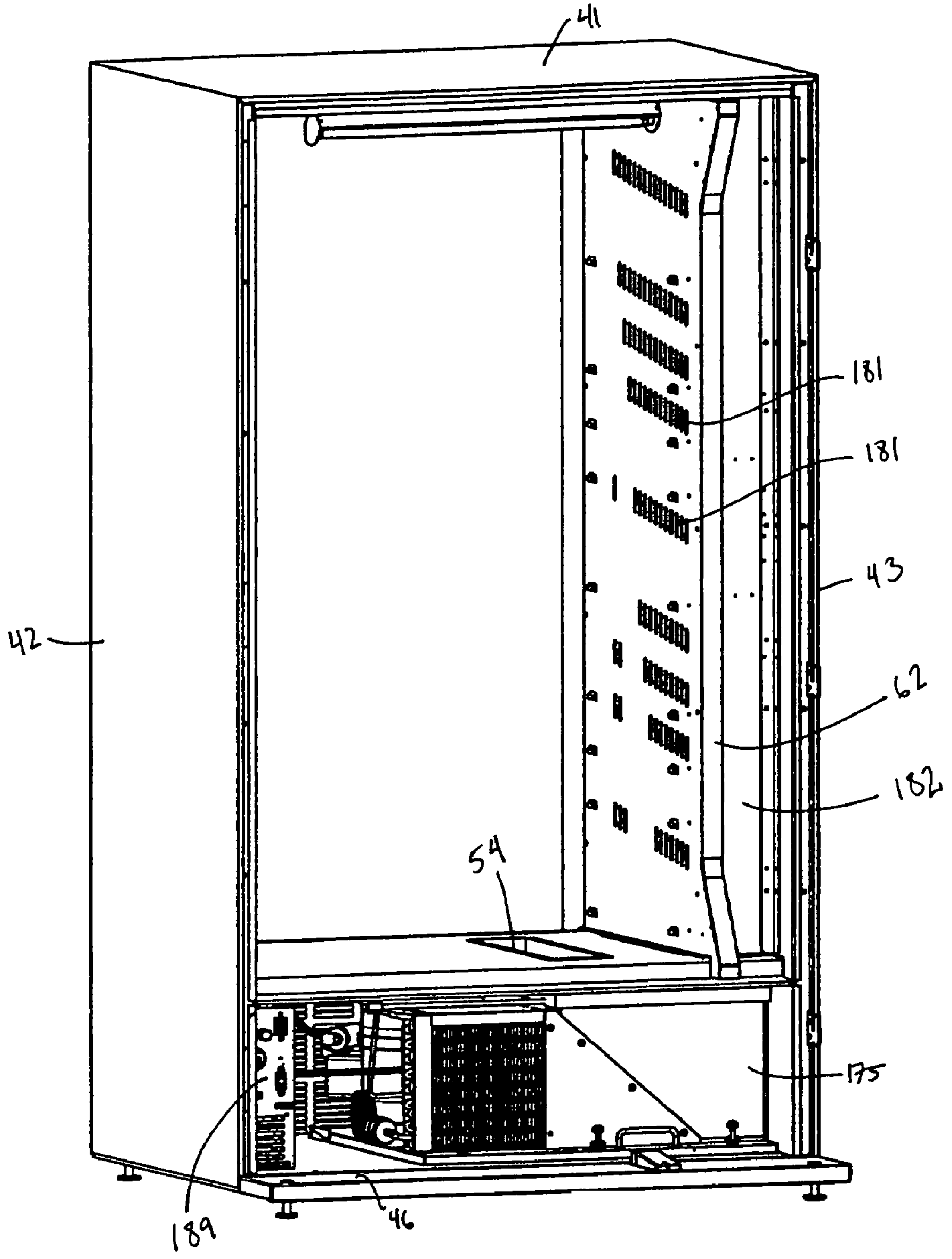
FIG. 34 is a front perspective view of an open cabinet for a vending machine of the present invention with environmental control system but without door viewed from the left side.
Figure 35:
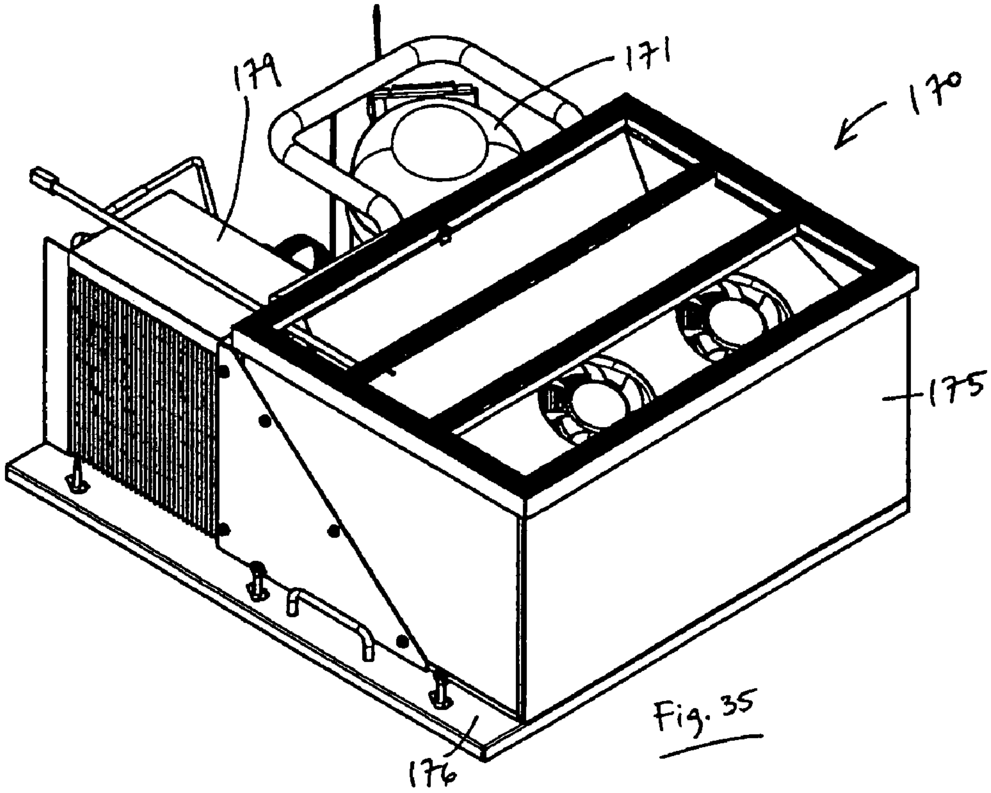
FIG. 35 is a left side perspective view of an environmental control system of the present invention.
Figure 36:
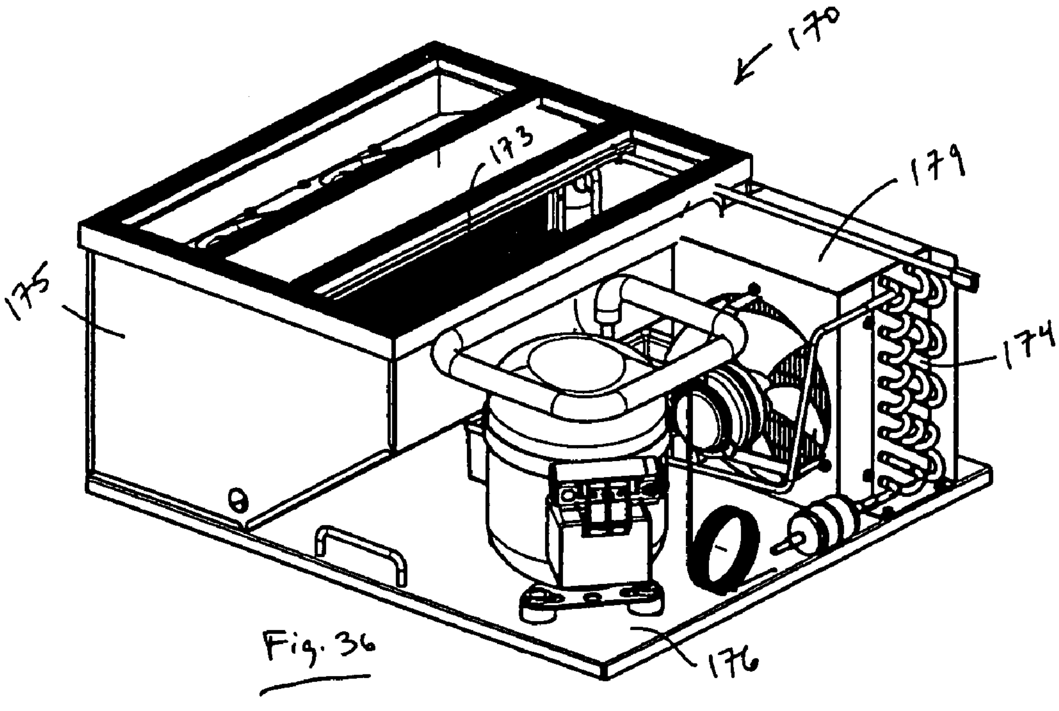
FIG. 36 is a right side perspective view of the environmental control system of FIG. 35.
Figure 37:
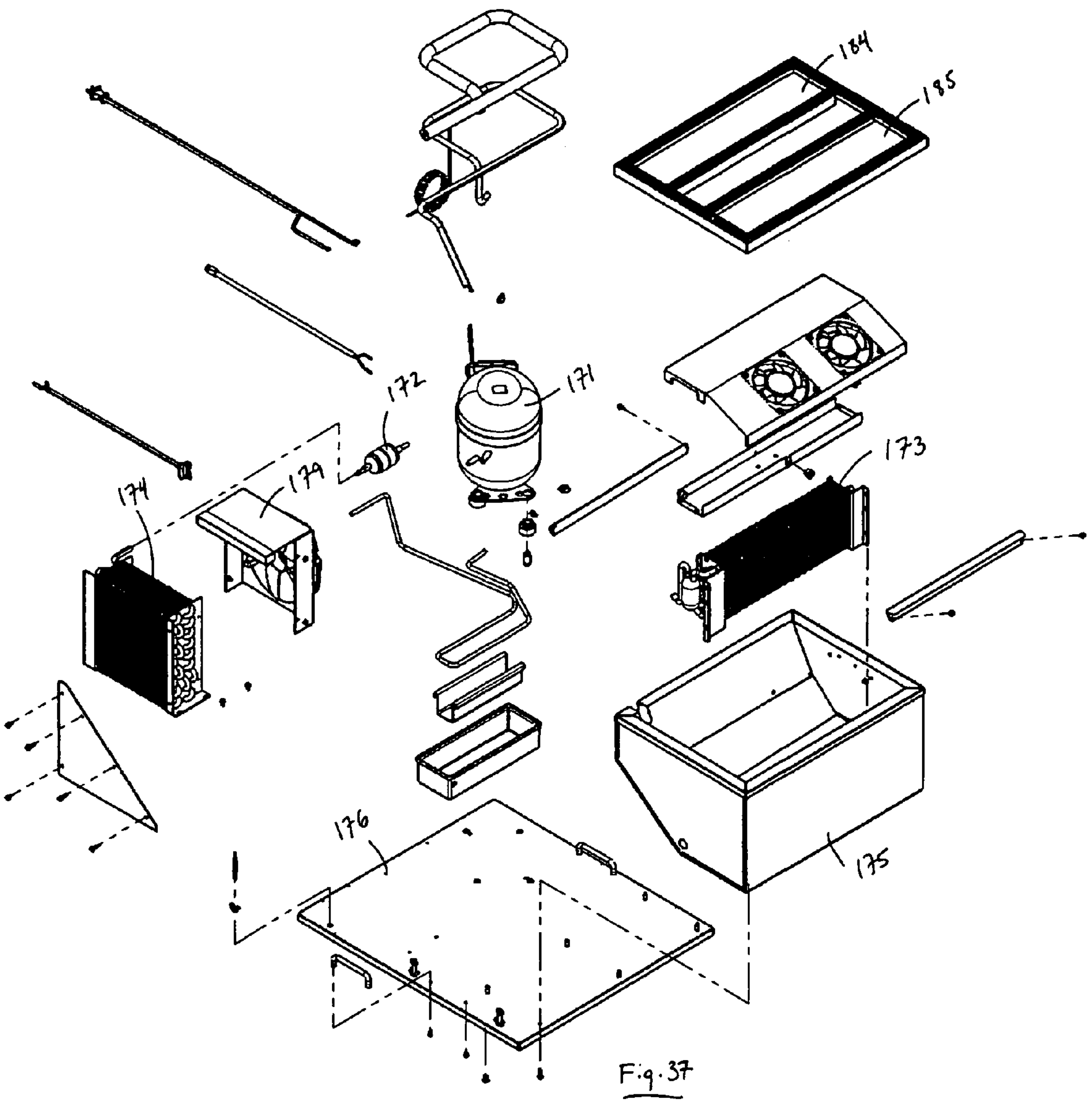
FIG. 37 is an exploded view of the environmental control system of FIG. 35.

Referring then to the drawings, wherein like reference characters designate like or corresponding parts throughout the several views, it is seen that an exemplary cabinet for a vending machine of the present invention is illustrated in FIGS. 1-7, 21-24 and 40. Referring particularly to FIGS. 7 and 21, it is seen that cabinet 40 includes an exterior top panel 41, left side panel 42, right side panel 43, back panel 44, and bottom (floor) panel 45. A removable extension panel 46 is also provided at the floor of the cabinet 40 extending out from the front thereof below the door 48 as shown in FIGS. 1 and 2. An insulated dividing wall or bulkhead 51 is provided inside cabinet 40 separating the interior into an upper chamber 58 and a lower chamber 59. Referring to FIG. 34, an interior panel 62 is provided on the right side of the upper chamber 58, defining a plenum behind wall 182 between panel 62 and exterior panel 43. Panels 41-43, 182 and the other walls of the upper chamber 58 are insulated so that products may be stored in chamber 58 at controlled temperatures. The lower chamber 59 is designed to hold a modular climate control apparatus, as described more fully below. One or more openings 54 and 55 are provided in wall 51 to allow the flow of air between the lower chamber 59 and the upper chamber 58.

Figure 4:
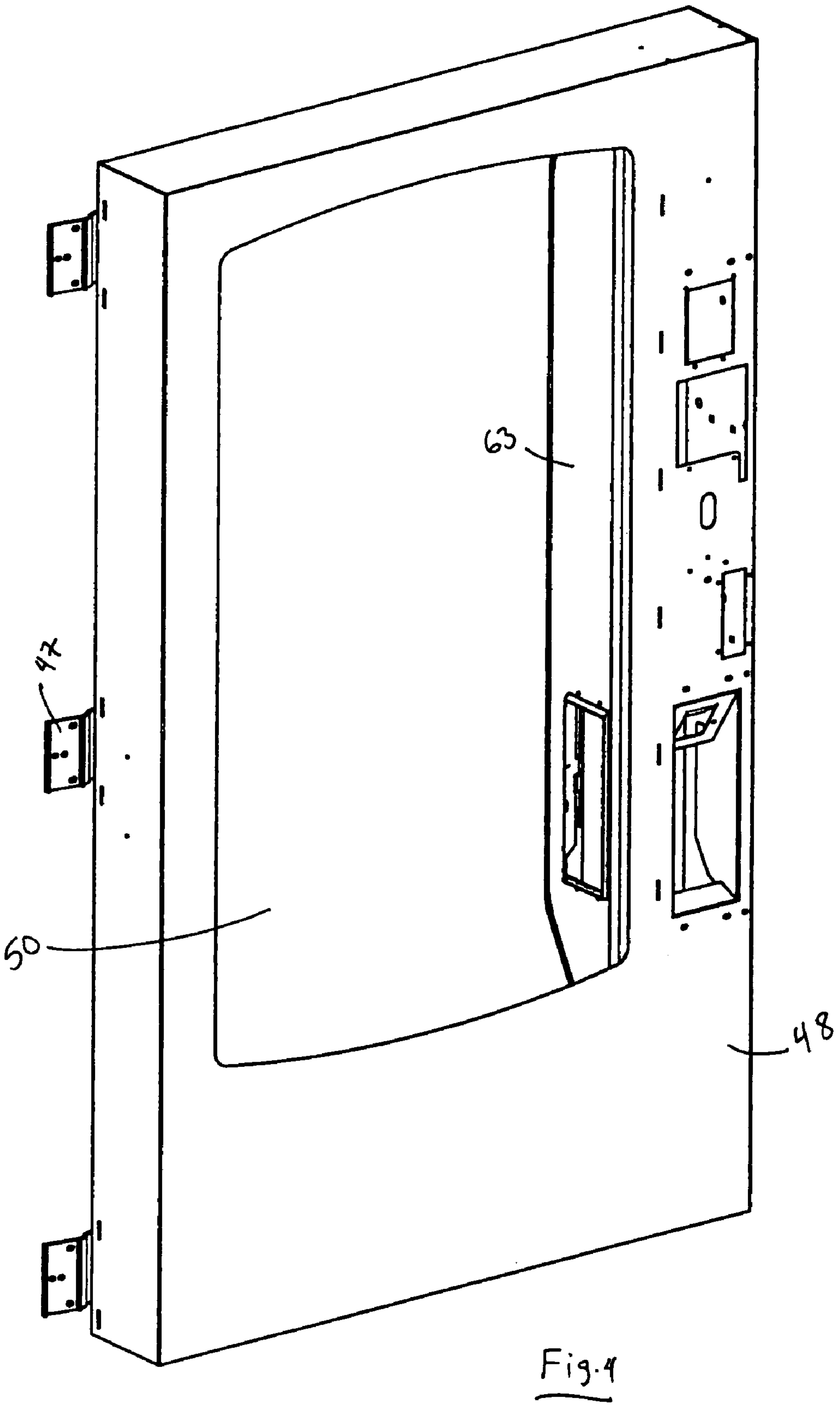
Figure 22:
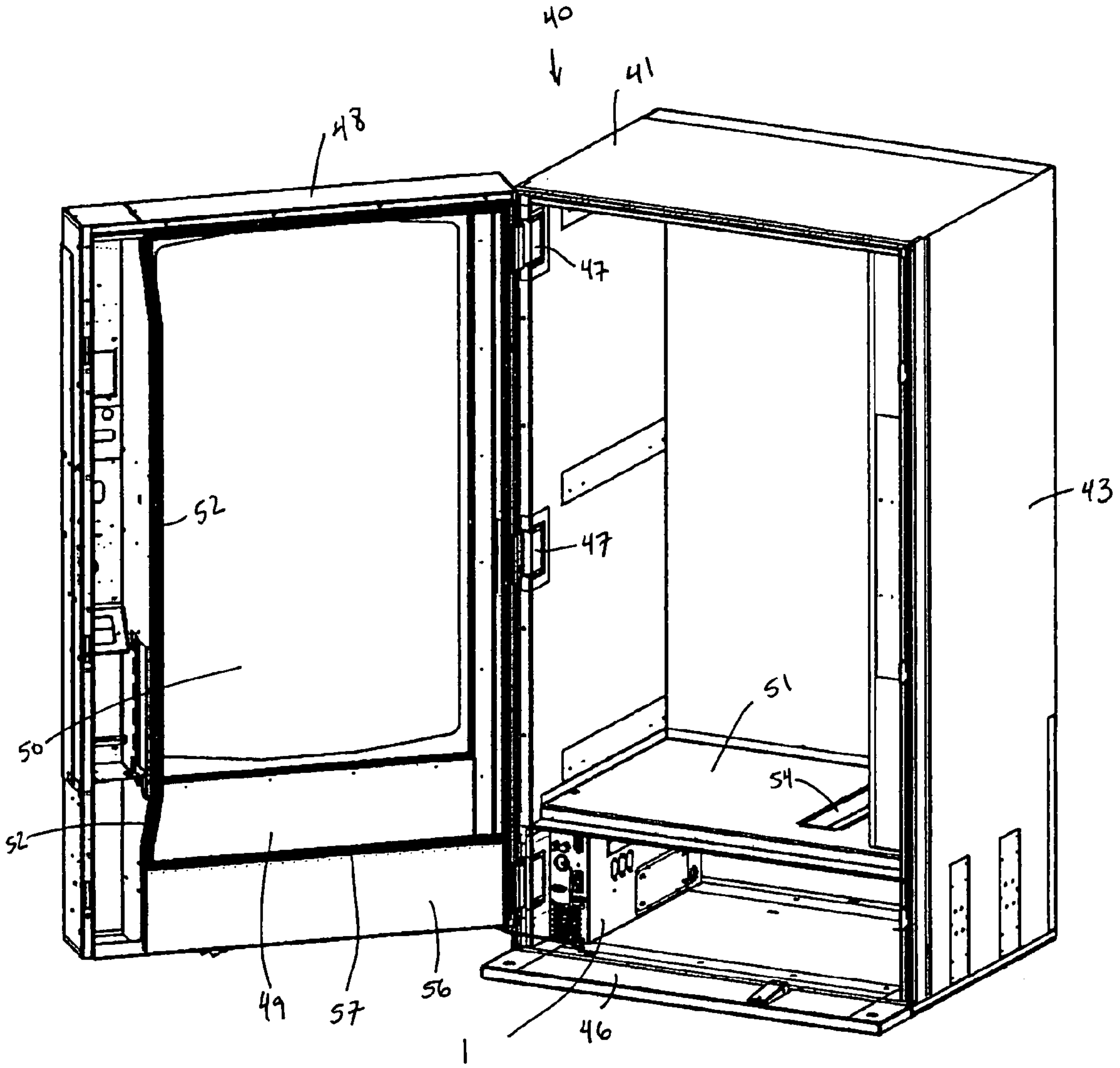
FIG. 22 is a front perspective view of an open cabinet and door for a vending machine of the present invention without trays or shelves viewed from the left side.
Figure 23:
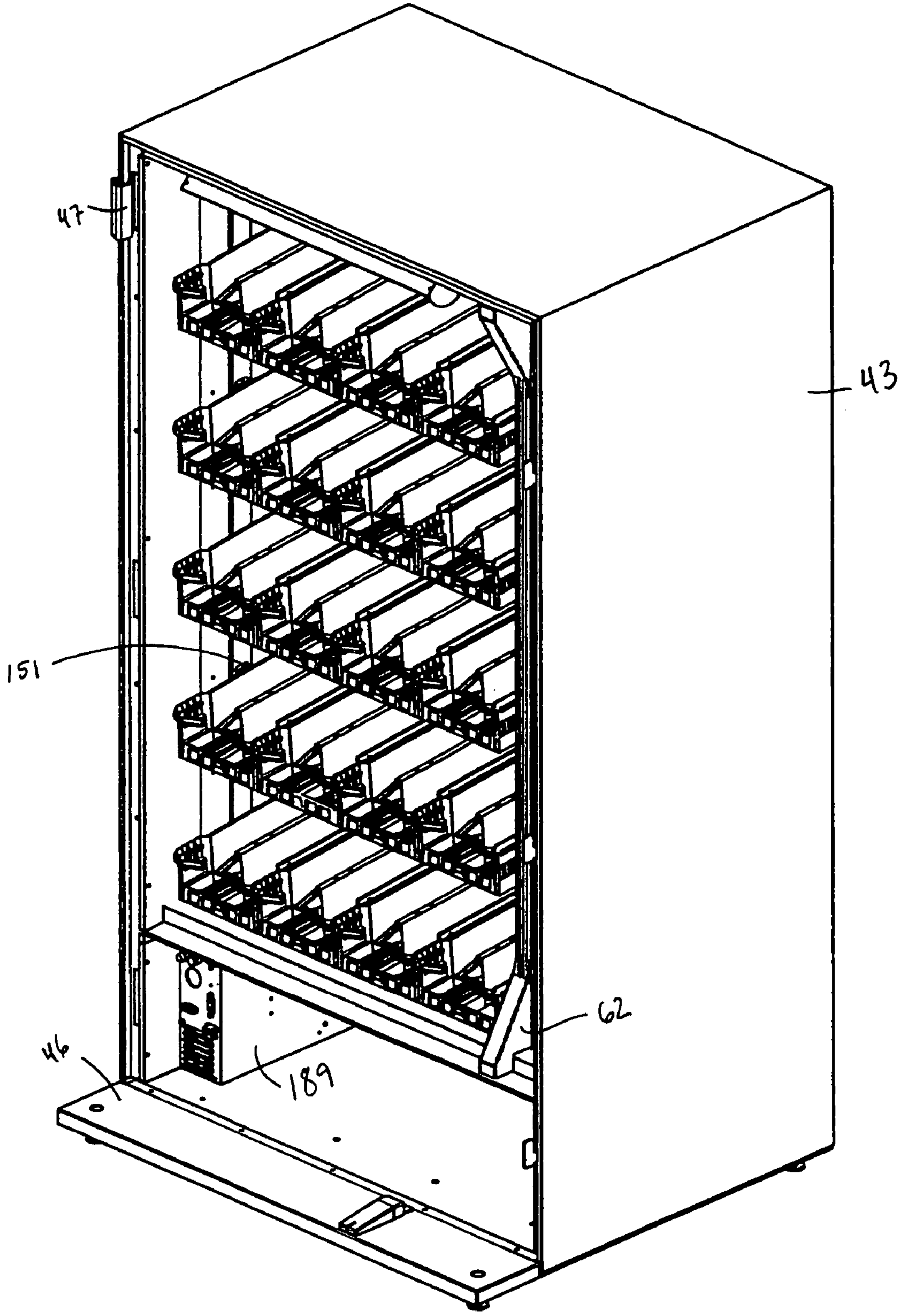
FIG. 23 is a front perspective view of a cabinet for a vending machine of the present invention with trays and shelves but without door viewed from the right side.
Figure 24:
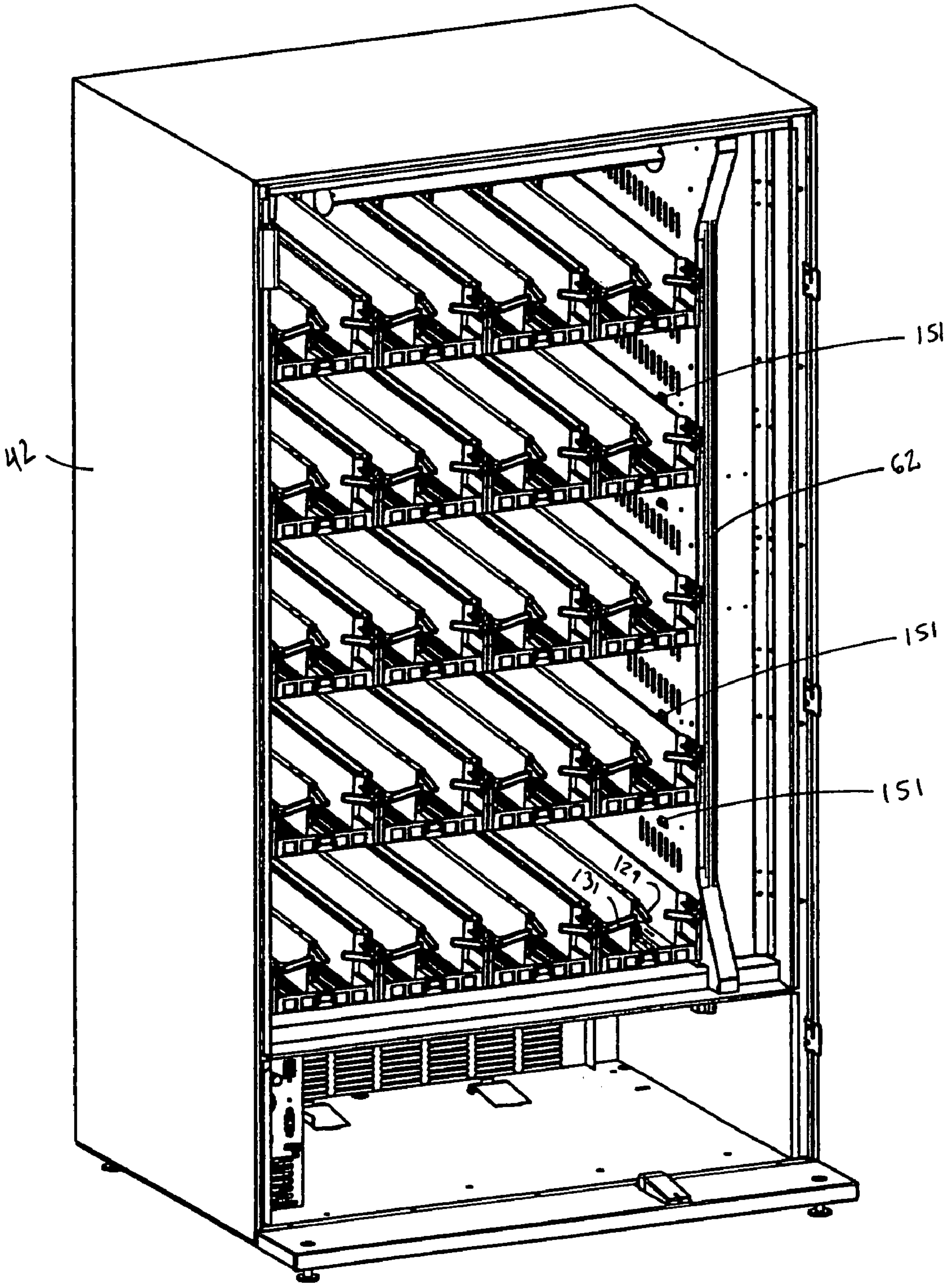
FIG. 24 is a front perspective view of the cabinet of FIG. 23 viewed from the left side.

An insulated door 48 is attached to the front of cabinet 40 as shown in FIG. 22, preferably using hinges 47 or other suitable mounting devices. A transparent panel 50 is provided in the upper portion of door 48 generally corresponding to upper chamber 58 so that a customer may view the interior of chamber 58 from the outside (see FIGS. 1 and 2). As shown in FIGS. 4-6, door 48 is divided into left side 65 and right side 66 compartments by insulated wall 63. The larger left side compartment 65 corresponds generally to the upper chamber 58 bounded by interior wall 62, and the smaller right side compartment 66 corresponds generally to the portion of the upper chamber between interior wall 62 and exterior wall 43. The left side compartment 65 includes transparent panel 50. The right side compartment 66 houses, among other things, the product delivery port mechanism, generally 150, the product selection electronics, generally 186, the money acceptance system, generally 195, and the locking mechanism, generally 197.

A lower insulated panel 49 is provided in the front of door 48 below panel 50 corresponding generally to lower chamber

59. Another insulated panel 56 that includes a gasket 57 is provided adjacent to lower panel 49. The gap between panels 49 and 56 is of sufficient size to receive the moveable X-rail, a housing 30 and a gripper mechanism 10 when not in use, as shown in FIG. 5 and described more fully below. When closed, door 48 fits flush against the top and side panels 41-43 of cabinet 40. The gasket 57 of insulated panel 56 fits flush against the corresponding edge of insulated dividing wall 51. A seal 52 is provided inside door 48 as shown in FIG. 22 which seals against the inside edges of top and side panels 41 and 42, against panel 56 (compare to FIG. 3), and against the edge of interior panel 62. Thus, when door 48 is closed, upper chamber 58 is completely insulated (except for openings 54 and 55), including the gap area holding the housing 30 and gripper mechanism 10.

A base panel 46 is provided that may be detached from the cabinet base, such that when panel 46 is removed and the vending machine door opened, the machine may be rotatably angled through an entryway that is narrower than the depth of the vending machine. This allows for moving the large vending machine of the preferred embodiment through a standard doorway.

Figure 8:
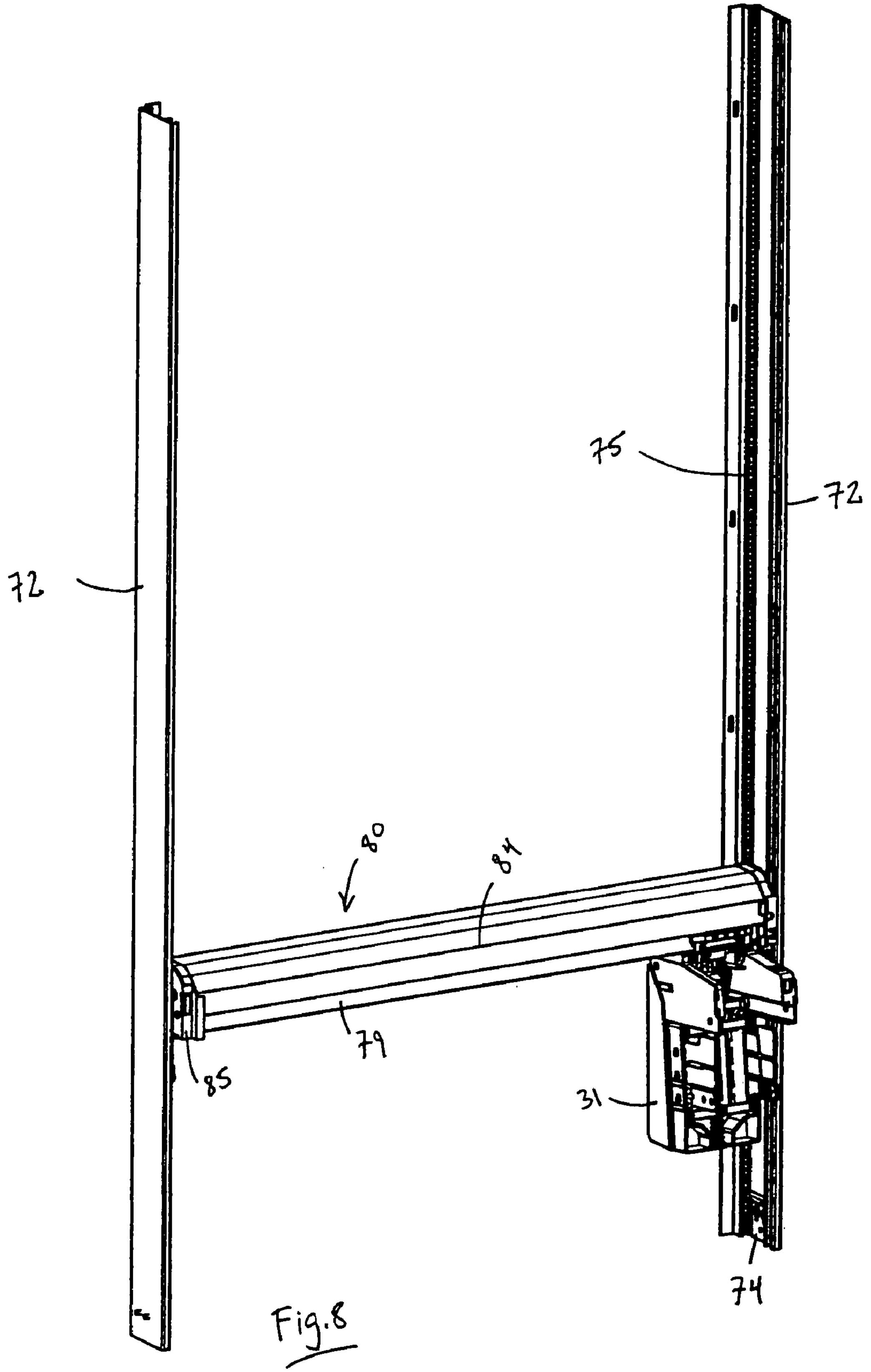
FIG. 8 is a rear perspective view illustrating the components of a positioning system of the present invention.

Mounted inside door 48 is a positioning system that is capable of moving throughout a plane defined by X and Y axes. The X-Y positioning system is mounted inside door 48, as shown in FIG. 5. The X-plane is oriented horizontally with respect to the door. The Y-plane is oriented vertically with respect to the door. There is also a Z-plane that extends orthogonally from the X and Y planes in the direction of the rear wall. An isolated view of the X-Y positioning system is illustrated in FIG. 8.

Figure 13:
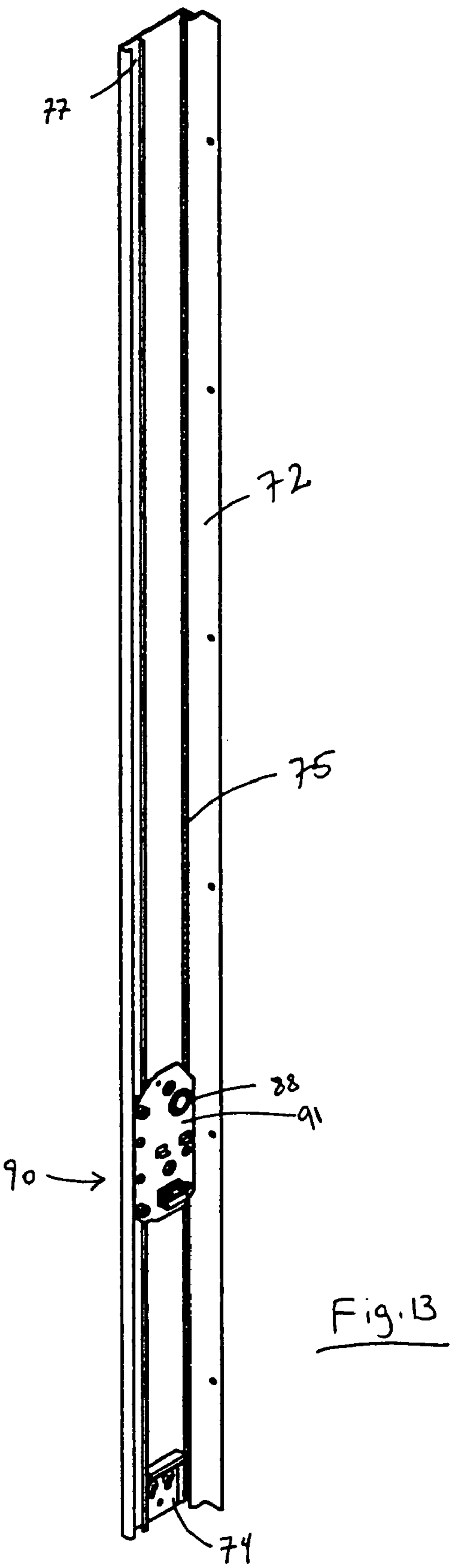
FIG. 13 is a side perspective view of a support rail (Y rail) of the present invention, including a support assembly.
Figure 14:
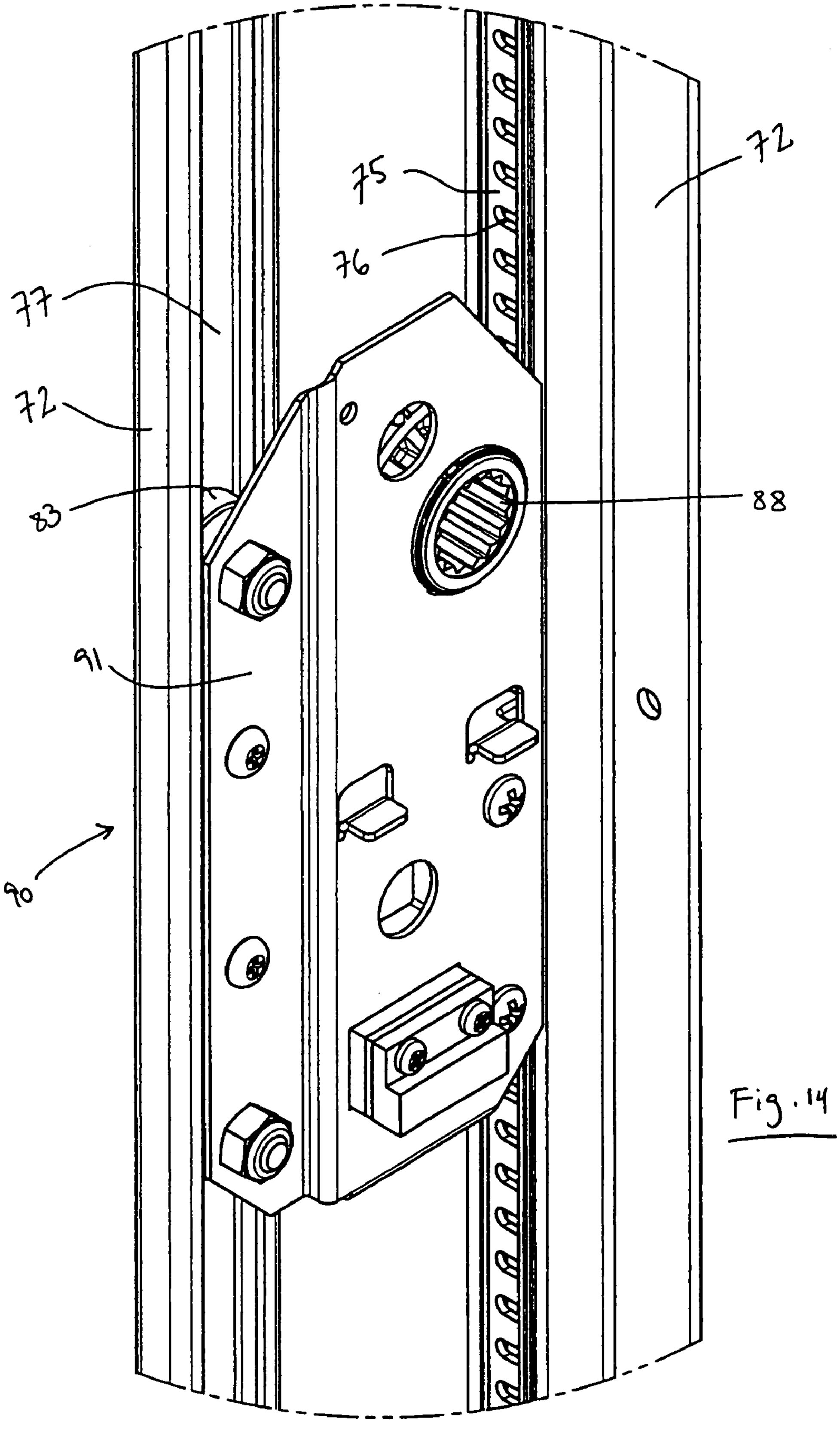
FIG. 14 is a detailed side perspective view of the support assembly (Y-rail) shown in FIG. 13.

The X-Y positioning system includes a pair of generally vertically oriented rail assemblies 72 (Y-rails) that are attached, respectively, to the left and right sides of the inside vertical frame of door 48. Mounted within each rail 72 is a track 75. Each track 75 preferably includes a set of regularly-spaced perforations 76 for receiving the cleats 82 of associated sprockets 86 which, as detailed below, provide for movement of a carriage support (X-rail) assembly 80 along the tracks 75 of the Y-rails. See FIGS. 13 and 14. The position of each of rails 72 may be slidably adjusted relative to the panel it is attached to, for proper synchronization with the associated sprockets 86 in order to level the X-rail assembly and assure smooth movement thereof. The perforated tracks 75 extend substantially the length of the Y-rails 72, which, in turn, extend substantially the length of the inside frame of door 48, and once adjusted, are held in place using screws or other appropriate attaching devices. Stops 74 are provided to arrest the downward movement of the X-rail. It is to be appreciated that different alternative types of tracks 75 may be provided including without limitation smooth tracks for engagement with rubberized members (instead of toothed sprockets or tractor drives), toothed tracks for engagement with cogs of gear-like members, timing belts with pulleys, and the like.

Figure 9A:
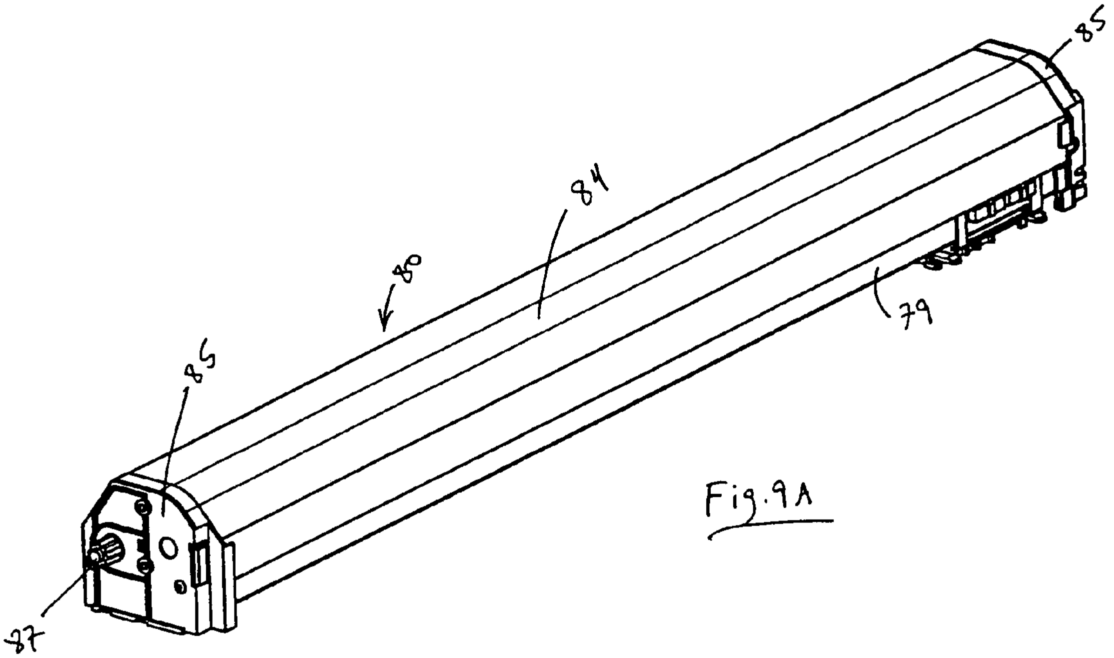
FIG. 9A is a top perspective view of a carriage support (X rail) assembly of the present invention.
Figure 9B:
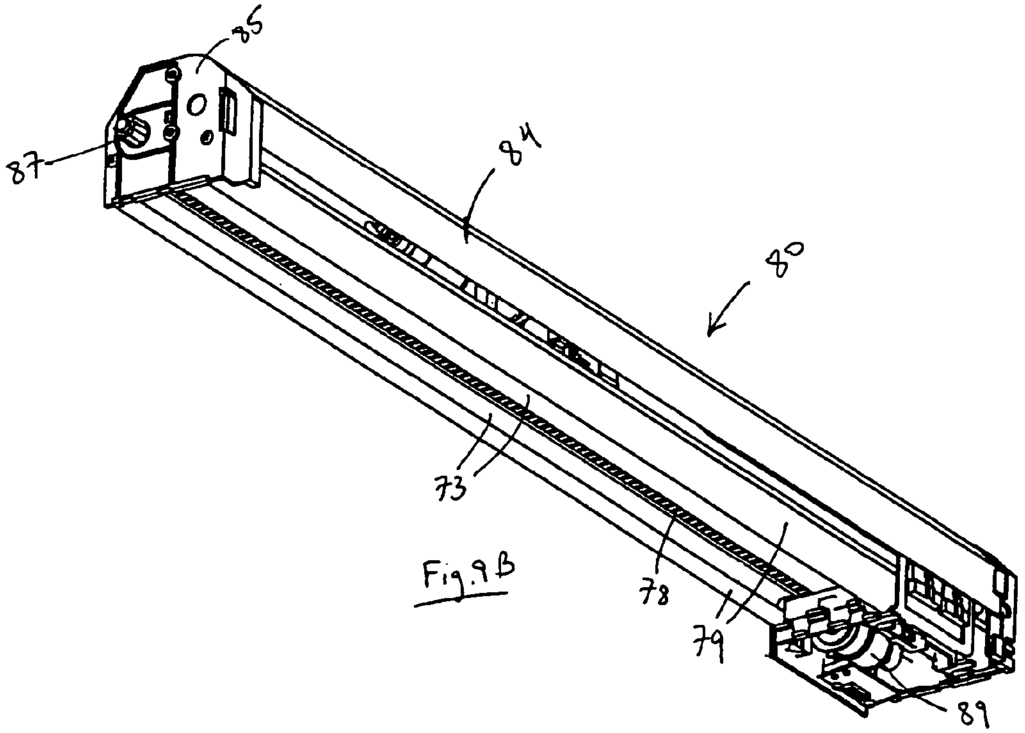
FIG. 9B is a bottom perspective view of the carriage support (X rail) assembly of FIG. 9A.
Figure 10:
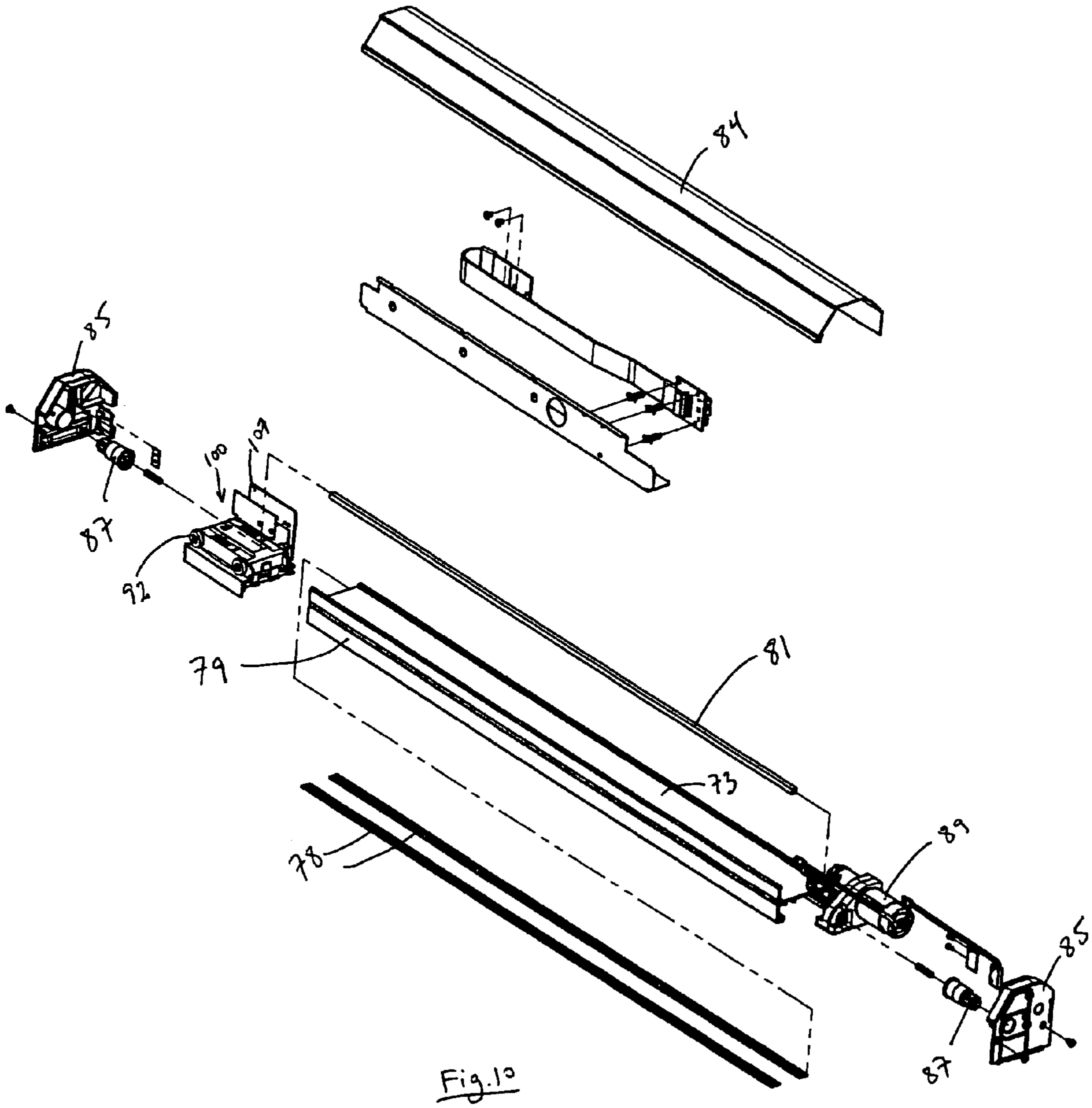
FIG. 10 is an exploded view of the carriage support (X rail) assembly of FIGS. 9A and 9B.
Figure 11A:
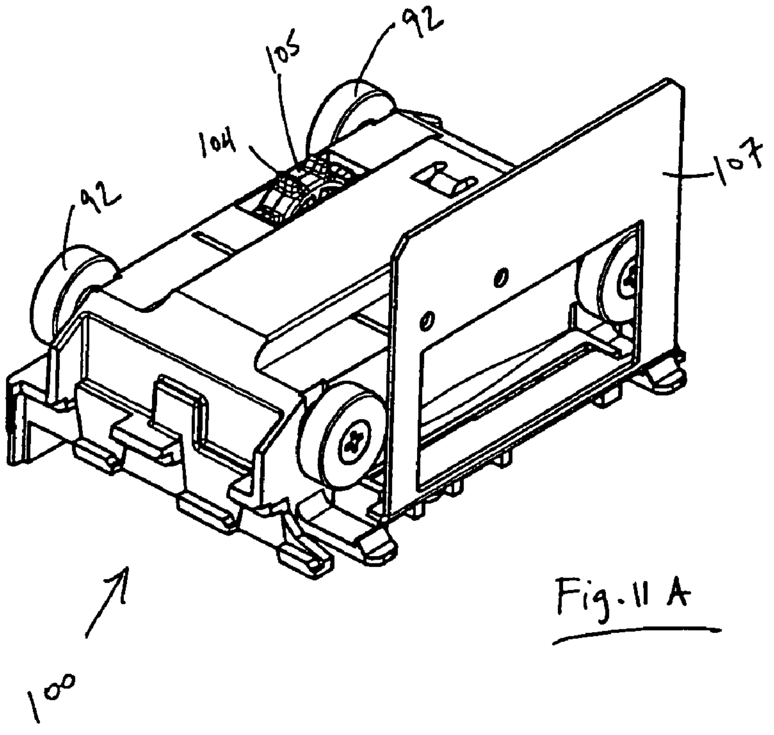
FIG. 11A is a top perspective view of a carriage assembly of the present invention.
Figure 11B:
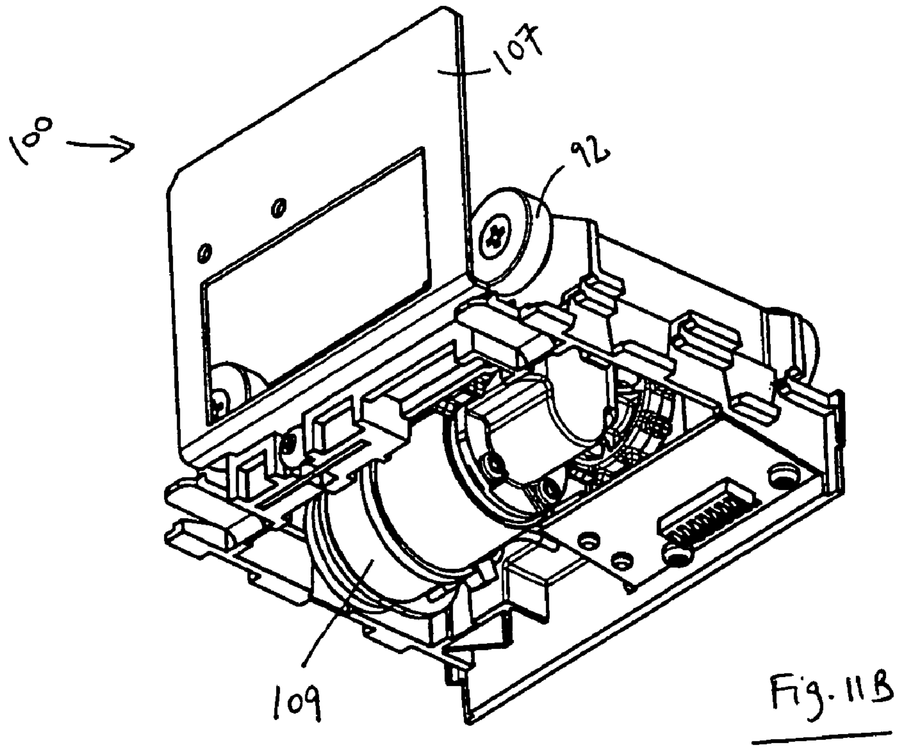
FIG. 11B is a bottom perspective view of the carriage assembly of FIG. 11A.
Figure 15:
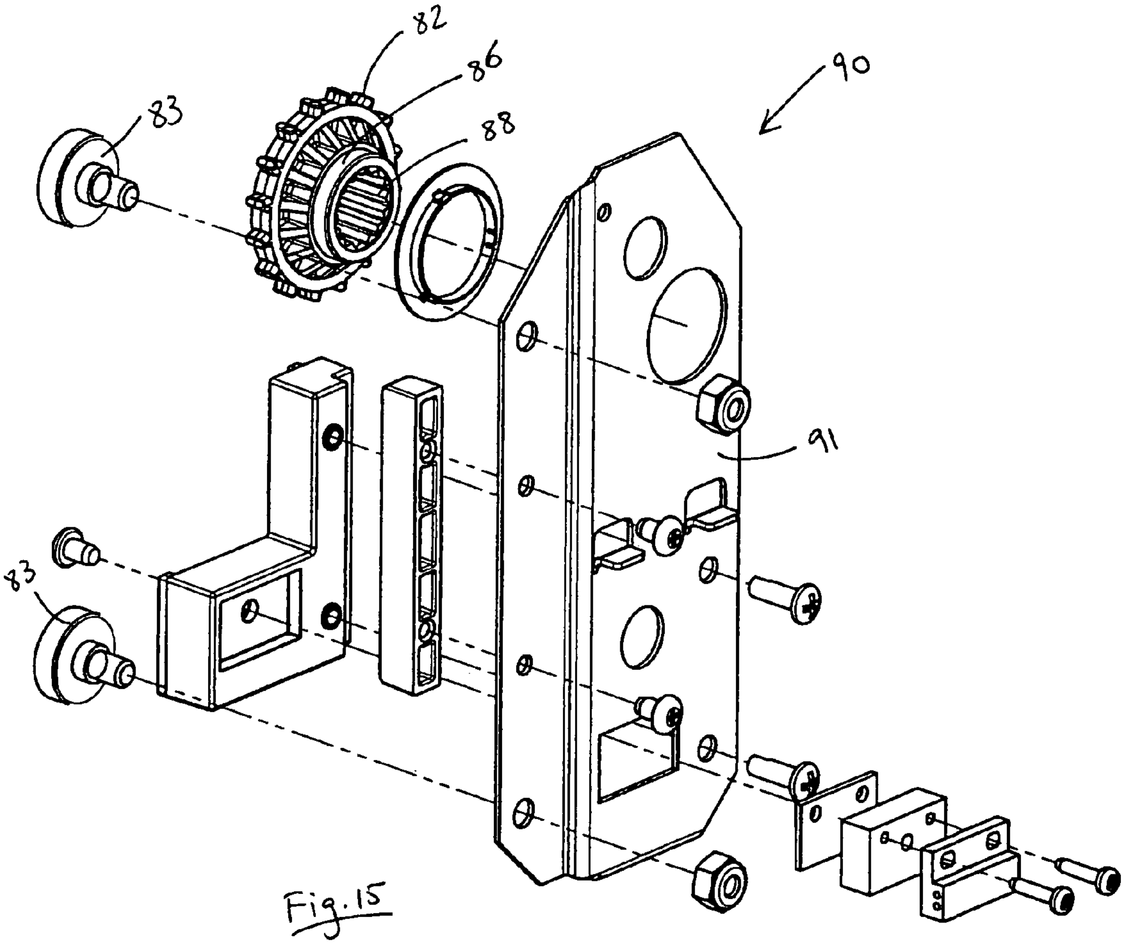
FIG. 15 is an exploded view of the support assembly of FIG. 14.

A carriage support (X-rail) assembly 80 is illustrated in the top and bottom perspective views of FIGS. 9A and 9B, and the exploded view of FIG. 10. Each X-rail assembly 80 includes a cover piece 84 having nearly mirror-image end piece assemblies 85 attached at both ends. Each end piece assembly 85 includes a splined coupling 87 that engages a corresponding toothed opening 88 in sprocket 86. Sprockets 86 are part of a larger moveable assembly 90 that is slidably mounted in each of the vertical Y-rails. See FIGS. 14 and 15. Wheels 83 on assembly 90 follow grooves 77 in rails 72 to guide the moveable assemblies 90 vertically along the Y-rails 72. Rotation of splined coupling 87 engaged in openings 88 imparts rotation to sprockets 86 which, in turn, causes cleats 82 to engage perforations 76 of track 75 moving each assembly 90 up or down, depending on the direction of rotation. This rotational movement is imparted simultaneously to both couplings 87 through shaft 81 coupled to motor 89, causing the X-rail assembly 80 to move up or down relative to the Y-rails. As above, it is to be appreciated that different types of tracks and different means for engaging such tracks may be implemented without departing from the scope of the invention.

It will be appreciated that the force of gravity makes downward movement along the Y-rails 72 easier than upward movement. Because of the significant weight supported by the X-rail 80 (including a carriage assembly 100, housing 30, and robotic gripping mechanism 10—particularly when laden with a heavy fluid-filled product container), in an alternative embodiment a torsion spring or counterweight system may be provided to assist motor 89 in raising the X-rail assembly 80 in an upward direction against gravity. The assistance of the spring or counterweight is not needed for downward movement. In another alternative embodiment, the X-rail assembly 80 may be provided with a dual motor drive system for moving the X-rail assembly 80 up or down relative to the Y-rails for increased upward power and downward control.

Figure 12:
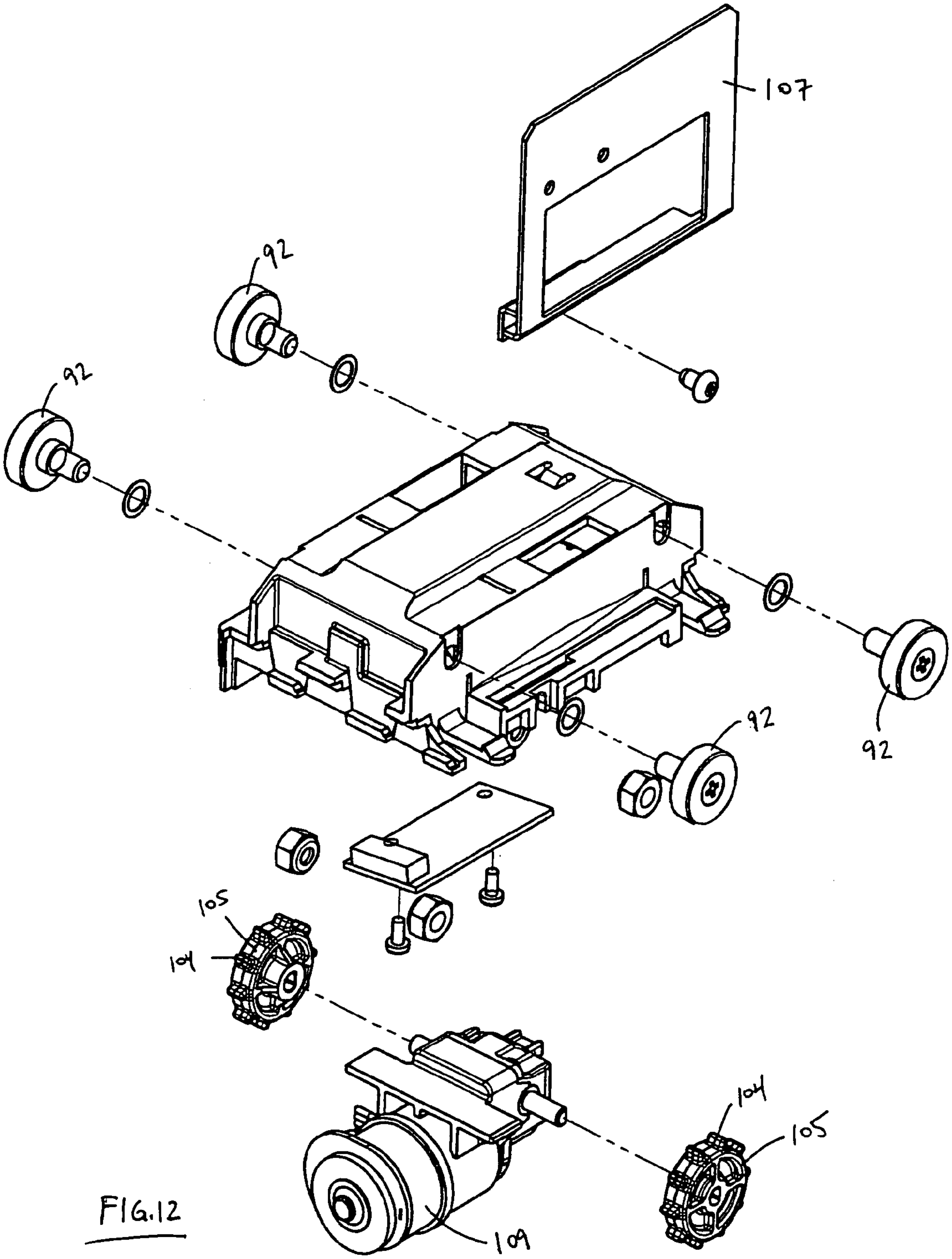
FIG. 12 is an exploded view of the carriage assembly of FIGS. 11A and 11B.

A moveable carriage assembly 100 is provided for horizontal movement along the X-rail assembly 80. Mounted below cover 84 is a horizontally oriented rail 73 containing a pair of downwardly oriented grooved flanges 79 which serve as guides for wheels 92 of carriage assembly 100, shown in FIGS. 9B and 10. A pair of tracks 78, preferably but not necessarily perforated, are mounted on the underside of the rail 73 for receiving the teeth 104 of rotatable sprockets 105 mounted in carriage assembly 100. Referring to the exploded view of FIG. 12, it is seen that the pair of sprockets 105 are operated by motor 109 for moving carriage assembly 100 horizontally (left or right) along tracks 78 of the rail 73. Operation of the motor 109 turns the pair of sprockets 105 whose teeth are engaged with the holes in the tracks 78 causing movement of the carriage assembly 100 horizontally along the X-rail, as wheels 92 travel along guide flanges 79. A flange 107 is attached to carriage assembly 100 to support a housing and a gripping mechanism described more fully below. Vertical movement of the X-rail assembly 80 along the Y-rails 72 in conjunction with horizontal movement of the carriage assembly 100 along the X-rail 73 allows the carriage assembly, and the housing 30 and gripping mechanism 10 it supports, to be moved to any location on the X-Y plane defined by the X and Y rails 72 and 73. As above, it is to be appreciated that different types of tracks and different means for following such tracks may be implemented without departing from the scope of the invention. A sensor (not shown) on the X-rail assembly 80 is used to detect whether the X-rail assembly 80 is in a "home" position relative to the Y-rails 72.

Figure 19A:
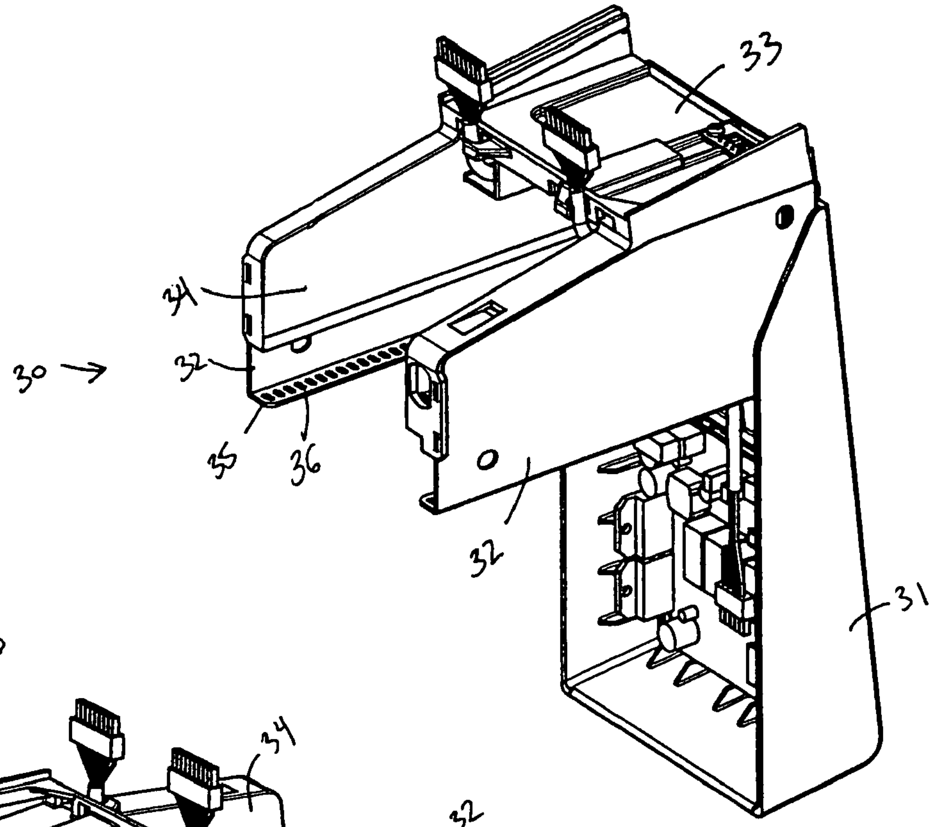
FIG. 19A is a front perspective view of a housing assembly of the present invention.
Figure 19B:
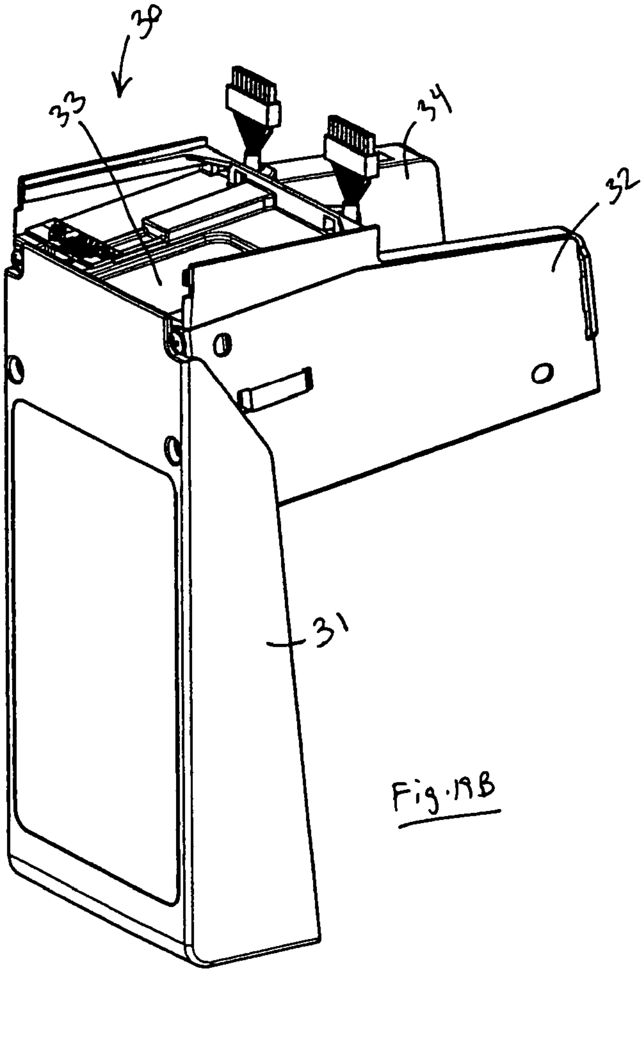
FIG. 19B is a rear perspective view of the housing assembly of FIG. 19A.

A housing 30 is provided for holding a gripping mechanism 10. In the exemplary embodiment illustrated in FIGS. 19 and 20, it is seen that housing 30 includes a main body member 33, having a pair of upper support members 34 that are spaced apart from each other and mounted to the body member 33, a main body cover 31, and support member covers/flanges 32. Body member 33 is removably attached to the carriage assembly 100 so that it may be easily detached for removal, repair and replacement of the housing 30 and/or the associated gripping mechanism 10. When assembled, as carriage assembly 100 moves throughout the X-Y plane, it carries housing 30 and gripping mechanism 10 along with it.

Each of the upper support members 34 includes a horizontally oriented track 35, preferably including perforations 36 corresponding to the teeth 17 of sprockets 16 of the gripper mechanism 10. Track 35 supports the gripper mechanism 10, and provides a path along which it can move horizontally in the Z direction. As above, it is to be appreciated that different types of tracks and different means for engaging such tracks may be implemented without departing from the scope of the invention.

Housing 30 also includes a sensor 39 mounted on body 33. Sensor 39 is used to sense the presence/location of shelves or trays in the cabinet and is in communication with a processor. Sensor 39 may be optical, magnetic or otherwise. Housing 30 may also include a separate sensor which is used to detect the housing being in a "home" position along the X-rail assembly 80 inside the vending machine cabinet. Housing 30 may also include yet another sensor that is used to detect whether the gripping mechanism 10 is fully retracted on track 35.

It is to be understood that the components of the housing 30 are not limited to the particular locations depicted, but may be installed in various alternative locations, and in various alternative combinations, without affecting the functionality of the housing or gripping mechanism. For example, it is to be understood that said Z-axis supports 34 and track 35 may be mounted at different locations on the housing 30 such as underneath, or on either side of, the main body 33, or flush against the rear end of the body. The sensor 39 may also be installed in various alternative locations, such as, but not limited to, the other arm 34 of body 33 flange of the housing, or any side of the housing 30, so long as the locations of the corresponding sensed elements on the trays/shelves are likewise adjusted.

Figure 16A:
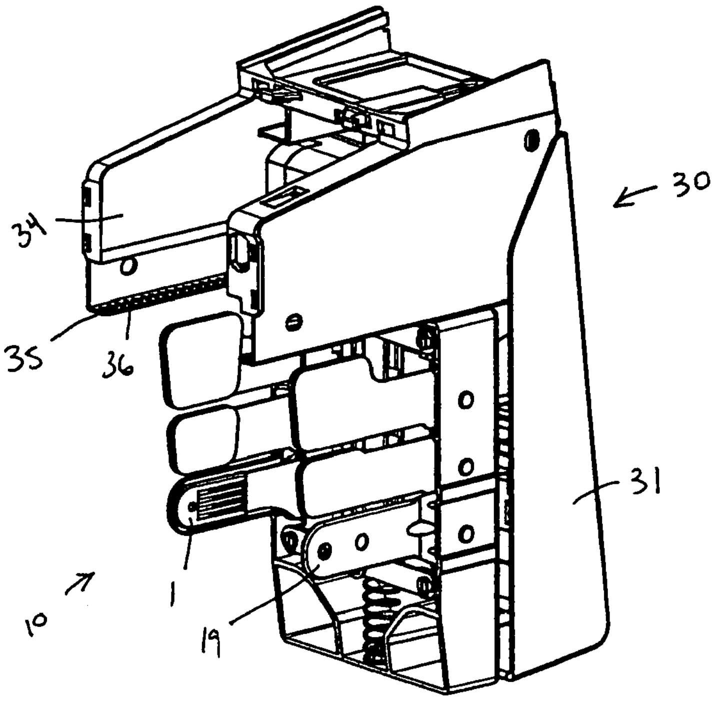
FIG. 16A is a perspective view of a housing and gripper assembly of the present invention with the gripper retracted into the housing.
Figure 16B:
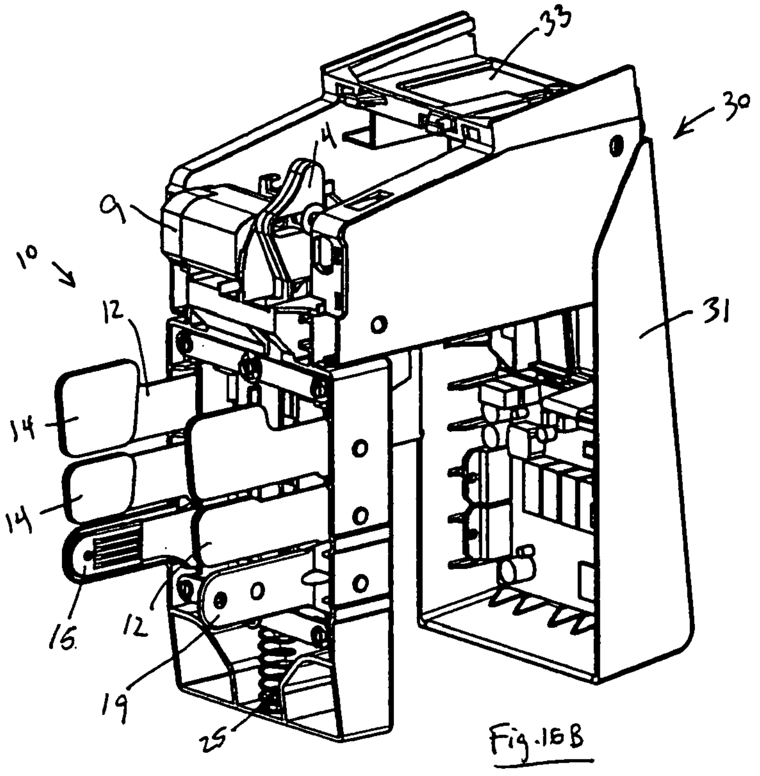
FIG. 16B is a perspective view of the housing and gripper assembly of FIG. 16A with the gripper extended from the housing.
Figure 17A:
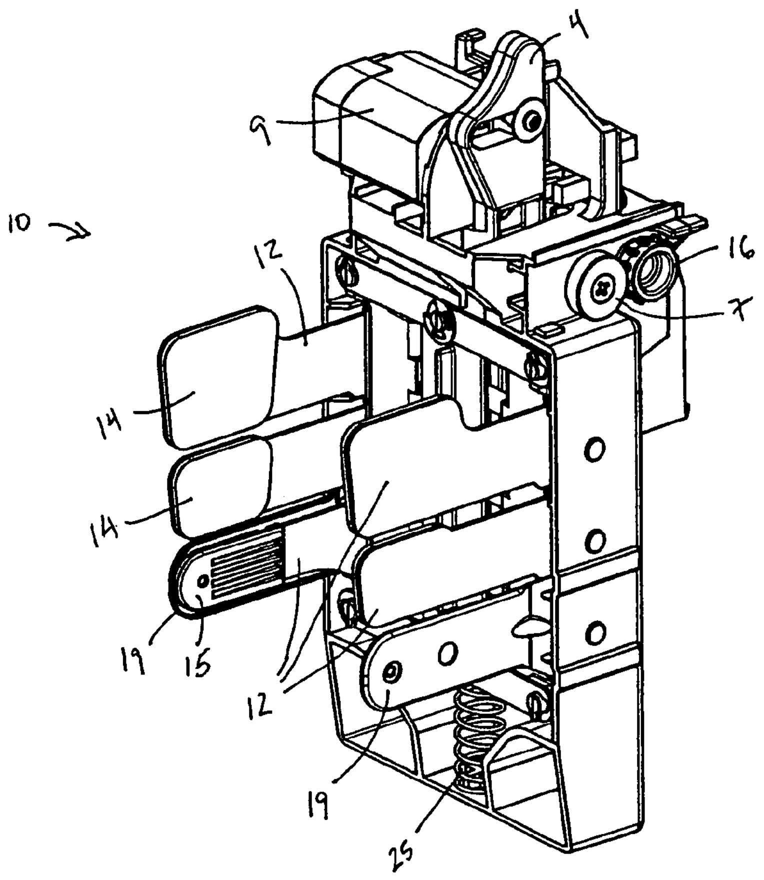
FIG. 17A is a front perspective view of a gripper assembly of the present invention.

The gripping mechanism 10 is movably mounted in the housing 30 and is designed to be extended and retracted from the housing in order to retrieve a selected product from a queue, as shown in FIGS. 16A and 16B. Referring to the detailed illustrations of FIGS. 17-18, it is seen that the gripping mechanism 10 includes a plurality of oppositely positioned movable fingers 12 that are urged inwardly by a plurality of corresponding biasing devices or springs 27. It is preferred that fingers 12 be provided in pairs that are positioned directly across from each other, and exemplary illustrated embodiment includes three pairs of oppositely positioned movable fingers 12. However, opposing fingers 12 need not be provided in pairs, and may be offset from each other. For example, the number of fingers on each side need not be the same, and the fingers 12 may be provided, for example, in an offset pattern, or in any other suitable combination.

Each moveable finger 12 is provided with a replaceable frictional pad 14 for improved frictional engagement against the surface(s) of a container 98 to reduce slippage and provide a firm grip. Pads 14 may be made of fabric, plastic, rubberized or other suitable material having a desired (preferably high) frictional coefficient. A special pad 15 is provided on each of the bottom most fingers 12 to provide additional frictional engagement at the bottom of the container 98 where there is expected to be significant weight. Slip on covers may be used as an alternative to the pads 14.

Figure 17B:
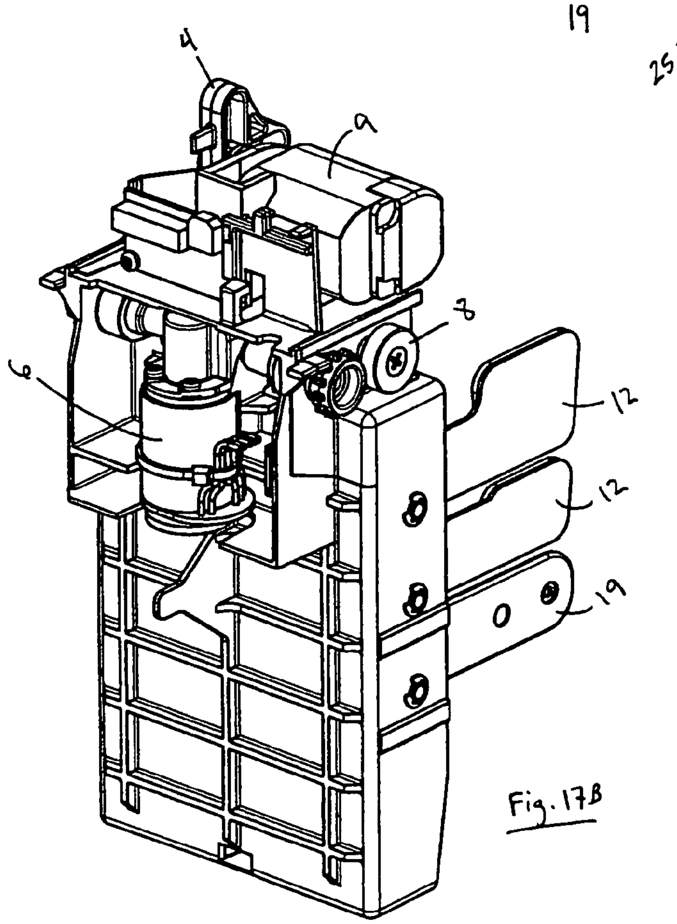
FIG. 17B is a rear perspective view of the gripper assembly of FIG. 17A.
Figure 18:
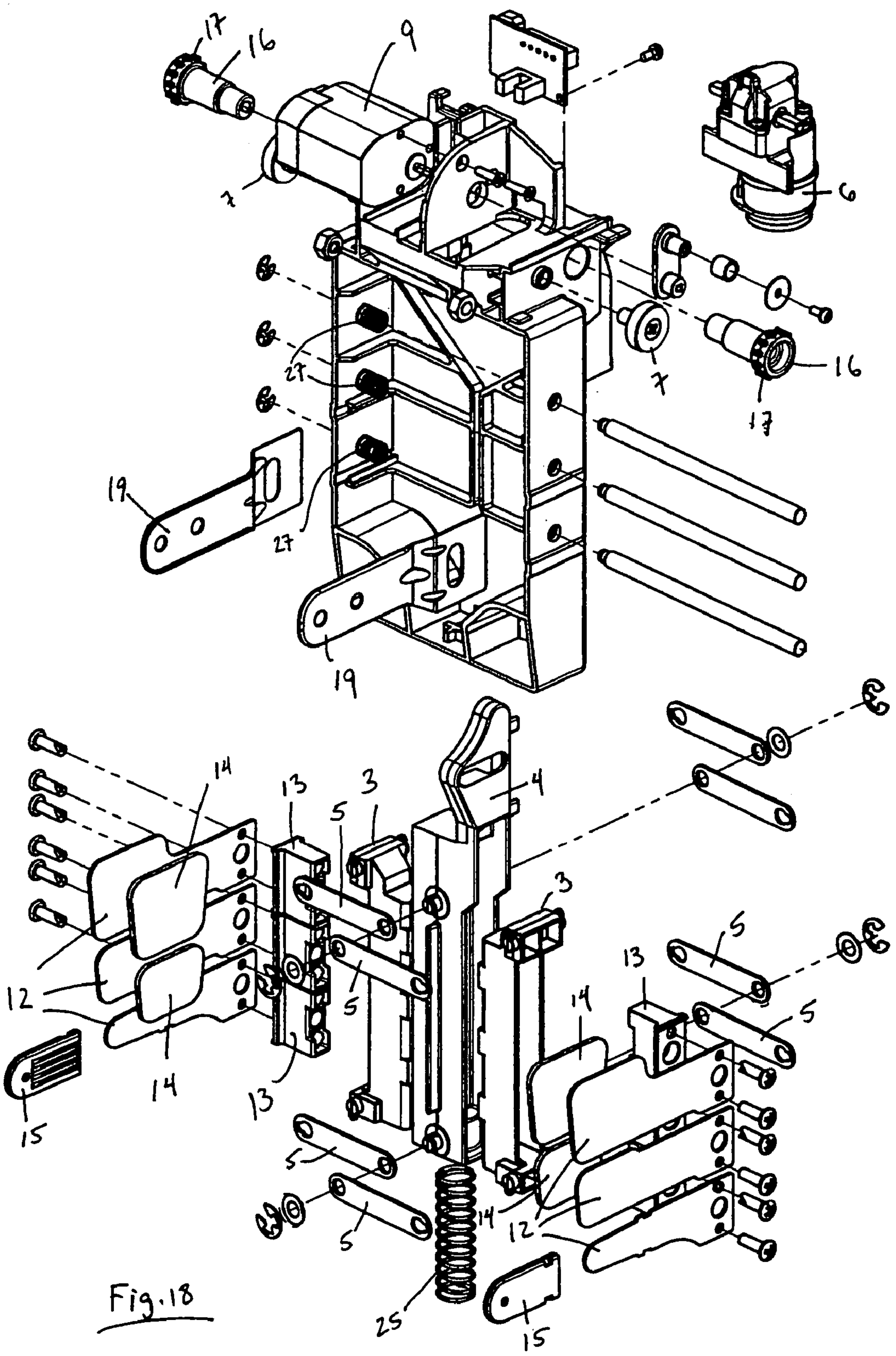
FIG. 18 is an exploded view of the gripper assembly of FIG. 17A.
Figure 38:
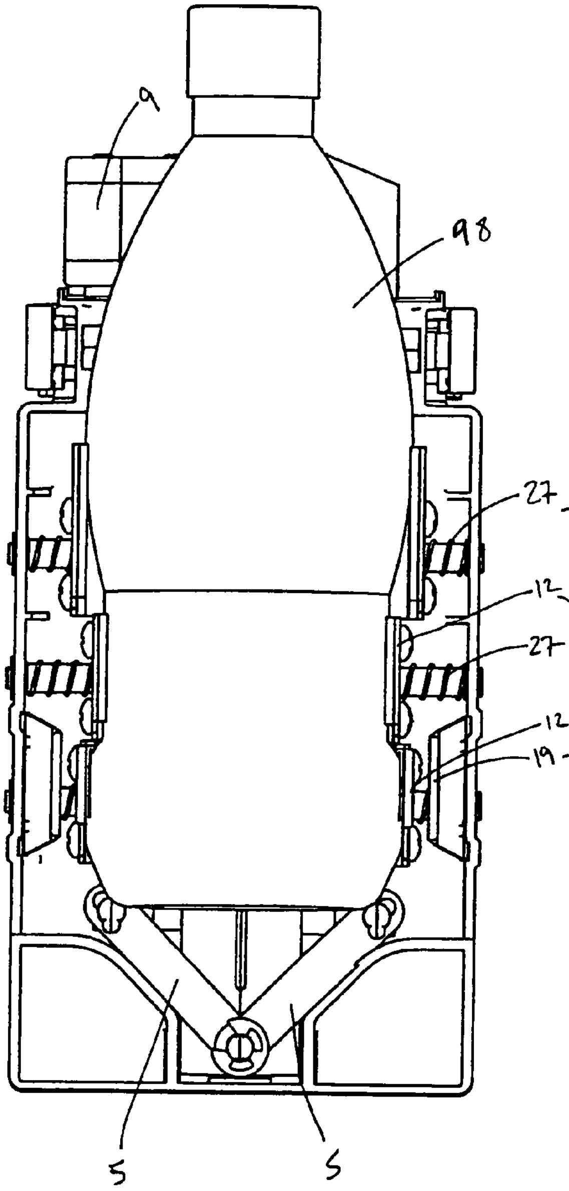
FIG. 38 is back view of a gripper of the present invention showing the fingers engaged with a product container having a first shape.
Figure 39:
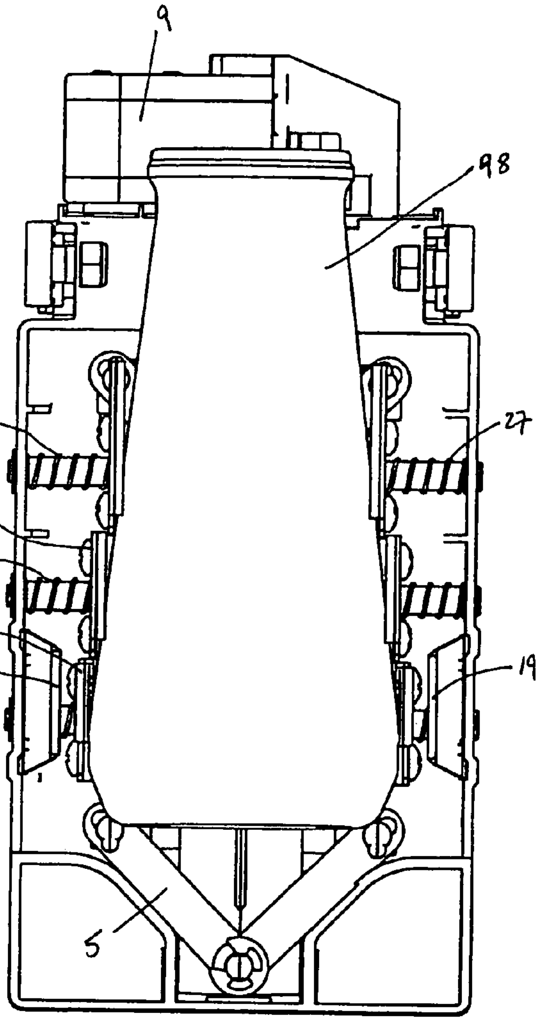
FIG. 39 is back view of a gripper of the present invention showing the fingers engaged with a product container having a different shape.

Referring to the exemplary exploded view of FIG. 18, it is seen that fingers 12 are urged inward by springs 27, but are held off by the action of moveable blocks 3 and 13 that are linked to driver 4 by pivotally mounted linking members 5. Each finger 12 has its own spring 27 and hold off block 13. The operation of motor 9 causes driver 4 to move up or down. At rest, control member or driver 4 is in an upward position as shown in FIG. 17B, with fingers 12 being held off by blocks 3 and 13. When moved down, driver 4 causes linking members 5 to pivot downward forming a "V" shape, and pulling blocks 3 and 13 toward the center of the unit. This action allows springs 27 to urge fingers 12 toward the center to grasp an object, such as a product container 98, as illustrated in FIGS. 38 and 39. Since each finger 12 has an independent spring 27 and hold off block 13, the each finger 12 may travel a different distance until it comes into contact with a part of the container 98. This provides secure gripping of container 98, by providing frictional engagement at many different locations and depths. The multiple independently moveable fingers 12 of the gripper allow for secure engagement with a wide variety of containers having different sizes, shapes, weights, and/or deformabilities. Fingers 12 may be retracted by the upward movement of driver 4 which is assisted by spring 25. Such upward movement causes all of the fingers 12 to be held off by blocks 3 and 13, thereby releasing the product container 98 and preparing the gripper to engage another container.

It is to be appreciated that the moveable fingers 12 should be of generally the same length, but fingers 12 and their associated pads 14 and 15 need not be of the same width or cross sectional area. In some applications, broader fingers with wider surface areas may be preferred; whereas, in other applications smaller or more narrow fingers; and combinations of different sizes and shapes for fingers 12 and their associated pads may also be employed in the same gripper 10. It is to be appreciated that fingers 12 need not have a flat cross section (as illustrated), but may be provided having any suitable cross-sectional shape such as a bowed, semi-circular or C-shaped configuration, or fingers 12 may be provided as cooperating half-sleeves.

Figure 26:
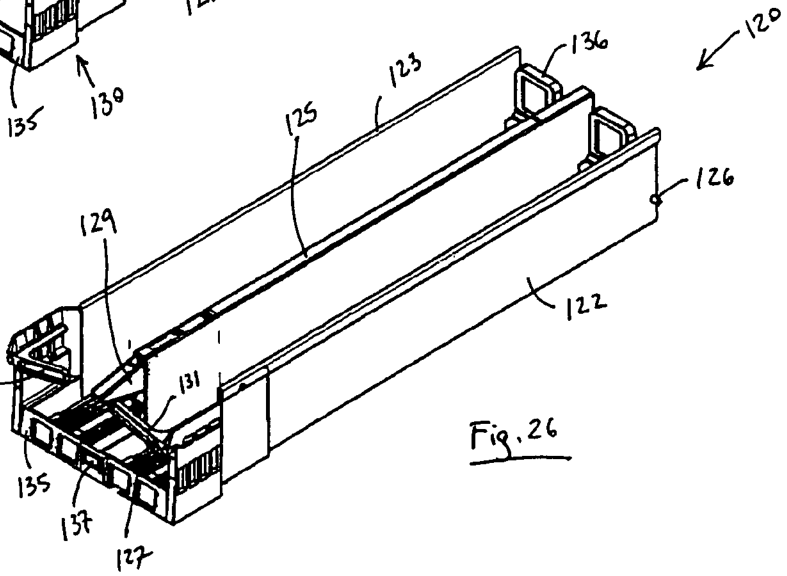
FIG. 26 is a front perspective view of a tray assembly of the present invention.

The gripping mechanism also includes a pair of lower fixed-position fingers 19. Fixed fingers 19 are used to temporarily push out of the way one or more spring-loaded retaining gate(s) 131 and an optional spring-loaded dividing wall extension or arm 129, both of which are located at the end of each tray 120, as shown in FIG. 26 and discussed more fully below. It is to be appreciated that the lowermost set of movable fingers 12 may be provided between the fixed position fingers 19 in the exemplary embodiment.

The gripping mechanism 10 is capable of moving backward and forward in the Z direction as illustrated in FIGS. 16A and 16B. This movement is generally perpendicular to the X-Y plane defined by the positioning system, but may be tilted at an upward or downward angle to accommodate proper interaction with the trays 120, as discussed more fully below. In the preferred embodiment, the Z movement is tilted upward at an angle of about six degrees (6°) to accommodate the corresponding downward angle of the trays 120. The gripper 10 is extended as shown in FIG. 16B prior to engagement of the fingers 12 around a product container 98. This allows the fingers to be brought into close proximity with the forward-most product container 98 in a given queue, and then retracted (FIG. 16A) after the container has been grasped. Movement of the gripper 10 and its associated fingers 12 and 19 in the Z direction is accomplished using motor 6 which rotates sprockets 16. The teeth 17 of sprockets 16 engaged the pair of perforated tracks 35 provided on support arms 32 on opposite sides of housing 30 holding the gripping mechanism. A pair of wheels 8 are also provided to guide and stabilize the Z movement. Operation of motor 6 causes the gripping mechanism to extend forward in the Z direction out of and away from the gripping mechanism housing thereby causing fingers 12 and 19 to be extended to the foremost container at the end of a column and similarly retracting the gripping mechanism from the end of the selected column back into the gripping mechanism housing.

Figure 20:
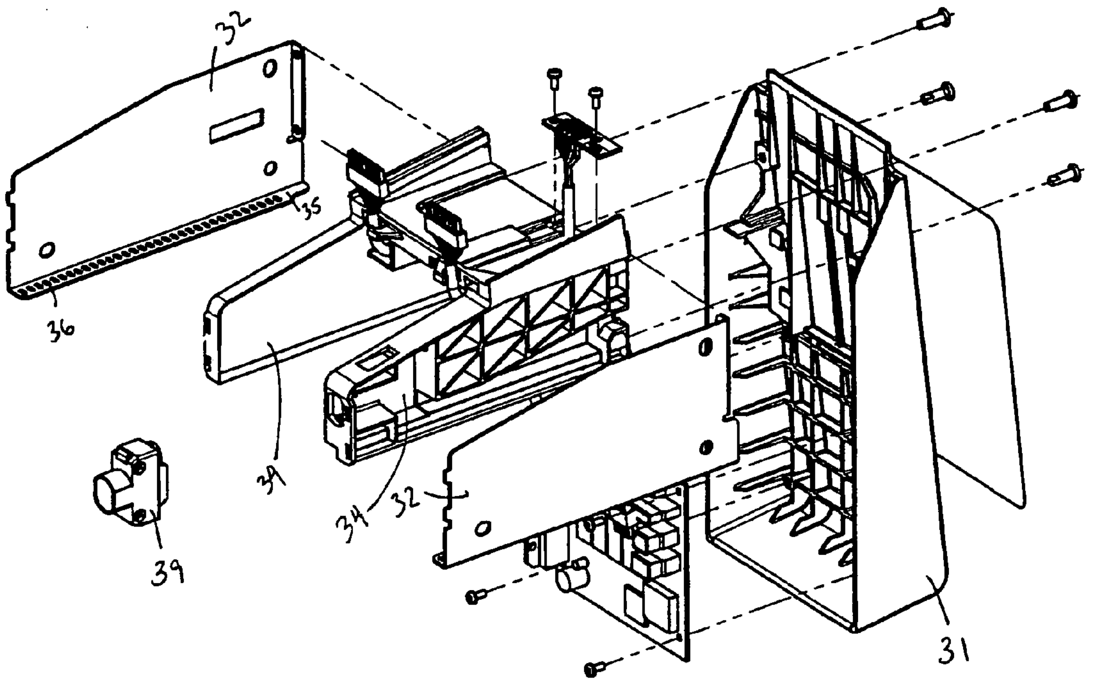
FIG. 20 is an exploded view of the housing of FIGS. 19A and 19B.

The housing 30 also supports a sensor 39, shown in FIG. 20, oriented in a forward looking direction to permit scanning for a reflector element 137 positioned on each tray 120 as discussed in the detailed description of the trays below. It is preferred that sensor 39 be a polarized light emitting retro-reflective optical device that can only see the light as reflected off of the target reflector 137 (e.g., a corner cube type) so that it is not affected by ambient light interference, or flashy product containers. However, any other suitable sensing mechanism may be used such as a reed switch located on the housing, and magnets located on each tray. This sensor is used during a startup sequence of the vending machine to calibrate the current positions of all of the product trays so that the queues of products in those trays may later be accessed by the gripping mechanism. This also allows the positions of the trays to be moved to accommodate different sizes of product containers. If moved, the presence of each tray is again sensed, and the position calibrated and compared with the positions previously stored in memory before the tray was moved. Adjustments to the number of available selections (trays) are then automatically made in the control software, without any operator intervention.

Figure 25:
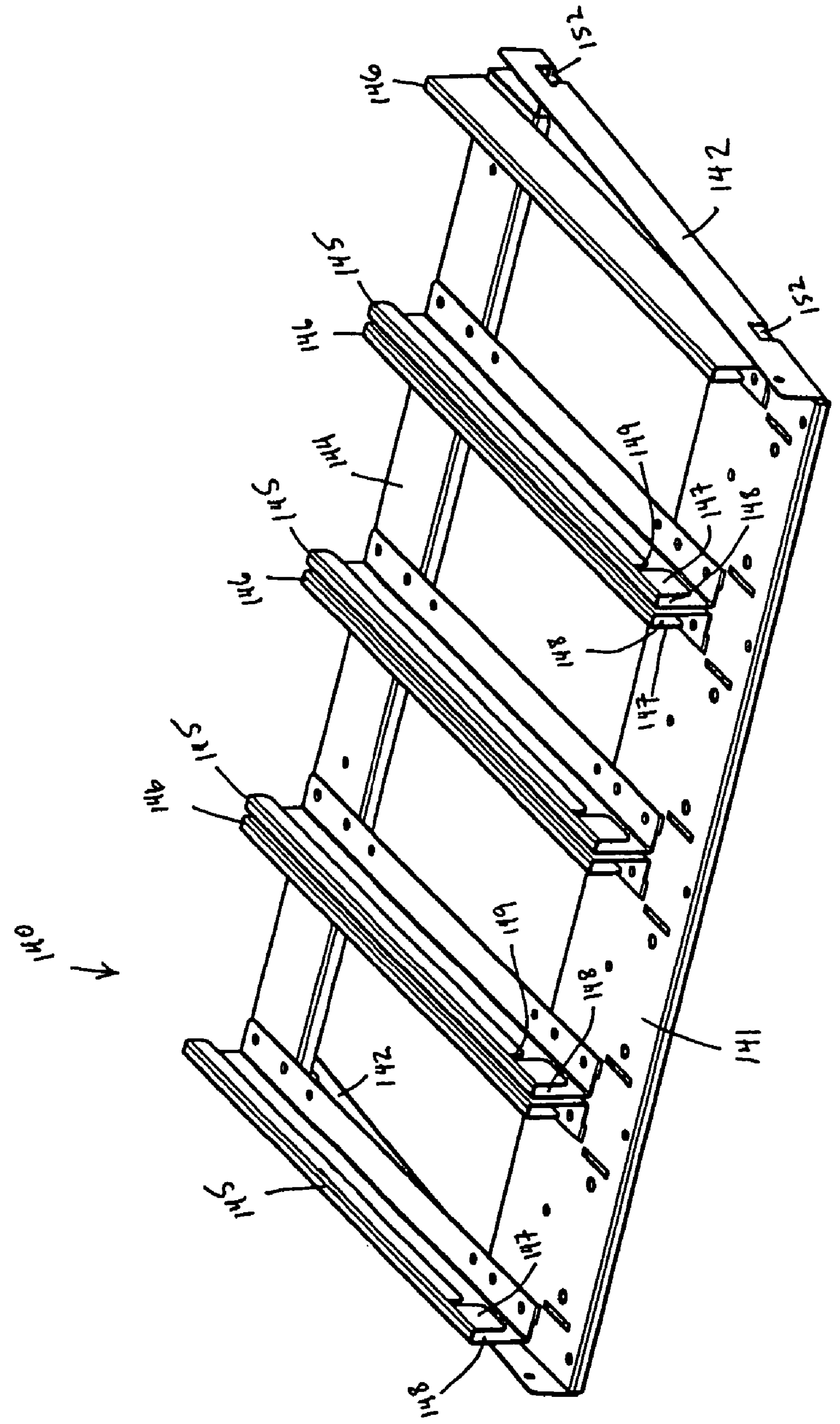
FIG. 25 is a front perspective view of a shelf of the present invention for supporting tray assemblies.
Figure 27:
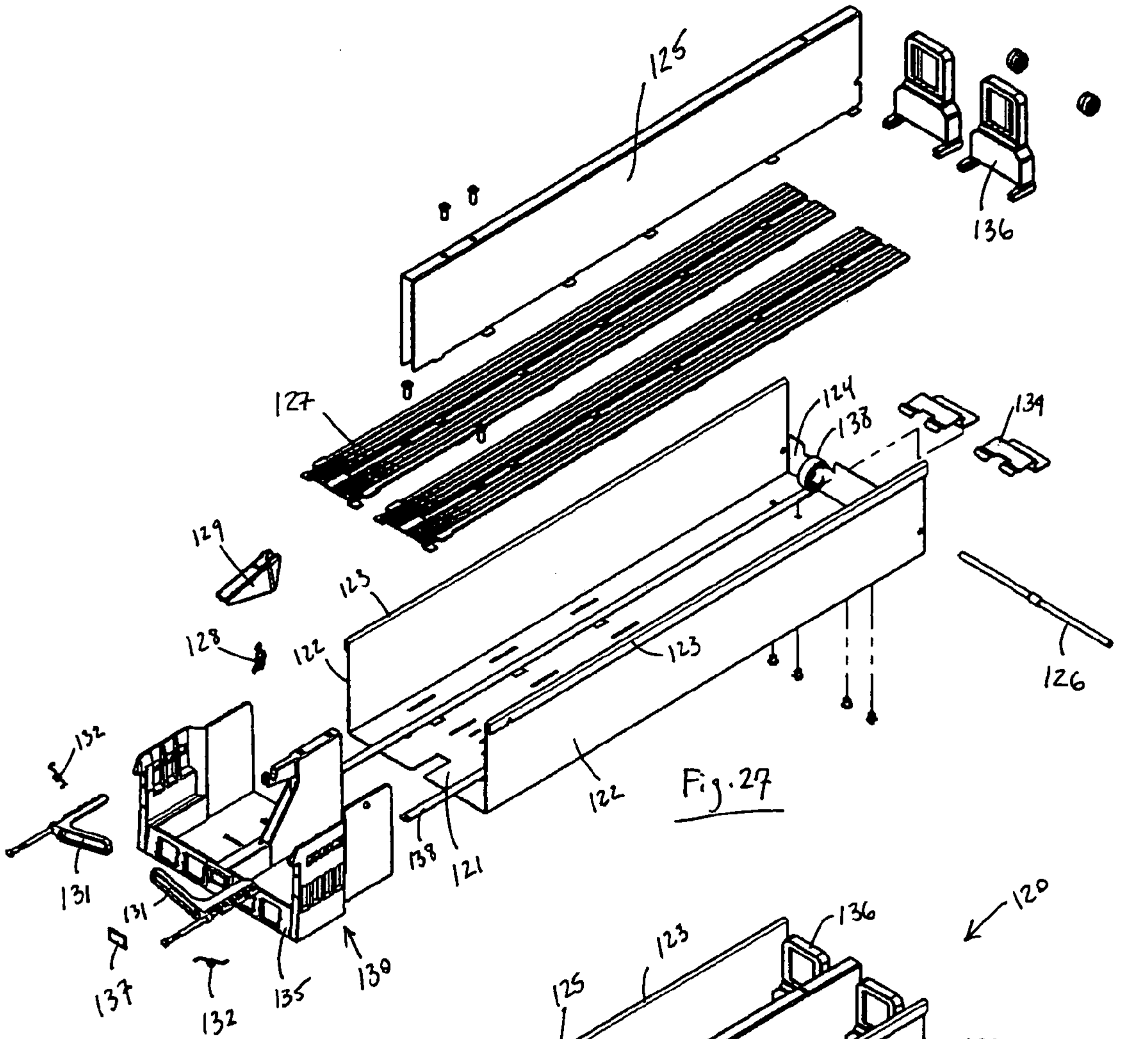
FIG. 27 is an exploded view of the tray assembly of FIG. 26.

The products to be vended are maintained in a plurality of tray assemblies 120 which are mounted on a plurality of adjustable shelf assemblies 140 that are deployed in the temperature-controlled upper chamber 58/65. Exemplary shelf assemblies 140 are illustrated in FIG. 25, and exemplary tray assemblies 120 supported by the shelves are illustrated in FIGS. 26 and 27. Installed shelves and trays are shown in FIGS. 1-2 and 23-24. Each shelf assembly 140 includes a skeletal assembly having a front flange 141, two mirror-image side flanges 142, and a rear flange 144 forming a generally rectangular frame as shown in FIG. 25. A plurality of mirror image left and right side guide flanges 145, 146 are provided on the frame, forming elongated channels extending from front to back for receiving the tray assemblies 120. Each of the guide flanges 145, 146 includes an elongated groove 148 extending from front to back, for receiving one of protruding stop rods 126. Each groove 148 includes an enlarged flange 147 at the front, and a recessed notch 149 immediately behind flange 147. Notch 149 is designed to receive a corresponding pin or stop rod 126 on each tray assembly 120 to facilitate loading of the trays, as discussed more fully below.

Rear flange 144 is raised with respect to front flange 141 such that the intermediate guide flanges 145, 146 are tilted at a downward angle from back to front. This tilt helps facilitate gravitational movement of products toward the front of the tray assemblies 120. The angle may be varied according to the size, shape and weight of the products to be vended, but an exemplary angle may be approximately six degrees (6°).

The inside surfaces of cabinet walls 42 and 43 are provided with a plurality of hooks 151 for engagement with corresponding openings 152 on left and right side shelf flanges 142. Hooks 151 are provided in numerous different locations in order to allow shelf assemblies 140 to be moved to different locations inside the temperature-controlled upper chamber 58/65 of cabinet 40. This permits re-positioning of product shelves, to either allow more product selections, or to increase spacing between shelves to accommodate taller packages. A plurality of shelves may be provided in the upper chamber, depending upon the height of the product containers to be vended. It is to be appreciated that the positions of the shelf assemblies 140 within the chamber may be adjusted according to the requirements of the products to be vended.

Turning to FIGS. 26 and 27, it is seen that the exemplary tray assemblies 120 each define a pair of parallel columns extending longitudinally from back to front. Each tray assembly includes a floor 121, two product slider tracks 127 attached to floor 121, two side walls 122, and a partial rear wall 124. The tops of side walls 122 preferably include a longitudinal cap or flange 123 for rigidity. A longitudinal separating wall 125 is provided down the center of each tray defining the left and right columns or queues of each tray. A stop pin 126 is provided at the back of each tray, which protrudes out a slight distance from side walls 122. Clips 139 are used to raise slider tracks 127 from front to back. Each tray 120 is designed to be slidably installed between guide flanges 145, 146 of the shelf assembly 140. Each tray 120 may be pulled forward for loading of products, with stop pin 126 fitting into notch 149. The engagement of stop pin 126 into notch 149 prevents tray 120 from being disengaged from the shelf assembly 140, while at the same time allowing tray 120 to pivot down in a hinged fashion on stop pin 126 for easy loading of product containers. It is to be appreciated that trays having a single or multiple queues may also be employed. The more columns per tray, the fewer guides needed, however the heavier the tray when being restocked.

In one embodiment, a low friction molded track 127 is attached to the interior floor 121 of each tray column. Track 127 may be made of any number of materials and configurations, but in the preferred embodiment it is a ribbed structure made of low-friction plastic such as acetal. Track 127 may be raised at the back using clips 139 to provide a slope for forward gravitational movement of products along track 127.

In one embodiment, each tray column is also provided with a pusher element 136 which exerts a force upon the containers 98 in the queue urging them forward. In this embodiment, a channel is provided for each queue on bottom panel 121 and oriented to guide pusher 136 so that it may slide from back to front. At the rear of each bottom channel is a small detent which, as discussed below, holds pusher 136 in place at the back of a column during product loading. Pusher 136 is pulled toward the front of a column by a self-coiling spring member 138 which is deployed at the bottom of each queue. One end of spring member 138 is attached to a roller which is mounted on the rear of pusher 136. The other end of spring member 138 is attached to the bottom front of track 127. Tension from spring member 138 causes pusher 136 to urge the product containers 98 in the queue toward the front of each column. When a product is removed from the front of a queue, the tension exerted on pusher 136, together with gravity, compels the remainder of the products in the column to move forward until the product formerly second in line is now the foremost product to be the next product vended from the column. As pusher 136 moves closer to the dispensing end of a column, spring member 138 coils around the roller. When loading a column in a tray, pusher 136 is manually slid to the rearmost position in the tray where it is wedged onto cross-bar 126 using detent which holds pusher 136 in place. When a tray is returned to a dispensing position on a shelf, each of the pushers 136 on the tray (which have been set in the loading position) are automatically released as a result of contact between the rear of the pusher and the back wall of the cabinet. Once pusher 136 is released, spring member 138 draws it into contact with the last product in the queue, thereby urging it forward in the manner previously discussed.

In the illustrated embodiment, a frame assembly 130 is provided at the front of each tray 120. Each frame assembly includes an extension of central separating wall 125, and extensions of side walls 122. Frame assembly 130 may also include a lower flange or lip 135 along the bottom to prevent product containers 98 from exiting the queue. A target reflector 137 is provided on the front of each tray, preferably on lip 135. Reflectors 137 are targets that are sensed by sensor 39 during the startup sequence to determine the location of each particular tray. The extension of separating wall 125 supports a downwardly moveable pivotally mounted arm 129 that is held in a substantially horizontal or "closed" position by a biasing member such as a spring 128. Arm 129 can be opened by collapsing biasing member 128 through the exertion of minimal downward pressure on the top of the arm. When depressed, arm 129 recedes into a hollow are in the separating wall extension. Depression of arm 129 occurs during the process of product retrieval and is accomplished by one of the fixed fingers 19 of the gripper mechanism 10 when it accesses one of the columns on either side of arm 129 while reaching into a queue to retrieve a selected product. See FIG. 41.

In the illustrated embodiment, each front frame assembly 130 also includes a pair of pivotally mounted gates 131 attached, respectively, to each of the side wall extensions of frame assembly 130. Gates 131 may be mirror images of each other, and are provided at the front of each tray queue. Gates 131 are held in a substantially horizontal or "closed" position extending into or across the front of each respective queue by a biasing member such as a spring 132, thus preventing product containers 98 in the queue from exiting through the front of the tray. The illustrated gates 131 pivot in the X-Y plane, but they may also be provided to pivot in the Z plane with a stop to prevent product containers from pushing them open. Each gate 131 is opened by exerting a downward pressure on the top of the gate. Depression of a gate 131 occurs during the process of product retrieval and is accomplished by one of the fixed fingers 19 of the gripper mechanism 10 when it accesses a queue. It is to be appreciated that during product retrieval, one of the fixed position fingers 19 depresses arm 129, and the other of fixed position fingers 19 depresses one of gates 131 (i.e., the gate 131 associated with the queue (right or left) that is being accessed), thereby allowing the movable fingers 12 the opportunity to engage and remove the foremost product container 98 in the queue. It is to be appreciated that when the gripper 10 and fixed position fingers 19 are raised they lift the grasped product container 98 above lip 135. The gripper is then retracted allowing arm 129 and gate 131 return to their original "closed" positions preventing other product containers 98 from exiting the queue.

In an alternative embodiment, a more simplified tray assembly 120 may be provided having a single column extending from back to front. This alternative tray has a floor 121 and side walls 122, but no central separating wall 125, nor the wall extension or arm 129. Instead, the single tray column has but a single spring-mounted gate 131 which may be pivotally attached to either side wall 122. Alternatively, a pair of gates 131 may be provided, one on each side wall 122. The single tray embodiment may or may not be provided with the track 127 and/or the pusher assembly 136.

Figure 30:
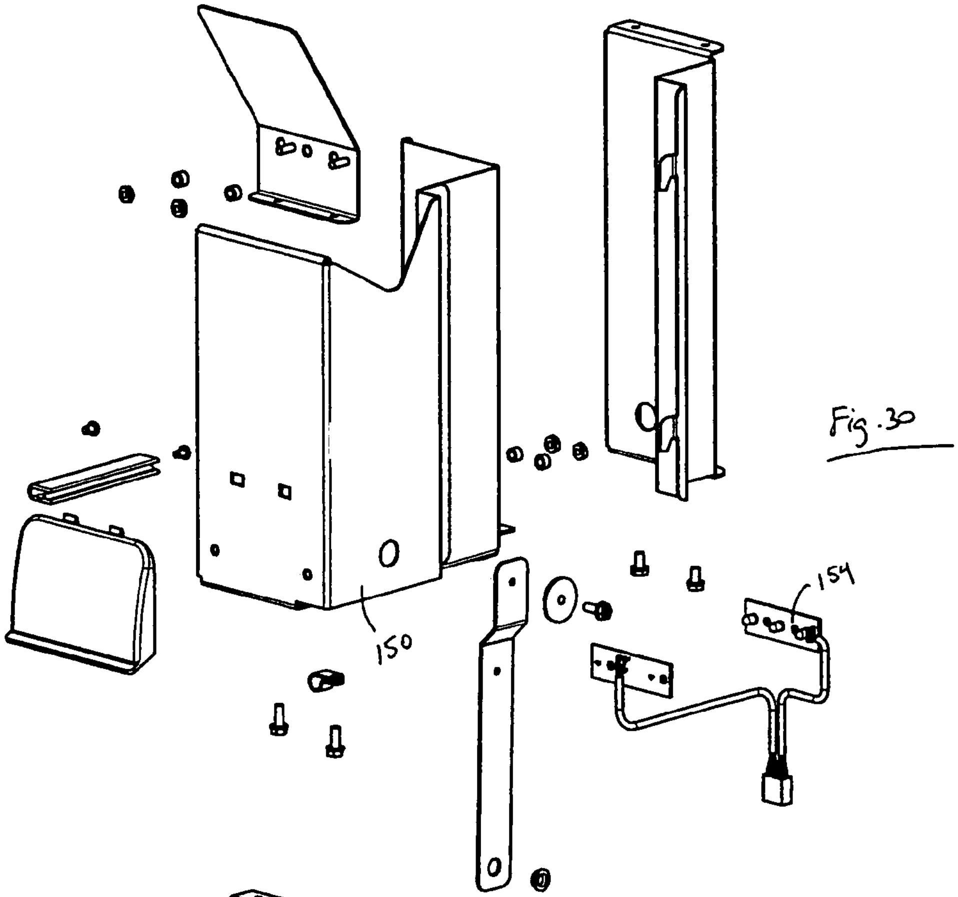
FIG. 30 is an exploded view of the delivery port of FIG. 28.
Figure 28:
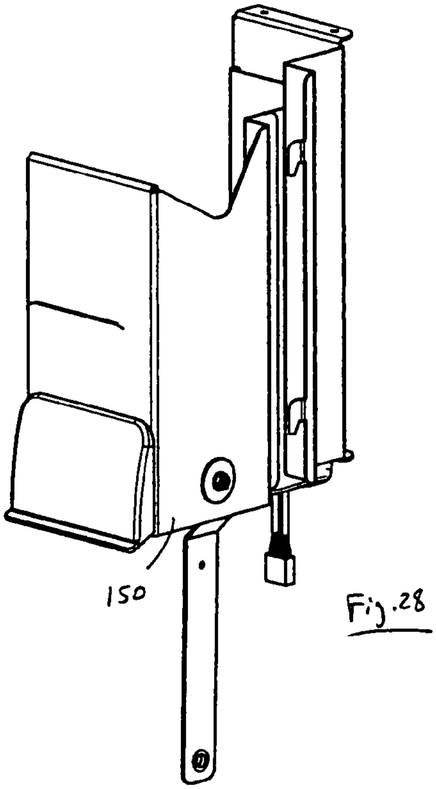
FIG. 28 is a left side perspective view of a delivery port of the present invention.
Figure 29:
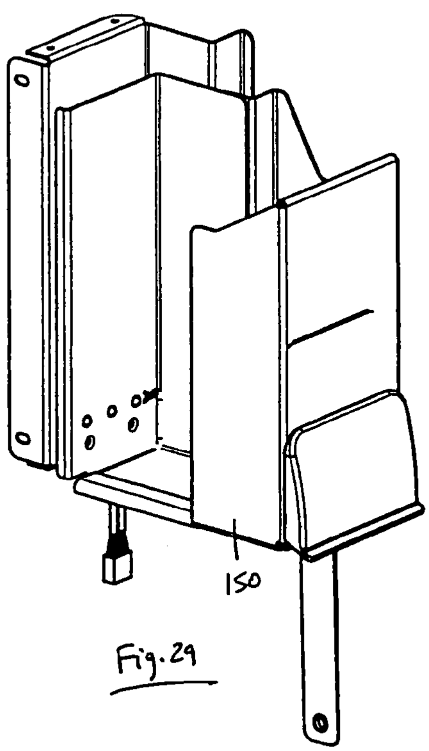
FIG. 29 is a right left side perspective view of the delivery port of FIG. 28.
Figure 33:
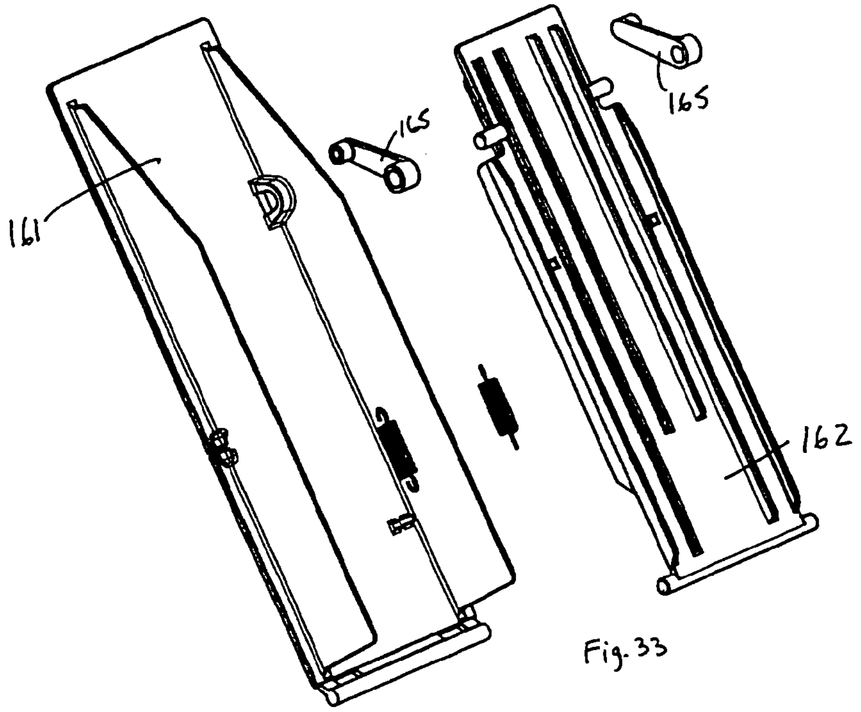
FIG. 33 is an exploded view of the delivery chute of FIG. 31.
Figure 43:
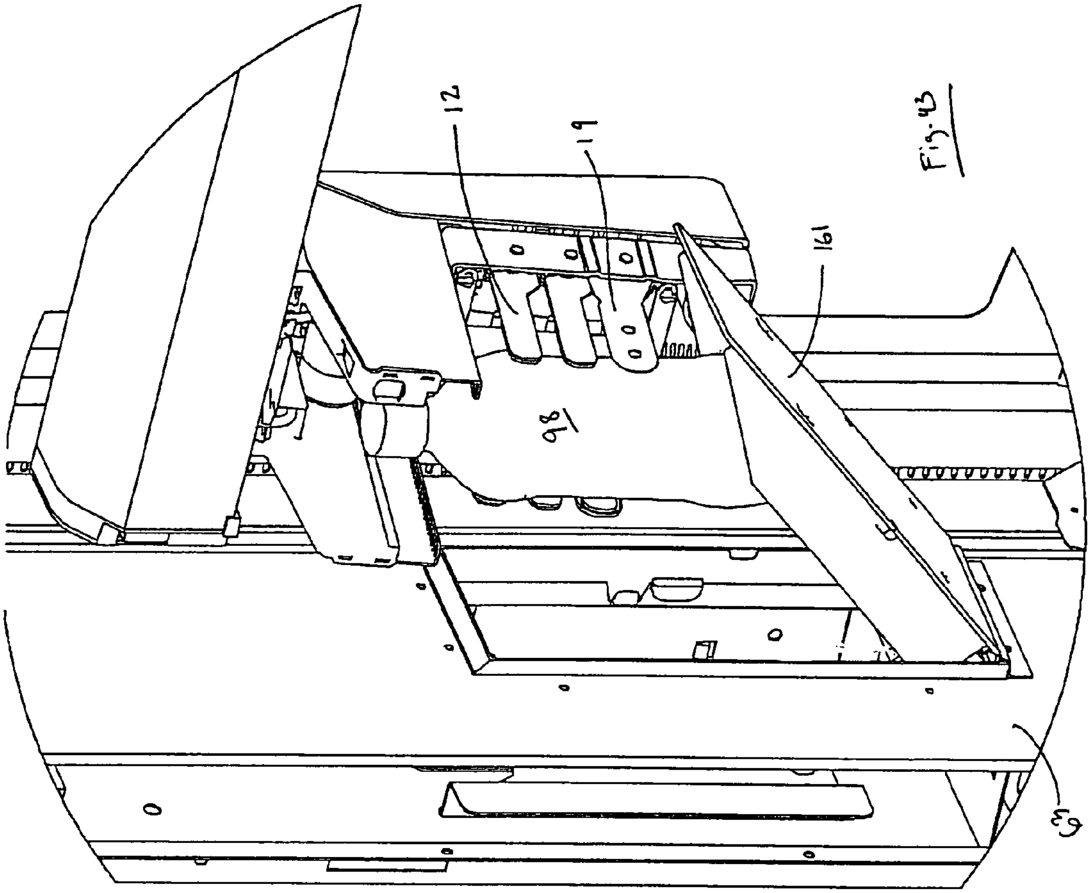
FIG. 43 is a detailed view of area enclosed in circle A of FIG. 42.
Figure 42:
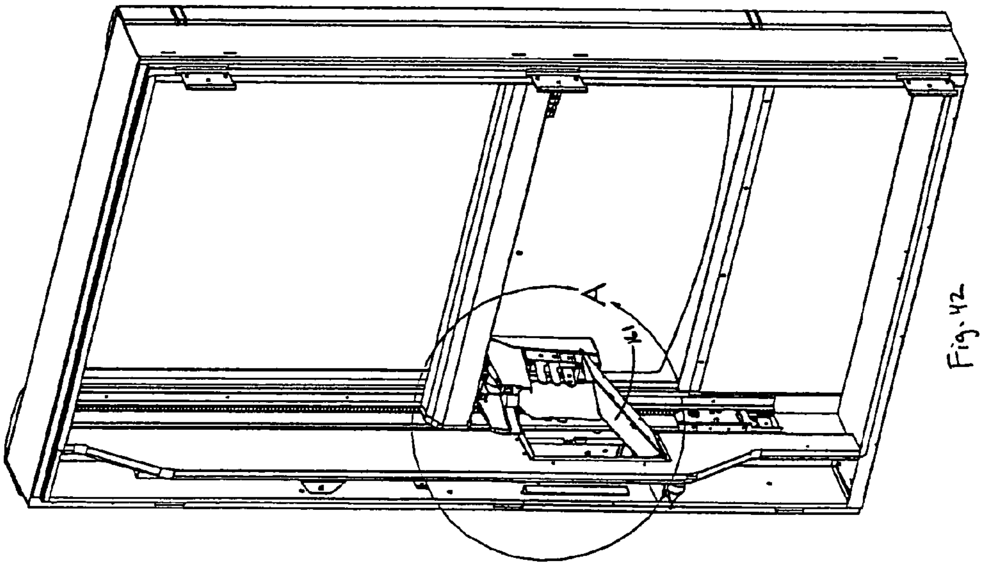
FIG. 42 is a rear perspective view of the door of the invention showing transfer of a product container from the gripping mechanism to a chute

A delivery area is provided in the door of the machine. In the illustrated exemplary embodiment, this delivery port includes two operative assemblies shown in FIGS. 28-33 and 42-43. The primary assembly is the delivery bucket 150 into which the vended product is transferred from a chute 160 and which opens to the outside allowing for retrieval of the vended product by the customer. The secondary assembly is a closable flap or chute on the inside of the door that receives the product that is dropped from the gripping mechanism 10. Referring first to the bucket assembly of FIGS. 28-30, it is seen that the bucket 150 has an open top, and three connected side walls leaving one open side. The chute assembly 160 is attached to a panel in the door adjacent to the open side wall of the bucket to allow product containers to be delivered into the bucket 150, as shown in FIGS. 42-43. Bucket 150 is pivotally mounted to the door 48, such that it may pivot forward thereby tilting open at an angle away from the door sufficient to permit removal of the vended product by the customer. One or more sensors 154 in bucket 150 detect the presence of the container 98. If no container is detected upon delivery from the gripping mechanism 10, the electronics determine that the particular queue is empty and instruct the purchaser to make another selection. If a product container is detected, the sensor 154 also detects its removal, thereafter tilting the bucket closed.

Special electronics controlling the delivery port detect whether there is an obstruction in the delivery port caused by the presence of a human hand or other object, and if so, closing of the port is delayed until the obstruction is removed. Other electronics illuminate the bucket delivery area when the product is present.

Figure 32:
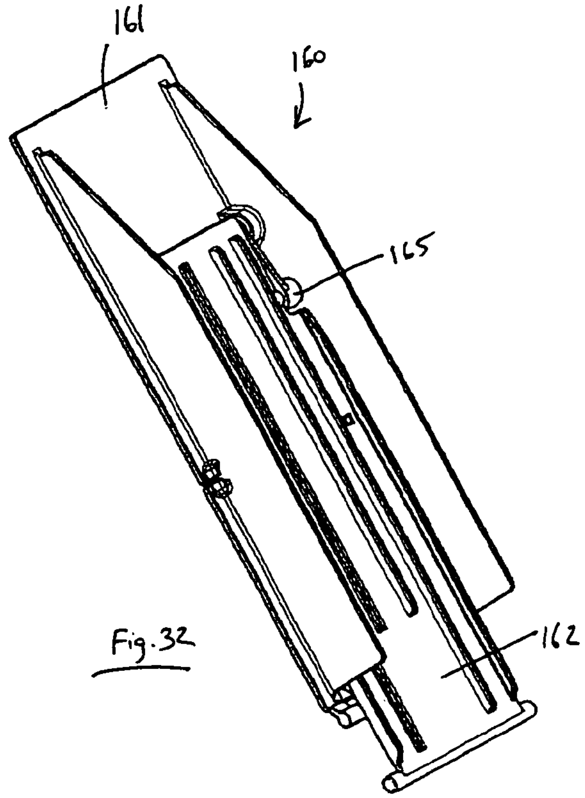
FIG. 32 is another perspective view of the delivery chute of FIG. 31.
Figure 31:
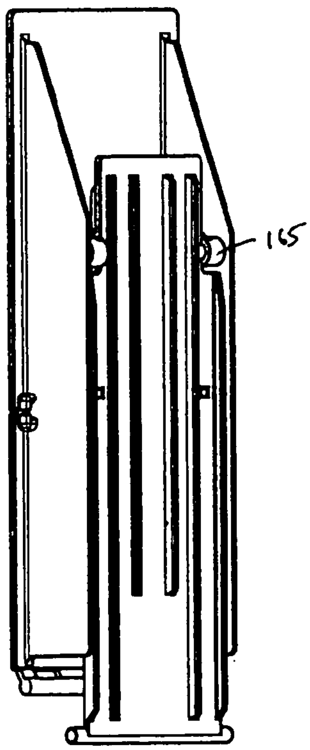
FIG. 31 is a perspective view of a delivery chute of the present invention.

FIGS. 31-33 and 42-43 illustrate an exemplary embodiment of a chute mechanism. This chute mechanism includes two parts, a primary chute 161, and a secondary chute 162. Primary chute 161 is pivotally attached to panel 63 in the door adjacent to the open side of bucket 150, and may be tilted open in order to receive a vended product dropped from the gripping mechanism 10. When tilted open, primary 161 and secondary 162 chutes lay against each other forming a single chute, as shown in FIG. 32. The gripping mechanism 10 is brought above the chute through the operation of the X-Y positioning system, fingers 12 are retracted, and the product container 98 is dropped into the chute, as shown in FIGS. 42-43. The product container 98 then slides down the secondary chute 162 into bucket 150. Primary chute 161 is then closed, causing secondary chute 162 to extend out and away from primary chute 161 through the operation of linkages 165, as shown in FIG. 31. This pushes the product container 98 into bucket 150 for delivery. Chute 162 does not extend beyond the thick insulated door panel 63, allowing pivotal movement of bucket 150 without interference. Closing of chute 151 seals the interior of chamber 58 preventing the escape of the controlled atmosphere, and also preventing unauthorized access to the interior from the outside.

Once the selected product container is retrieved from its queue by the gripping mechanism and delivered to and dropped into the chute assembly portion of the delivery area in the door, the product container is moved into the bucket when the chute closes. Once the chute closes, the presence or absence of a product container 98 in the bucket 150 is detected by at least one sensor 154, for example an optical emitter and detector. If there is no product container in the bucket, the bucket remains closed, and the customer is alerted (e.g., to make another selection). If there is a product container in the bucket, it is mechanically opened by tilting the bucket forward from the front of the vending machine which is caused when the bucket drive motor (not pictured) activating the delivery bucket drive link. Once the bucket is open, the customer retrieves the selected product and when the absence of the product is detected by sensor 154, the bucket automatically closes. When closing, if the electronic system associated with the bucket detects an obstruction, the bucket will stop closing until the obstruction is removed. This keeps the bucket from closing on a customer's hand.

An alternative embodiment of the product delivery port utilizes a motor in communication with the bucket. The motor comprises a gear mechanism, a worm gear drive, and a locking mechanism in communication with the gear mechanism and drive. The motor prevents customers from forcibly prying open the bucket, since the locking gear mechanism of the motor prevents backdriving of the motor. This reduces the likelihood and frequency of product theft. An alternative embodiment of the product chute includes a bumper in the bucket at the base of the chute.

In one embodiment, the temperature inside the storage chamber 58 is controlled by heating or refrigeration equipment. Circulation of air is forced into upper chamber 58 through ducts 54 and 55. Heating or refrigeration equipment is provided in lower chamber 59 to provide the heated or cooled air. This environmental control equipment is provided in a modular system 170 that may be easily accessed, removed and replaced to minimize the down time of the vending machine. A typical modular refrigeration unit is illustrated in FIGS. 34-37, and includes such components as a compressor 171, drier 172, evaporator 173, condenser 174 and fan assembly 179. All of these components, and others (such as foamed box 175—see FIG. 37) are mounted on a single easily-removable base 176 forming the modular unit 170.

The exemplary modular environmental control unit 170 is removably deployed in the lower ambient chamber 59 of the cabinet and communicates to the upper chamber 58 through ducts 54 and 55. In particular, cooler air produced by the exemplary refrigeration unit is forced into upper chamber 58 through outer duct 55 through opening 184, and withdrawn from upper chamber 58 through inner duct 54 through opening 185. Outer duct 55 is in communication with a vertical plenum formed between side wall 43, front wall 182 and dividing wall 62 as shown in FIG. 34. A plurality of ventilation openings 181 are provided in wall 62 to allow air to be moved into upper chamber 58 from the plenum behind wall 182. Ventilation openings 181 may be selectively blocked or left unblocked in different patterns in order to control the flow of air into chamber 58 according to such factors as the setup of the shelves and trays, as well the size and shape of the product containers therein.

It is to be appreciated that other electronic components 189 such as those for controlling the overall operation of the machine may also be deployed at any appropriate location such as in lower chamber 59 (as shown in FIGS. 22-24 and 34), in the cabinet door, or split up over multiple locations such as in the gripper housing, with the delivery port, or elsewhere in different combinations.

The operation of the illustrated exemplary vending machine including all of the components identified above will now be described. It is to be appreciated that the invention is not limited to this illustrative combination of components, and that different combinations of these components may be utilized without departing from the scope of the invention. Upon initial power up, the control system performs a startup sequence to determine the locations of the trays 120. This procedure is also repeated whenever door 48 is left open for a pre-defined period, such as 10 minutes. During the startup procedure, the housing 30 carrying sensor 39 scans in the Y direction, with sensor 39 identifying reflector targets 137 on trays 120. The existence of each reflector target 137 is sensed and communicated to a processor that calibrates the coordinates of each of the shelves and their corresponding product trays. It is preferred that sensor 39 be a polarized light emitting retro-reflective optical device that can only see the light as reflected off of the particular reflector 137 (corner cube type) so that it is not affected by ambient light interference. However, any other suitable sensing mechanism may be used such as a reed switch located on the housing, and magnets located on each tray. The position of each shelf is recorded, and if positions have been previously recorded, the new positions compared with those previously stored to determine if any changes in shelf positions have occurred. Any adjustments to the number of available shelves are then automatically made in the control software, without any operator intervention.

Figure 41:
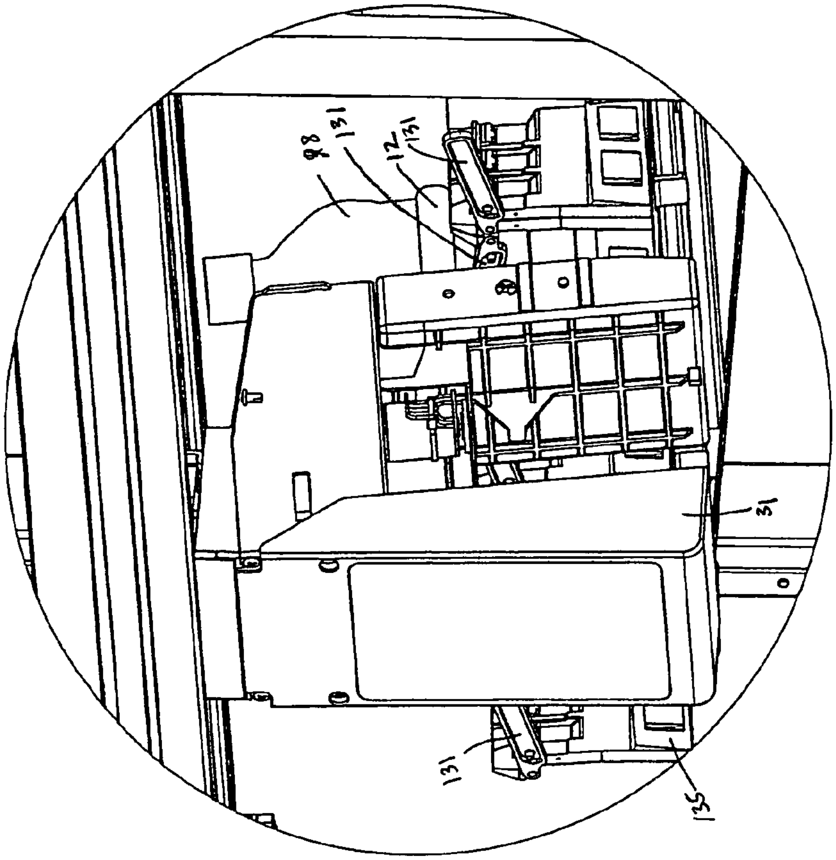
FIG. 41 is detailed view of area enclosed in circle A of FIG. 40.
Figure 40:
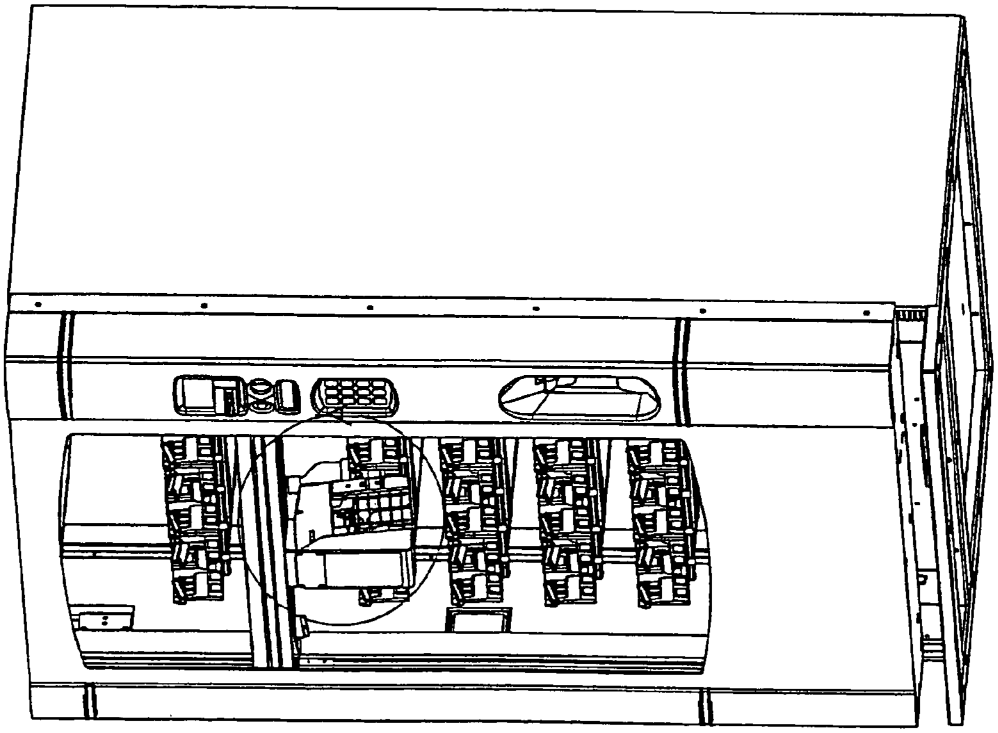
FIG. 40 is a front perspective view of a vending machine of the present invention having a transparent front panel, showing the removal of a product container from a tray by the robotic gripping mechanism.

To operate the illustrated embodiment, a customer views the available products through the transparent front door panel 50, deposits money at 195, and makes a selection using keypad 186. Upon receipt and verification of the money and product selection, the X-Y positioning system is activated causing the X-rail assembly 80 to be moved vertically to the appropriate shelf, and the carriage assembly 100 to be moved horizontally to the appropriate queue of a tray 120. These movements may occur simultaneously for quicker access of the product queue. Once the proper X and Y positions are reached in front of the selected queue, the gripping mechanism 10 is activated. The X-Y positioning is such that the fingers of the gripping mechanism are slightly above the selected queue. The gripping mechanism 10 is then extended forward in the Z direction (possibly at an angle, which may be around 6°), with fingers 12 open above the queue, such that the fingers 12 and 19 are on either side of the foremost product container 98 in the queue. After the gripper has been extended in the Z direction, the carriage assembly (X-rail) is lowered, causing fixed fingers 19 to come into contact with the spring-loaded gate 131 and spring-loaded arm 129 extension of the queue. The downward movement of fingers 19 temporarily moves these two spring-loaded parts out of the way. Fingers 12 are then closed around the container 98 to grip it, as shown in FIG. 41. The carriage assembly is then raised slightly so that the bottom of the gripped container may clear the lip 135 at the bottom of the queue. The gripper then retracts in the Z direction taking the product container 98 with it, retracting fixed fingers 19 away from the queue, releasing the two spring-loaded mechanisms which return to their original positions.

The product container 98, held by fingers 12, is then transferred to the delivery area using the X-Y positioning mechanism. When positioned above chute 161, fingers 12 are released, causing the product container 98 to be dropped down chute 161. Chute 161 then closes causing sub-chute 162 to push the product container 98 into bucket 150. Meanwhile, the gripper housing is moved vertically in order to block chute 161 from being pushed open by a customer through the delivery port. Detector 154 verifies the presence of the container in the bucket 150. If the product is present, the bucket 150 is tilted forward to allow the customer to retrieve it.

It is to be appreciated that different versions of the invention may be made from different combinations of the various features described above. It is to be understood that variations and modifications of the present invention may be made without departing from the scope thereof. It is also to be understood that the present invention is not to be limited by the specific embodiments disclosed herein, but only in accordance with the appended claims when read in light of the specification.

It is also to be understood that the present invention is not to be limited by the specific embodiments or combinations of the components or parts disclosed herein, nor by any of the exemplary dimensions set forth in the attached illustrations. In particular, any of the different components of the invention may be used independently of one another, in stand alone operations, or in independent situations apart from any particular vending machine. In addition, different permutations and combinations of the various components and parts disclosed herein may be employed in different vending machines to provide different sets of features and functionality.

What is claimed is:

1. A method for setting up a positioning system in a vending machine comprising the steps of:

a. establishing a home position for a housing movably mounted to an elongated generally horizontal cross member in a Y plane, said cross member being mounted between a pair of generally vertically oriented support structures, said cross member having follower assemblies located at both ends that are movably engaged with each of said support structures, said housing supporting a sensor;

b. moving said housing to one end of said cross member;

c. moving said cross member in a generally vertical direction such that the sensor on said housing detects the presence of at least one target located on at least one tray in said vending machine; and d. calculating the location of each such tray from the detection of each such target.

2. The method of claim 1 comprising the additional steps of comparing the calculated location of each such target to any previously recorded location for such target, and updating the recorded target location if different.

3. The method of claim 1 comprising the additional steps of:

d. moving said housing to an opposite end of said cross member;

e. moving said cross member in a generally vertical direction such that the sensor on said housing detects the presence of at least one other target located on at least one tray in said vending machine;

e. determining whether there are any deviations from horizontal based on such other target locations; and f. compensating for any such deviation.

4. The method of claim 3 wherein a plurality of trays are provided on generally horizontal shelves inside said vending machine, and comprising the additional step of calculating the intermediate positions of each tray on each shelf.

5. A method for setting up a positioning system in a vending machine containing a plurality of product trays comprising the steps of:

a. establishing a home position for a housing movably mounted to an elongated generally horizontal cross member in a Y plane, said cross member being movably mounted between a pair of generally vertically oriented support structures, said housing supporting a sensor;

b. moving said housing to one end of said cross member;

c. moving said cross member in a generally vertical direction such that the sensor on said housing detects the presence of a target located on a tray disposed in said vending machine;

d. calculating the location of each such tray from the detection of each target;

e. moving said housing to an opposite end of said cross member;

f. thereafter moving said cross member in a generally vertical direction such that the sensor on said housing detects the presence of at least one different target located on at least one other tray in said vending machine; and e. calculating the location of each such other tray from the detection of each such different target.

6. The method of claim 2 comprising the further step of comparing the calculated locations for generally horizontally oriented pairs of trays to determine whether there is any deviation from horizontal.

7. The method of claim 6 comprising the further step of calculating intermediate positions of trays between each such pair.

* * * * *